US012039952B2

(12) United States Patent
Toyotaka et al.

(10) Patent No.: US 12,039,952 B2
(45) Date of Patent: Jul. 16, 2024

(54) DISPLAY APPARATUS AND ELECTRONIC DEVICE

(71) Applicant: Semiconductor Energy Laboratory Co., Ltd., Atsugi (JP)

(72) Inventors: Kouhei Toyotaka, Atsugi (JP); Motoharu Saito, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/134,054

(22) Filed: Apr. 13, 2023

(65) Prior Publication Data

US 2023/0260475 A1 Aug. 17, 2023

Related U.S. Application Data

(62) Division of application No. 17/285,603, filed as application No. PCT/IB2019/059206 on Oct. 28, 2019, now Pat. No. 11,663,990.

(30) Foreign Application Priority Data

Nov. 9, 2018 (JP) ................................ 2018-211676
Nov. 29, 2018 (JP) ................................ 2018-223687
Jan. 30, 2019 (JP) ................................ 2019-014015

(51) Int. Cl.
*G09G 3/36* (2006.01)

(52) U.S. Cl.
CPC ......... *G09G 3/3688* (2013.01); *G09G 3/3696* (2013.01); *G09G 2300/0426* (2013.01);
(Continued)

(58) Field of Classification Search
CPC ......... G09G 3/3688; G09G 2300/0408; G09G 3/3648
See application file for complete search history.

(56) References Cited

U.S. PATENT DOCUMENTS 7,256,760 B2 * 8/2007 Yamazaki ........... H01L 27/1248 345/55
7,259,740 B2 8/2007 Haga et al.
(Continued)

FOREIGN PATENT DOCUMENTS

CN 001953179 A 4/2007
CN 102654979 A 9/2012
(Continued)

OTHER PUBLICATIONS

Semiconductor Energy Lab Inventors Arai Yasuyuki; JP2007096055A•Apr. 12, 2007 (Year: 2007).*
(Continued)

*Primary Examiner* — Van N Chow
(74) *Attorney, Agent, or Firm* — Eric J. Robinson; Robinson Intellectual Property Law Office, P.C.

(57) ABSTRACT

A display apparatus which includes a driver with low power consumption and in which an output voltage of the driver is boosted by a pixel is provided. The source driver in which a logic unit and an amplifier unit operate appropriately by the same low voltage is included, and the pixel has a function of retaining first data, a function of adding second data to the first data to generate third data, and a function of supplying the third data to a display device. Thus, even when a voltage output from the source driver is low, the voltage can be boosted by the pixel; accordingly, the display device can operate appropriately.

7 Claims, 32 Drawing Sheets

(52) U.S. Cl.
CPC ............... *G09G 2310/0286* (2013.01); *G09G 2310/0291* (2013.01); *G09G 2330/021* (2013.01)

(56) References Cited

U.S. PATENT DOCUMENTS

| | | | | |
|---|---|---|---|---|
| 7,671,831 | B2 | 3/2010 | Chang et al. | |
| 8,035,132 | B2 | 10/2011 | Haga et al. | |
| 8,976,090 | B2 | 3/2015 | Yamamoto et al. | |
| 9,093,045 | B2 | 7/2015 | Lee | |
| 9,208,710 | B2 | 12/2015 | Fukumoto et al. | |
| 10,140,940 | B2 | 11/2018 | Aoki | |
| 10,678,375 | B2 | 6/2020 | Takahashi et al. | |
| 11,256,361 | B2 | 2/2022 | Takahashi et al. | |
| 2001/0033252 | A1 | 10/2001 | Yamazaki et al. | |
| 2002/0175888 | A1* | 11/2002 | Murade ................ | G09G 3/3648 345/92 |
| 2003/0067434 | A1* | 4/2003 | Haga .................... | G09G 3/3648 345/98 |
| 2007/0001205 | A1 | 1/2007 | Kimura | |
| 2007/0064469 | A1 | 3/2007 | Umezaki | |
| 2007/0072439 | A1 | 3/2007 | Akimoto et al. | |
| 2007/0090385 | A1 | 4/2007 | Fukumoto et al. | |
| 2007/0126665 | A1 | 6/2007 | Kimura | |
| 2008/0055222 | A1 | 3/2008 | Chen et al. | |
| 2008/0100263 | A1 | 5/2008 | Nagatsuka et al. | |
| 2009/0179572 | A1 | 7/2009 | Fukumoto et al. | |
| 2009/0195530 | A1 | 8/2009 | Ozaki | |
| 2009/0303219 | A1 | 12/2009 | Kimura et al. | |
| 2011/0090184 | A1 | 4/2011 | Yamazaki et al. | |
| 2011/0101334 | A1 | 5/2011 | Yamazaki et al. | |
| 2011/0216043 | A1 | 9/2011 | Tamura et al. | |
| 2012/0188290 | A1 | 7/2012 | Park et al. | |
| 2012/0223978 | A1 | 9/2012 | Yamamoto et al. | |
| 2012/0249509 | A1 | 10/2012 | Kim et al. | |
| 2013/0063041 | A1 | 3/2013 | Kimura | |
| 2013/0120229 | A1 | 5/2013 | Miyake et al. | |
| 2013/0207945 | A1 | 8/2013 | Watanabe | |
| 2013/0261835 | A1 | 10/2013 | Takahashi et al. | |
| 2013/0262828 | A1 | 10/2013 | Yoneda | |
| 2013/0307421 | A1 | 11/2013 | Tanada | |
| 2014/0266305 | A1 | 9/2014 | Shionoiri et al. | |
| 2015/0016585 | A1 | 1/2015 | Toyotaka et al. | |
| 2015/0154730 | A1 | 6/2015 | Hirakata et al. | |
| 2015/0370313 | A1 | 12/2015 | Tamura | |
| 2016/0006433 | A1 | 1/2016 | Ishizu et al. | |
| 2016/0210906 | A1 | 7/2016 | In et al. | |
| 2016/0232956 | A1 | 8/2016 | Ishizu et al. | |
| 2017/0025080 | A1 | 1/2017 | Aoki | |
| 2017/0061863 | A1 | 3/2017 | Eguchi | |
| 2017/0103714 | A1 | 4/2017 | Yamamoto et al. | |
| 2017/0117283 | A1 | 4/2017 | Matsuzaki et al. | |
| 2017/0160801 | A1 | 6/2017 | Miyaguchi | |
| 2017/0337888 | A1 | 11/2017 | Nakagawa et al. | |
| 2017/0357641 | A1 | 12/2017 | Okamoto | |
| 2018/0013421 | A1 | 1/2018 | Park et al. | |
| 2018/0033359 | A1 | 2/2018 | Yoneda et al. | |
| 2020/0126510 | A1 | 4/2020 | Shiokawa et al. | |
| 2020/0175905 | A1 | 6/2020 | Yamazaki et al. | |
| 2020/0258921 | A1 | 8/2020 | Takahashi et al. | |
| 2020/0302889 | A1 | 9/2020 | Takahashi et al. | |
| 2020/0312261 | A1 | 10/2020 | Miyake et al. | |
| 2020/0401170 | A1 | 12/2020 | Yakubo. et al. | |
| 2021/0193029 | A1 | 6/2021 | Yamazaki et al. | |
| 2021/0201763 | A1 | 7/2021 | Kusunoki et al. | |

FOREIGN PATENT DOCUMENTS

| | | | |
|---|---|---|---|
| CN | 102737586 | A | 10/2012 |
| CN | 103777421 | A | 5/2014 |
| EP | 1300826 | A | 4/2003 |
| EP | 1777822 | A | 4/2007 |
| EP | 2506247 | A | 10/2012 |
| JP | 2004-046054 | A | 2/2004 |
| JP | 2007-096055 | A | 4/2007 |
| JP | 2007-123861 | A | 5/2007 |
| JP | 2007-140496 | A | 6/2007 |
| JP | 2007-189699 | A | 7/2007 |
| JP | 2008-241831 | A | 10/2008 |
| JP | 2009-187024 | A | 8/2009 |
| JP | 2011-039269 | A | 2/2011 |
| JP | 2011-119674 | A | 6/2011 |
| JP | 2012-185328 | A | 9/2012 |
| JP | 2017-027012 | A | 2/2017 |
| JP | 2018-072822 | A | 5/2018 |
| KR | 2007-0043650 | A | 4/2007 |
| KR | 2012-0084967 | A | 7/2012 |
| KR | 2014-0143989 | A | 12/2014 |
| TW | 200905646 | | 2/2009 |
| WO | WO-2018/073706 | | 4/2018 |

OTHER PUBLICATIONS

International Search Report (Application No. PCT/IB2019/059206) dated Feb. 10, 2020.
Written Opinion (Application No. PCT/IB2019/059206) dated Feb. 10, 2020.
Chinese Office Action (Application No. 201980073616.2) dated Dec. 19, 2023.

* cited by examiner

FIG. 20A1
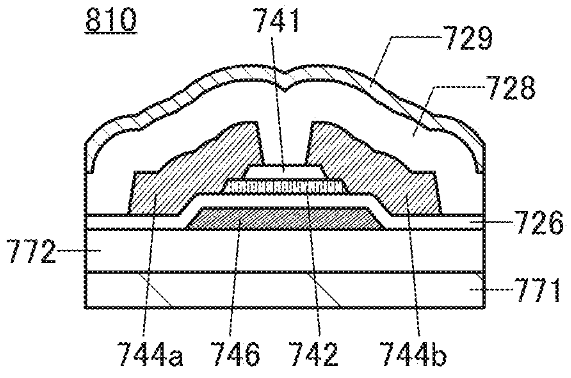
FIG. 20A2
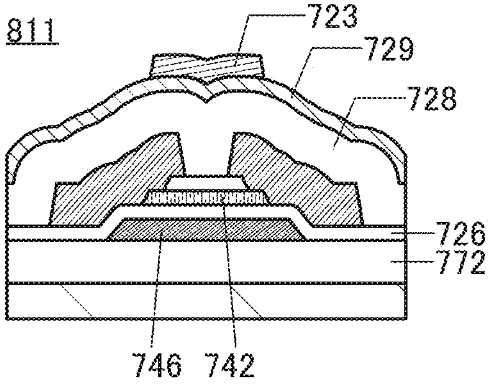
FIG. 20B1
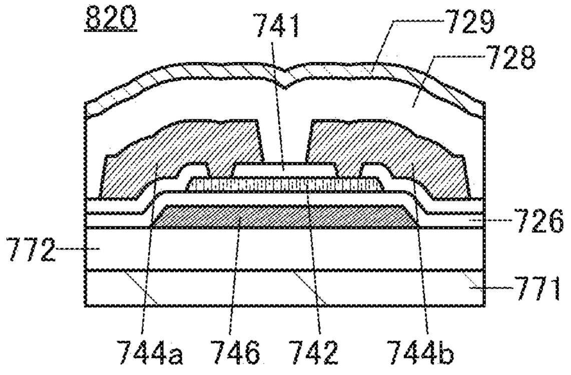
FIG. 20B2
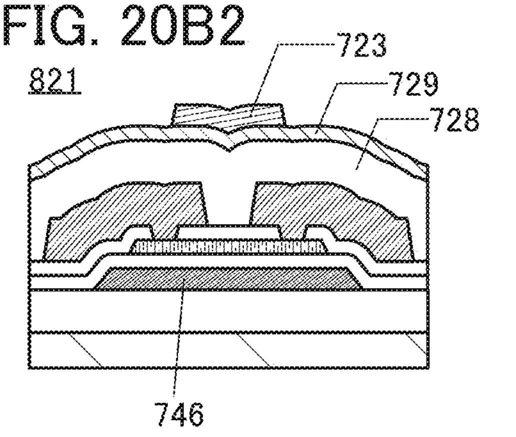
FIG. 20C1
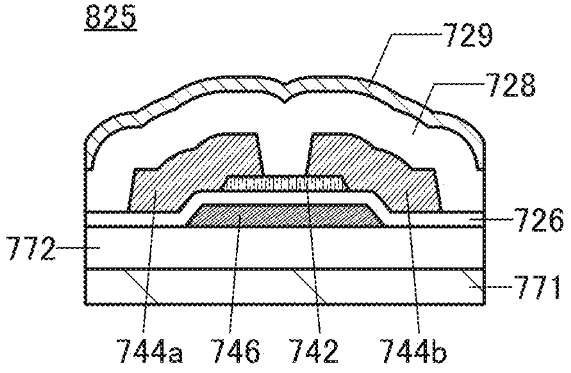
FIG. 20C2
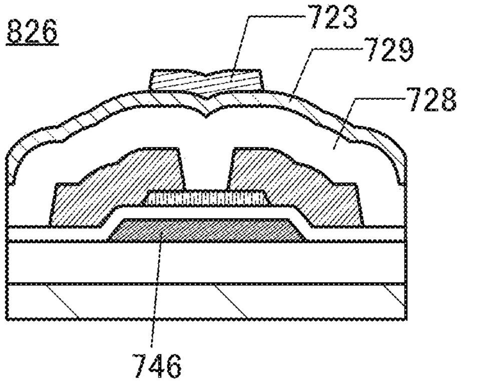

FIG. 21A1
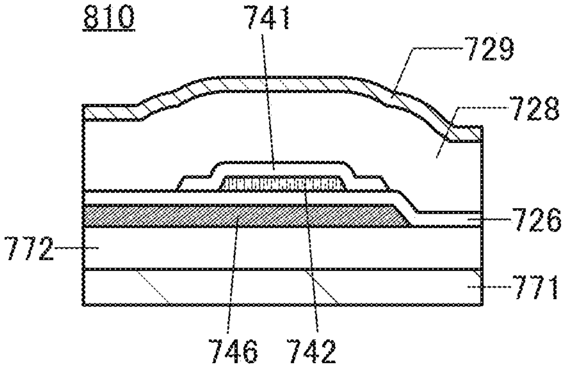
FIG. 21A2
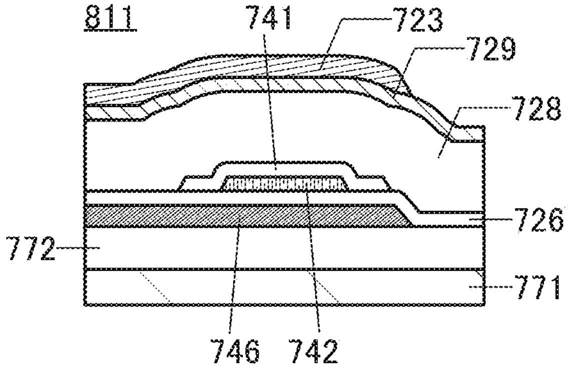
FIG. 21B1
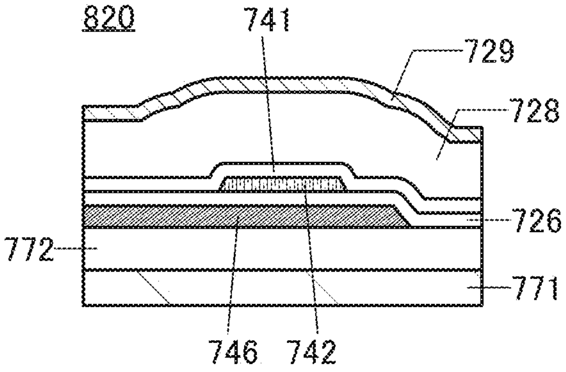
FIG. 21B2
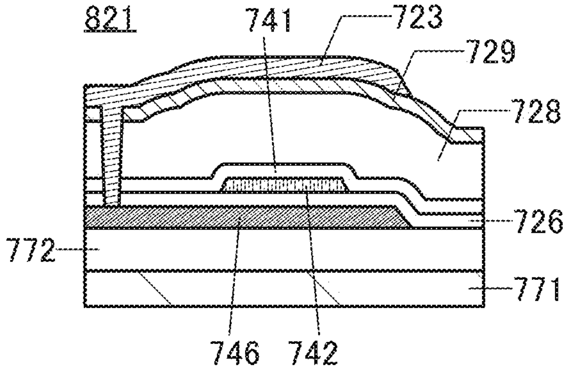
FIG. 21C1
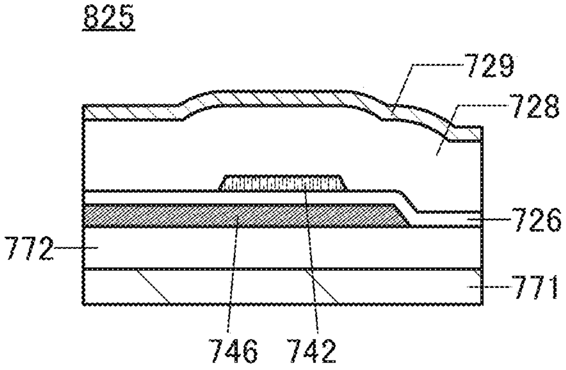
FIG. 21C2
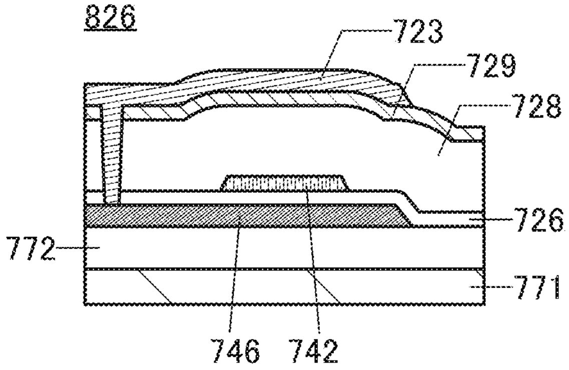

FIG. 22A1
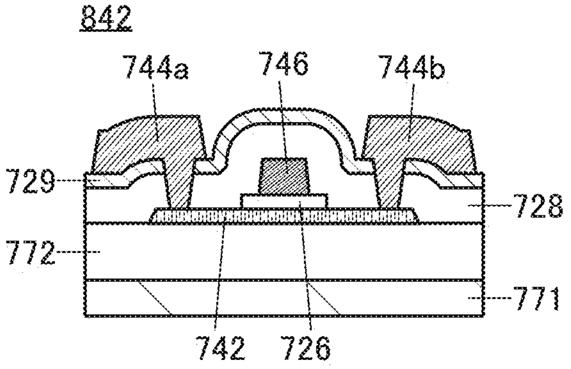
FIG. 22A2
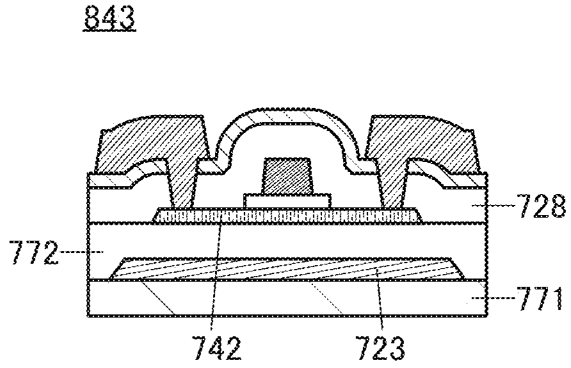
FIG. 22B1
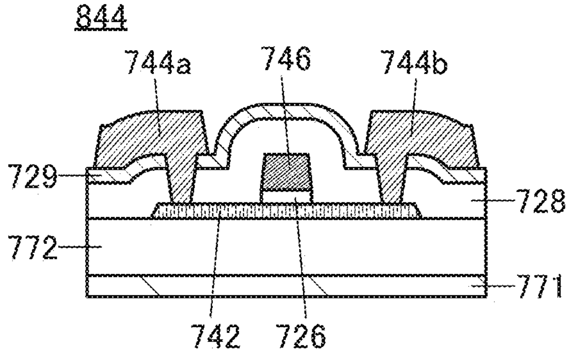
FIG. 22B2
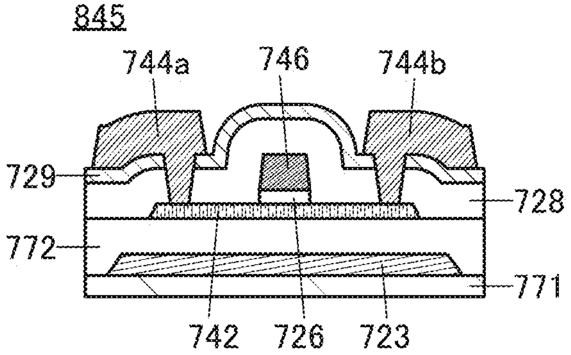
FIG. 22C1
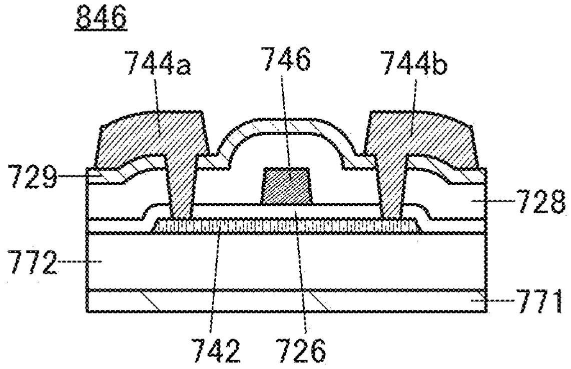
FIG. 22C2
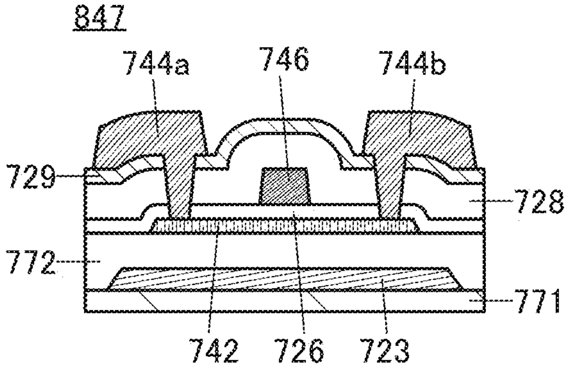

FIG. 23A1
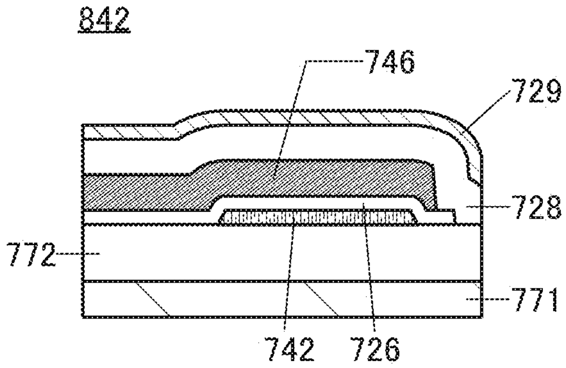
FIG. 23A2
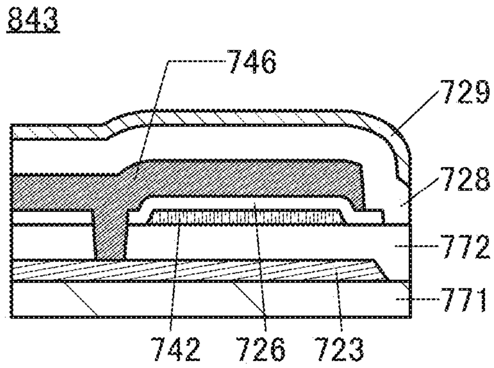
FIG. 23B1
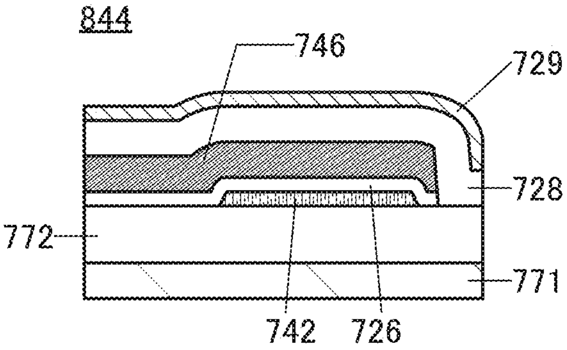
FIG. 23B2
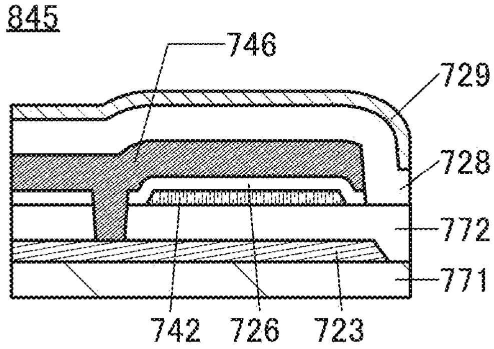
FIG. 23C1
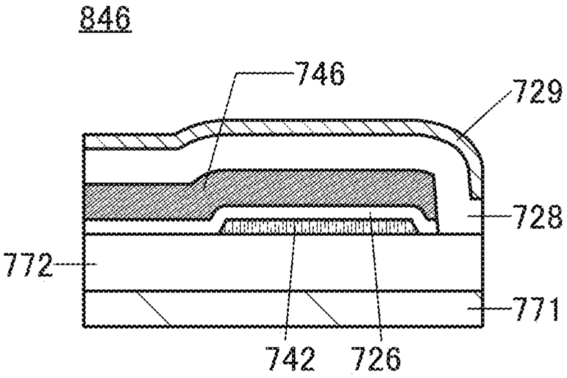
FIG. 23C2
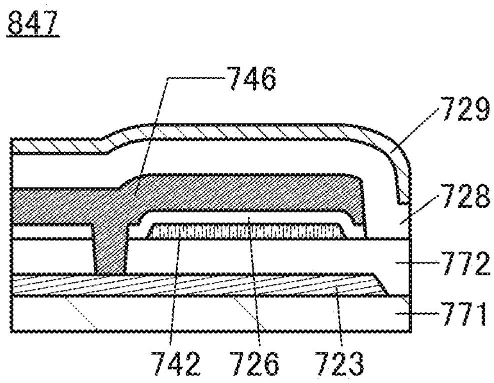

DISPLAY APPARATUS AND ELECTRONIC DEVICE

TECHNICAL FIELD

One embodiment of the present invention relates to a display apparatus.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Accordingly, more specific examples of the technical field of one embodiment of the present invention disclosed in this specification include a semiconductor apparatus, a display apparatus, a liquid crystal display apparatus, a light-emitting apparatus, a lighting apparatus, a power storage apparatus, a memory apparatus, an imaging apparatus, an operation method thereof, and a manufacturing method thereof.

In this specification and the like, a semiconductor apparatus generally means an apparatus that can function by utilizing semiconductor characteristics. A transistor and a semiconductor circuit are embodiments of semiconductor apparatuses. In some cases, a memory apparatus, a display apparatus, an imaging apparatus, or an electronic device includes a semiconductor apparatus.

BACKGROUND ART

A technique for forming transistors using a metal oxide formed over a substrate has been attracting attention. For example, a technique in which a transistor formed using zinc oxide or an In—Ga—Zn-based oxide is used as a switching element or the like of a pixel of a display apparatus is disclosed in Patent Document 1 and Patent Document 2.

Patent Document 3 discloses a memory apparatus having a structure in which a transistor with an extremely low off-state current is used in a memory cell.

REFERENCES

Patent Documents

[Patent Document 1] Japanese Published Patent Application No. 2007-123861

[Patent Document 2] Japanese Published Patent Application No. 2007-96055

[Patent Document 3] Japanese Published Patent Application No. 2011-119674

SUMMARY OF THE INVENTION

Problems to be Solved by the Invention

A driver that supplies data to pixels of a display apparatus includes a logic unit and an amplifier unit, and the logic unit and the amplifier unit are designed to operate appropriately. In general, a logic unit is designed to operate at high speed and have lower power consumption, and an amplifier unit is designed to have high withstand voltage and be capable of outputting high voltage. Therefore, arranging transistors having different structures, and the like in one chip is required, and thus the number of manufacturing steps becomes large, which becomes one factor of an increase of cost.

Furthermore, the power supply voltage of the logic unit and the power supply voltage of the amplifier unit differ from each other; thus, a circuit outputting at least two or more of voltages is required. If the outputs of the voltages can be unified, the power supply circuit and the like can be simplified, which can lower the cost. Moreover, if the power supply voltage of the amplifier unit can be lowered, the power consumption of the entire driver can be reduced.

Furthermore, in a pixel circuit, a reduction in power consumption can be expected when a display device can operate appropriately using a data voltage with a low amplitude In view of the above, an object of one embodiment of the present invention is to provide a display apparatus including a driver with low power consumption. Another object is to provide a display apparatus which includes a driver with low power consumption and in which an output voltage of the driver are boosted by pixels. Another object is to provide a display apparatus capable of supplying a voltage higher than or equal to the output voltage of a source driver to a display device. Another object is to provide a display apparatus capable of enhancing the luminance of a displayed image.

Another object is to provide a display apparatus with low power consumption. Another object is to provide a highly reliable display apparatus. Another object is to provide a novel display apparatus or the like. Another object is to provide a method for driving any of the above display apparatuses. Another object is to provide a novel semiconductor apparatus or the like.

Note that the description of these objects does not preclude the existence of other objects. One embodiment of the present invention does not have to achieve all these objects. Other objects are apparent from and can be derived from the description of the specification, the drawings, the claims, and the like.

Means for Solving the Problems

One embodiment of the present invention relates to a display apparatus including a driver with low power consumption.

One embodiment of the present invention is a display apparatus including a driver circuit and a pixel circuit; the driver circuit includes a shift register circuit and an amplifier circuit; the pixel circuit has a function of generating third data by adding first data and second data that are output from the amplifier circuit; and the shift register circuit and the amplifier circuit are supplied with the same power supply voltage.

The shift register circuit and the amplifier circuit can be electrically connected to the same power supply circuit.

The power supply voltage supplied to the driver circuit can be lower than or equal to 3.3 V.

The driver circuit may further include one or more circuits selected from an input interface circuit, a serial-parallel converter circuit, a latch circuit, a level shift circuit, a PTL (pass transistor logic), a digital-analog converter circuit, and a bias generation circuit, and the circuit(s) may be supplied with a power supply voltage that is the same as the power supply voltage for the shift register circuit and the amplifier circuit.

Another embodiment of the present invention is a display apparatus including a driver circuit and a pixel circuit; the driver circuit includes a shift register circuit and an amplifier circuit; the pixel circuit has a function of generating third data by adding first data and second data that are output from the amplifier circuit; the shift register circuit includes a first transistor; the amplifier circuit includes a second transistor; and when one of the first transistor and the second transistor includes a region of a gate insulating film having a thickness of a, the other transistor includes a region of a gate insulating film having a thickness of greater than or equal to 0.9α and less than or equal to 1.1a The driver circuit can further include one or more circuits selected from an input interface circuit, a serial-parallel converter circuit, a latch circuit, a level shift circuit, a PTL, a digital-analog converter circuit, and a bias generation circuit, and a transistor included in the circuit(s) can include a region of a gate insulating film having a thickness of greater than or equal to 0.9α and less than or equal to 1.1α.

The pixel circuit can include a third transistor, a fourth transistor, a fifth transistor, a sixth transistor, a seventh transistor, a first capacitor, a second capacitor, and a light-emitting device; one of a source and a drain of the third transistor can be electrically connected to one electrode of the first capacitor; the other electrode of the first capacitor can be electrically connected to one of a source and a drain of the fourth transistor; the one of the source and the drain of the fourth transistor can be electrically connected to one of a source and a drain of the fifth transistor; the one electrode of the first capacitor can be electrically connected to a gate of the sixth transistor; one of a source and a drain of the sixth transistor can be electrically connected to one of a source and a drain of the seventh transistor; the one of the source and the drain of the seventh transistor can be electrically connected to one electrode of the light-emitting device; the one electrode of the light-emitting device can be electrically connected to one electrode of the second capacitor; and the other electrode of the second capacitor can be electrically connected to a gate of the seventh transistor.

Alternatively, the pixel circuit can include a third transistor, a fourth transistor, a fifth transistor, a first capacitor, a second capacitor, and a liquid crystal device; one of a source and a drain of the third transistor can be electrically connected to one electrode of the first capacitor; the other electrode of the first capacitor can be electrically connected to one of a source and a drain of the fourth transistor; the one of the source and the drain of the fourth transistor can be electrically connected to one of a source and a drain of the fifth transistor; the one electrode of the first capacitor can be electrically connected to one electrode of the second capacitor; and the one electrode of the second capacitor can be electrically connected to one electrode of the liquid crystal device.

The other of the source and the drain of the third transistor may be electrically connected to the other of the source and the drain of the fourth transistor.

Each of the transistors included in the pixel circuit preferably includes a metal oxide in a channel formation region, and the metal oxide preferably contains In, Zn, and M (M is Al, Ti, Ga, Sn, Y, Zr, La, Ce, Nd, or Hf).

Effect of the Invention

With the use of one embodiment of the present invention, a display apparatus including a driver with low power consumption can be provided. Alternatively, a display apparatus which includes a driver with low power consumption and in which an output voltage of the driver is boosted by a pixel can be provided. Alternatively, a display apparatus capable of supplying a voltage higher than or equal to the output voltage of a source driver to a display device can be provided. Alternatively, a display apparatus capable of enhancing the luminance of a displayed image can be provided.

Alternatively, a display apparatus with low power consumption can be provided. Alternatively, a highly reliable display apparatus can be provided. Alternatively, a novel display apparatus or the like can be provided. Alternatively, a method for driving any of the display apparatuses can be provided. A novel semiconductor apparatus or the like can be provided.

BRIEF DESCRIPTION OF THE DRAWINGS

FIG. 20A1 to FIG. 20C2 are diagrams illustrating transistors.

FIG. 21A1 to FIG. 21C2 are diagrams illustrating transistors.

FIG. 22A1 to FIG. 22C2 are diagrams illustrating transistors.

FIG. 23A1 to FIG. 23C2 are diagrams illustrating transistors.

MODE FOR CARRYING OUT THE INVENTION

Figure 1:
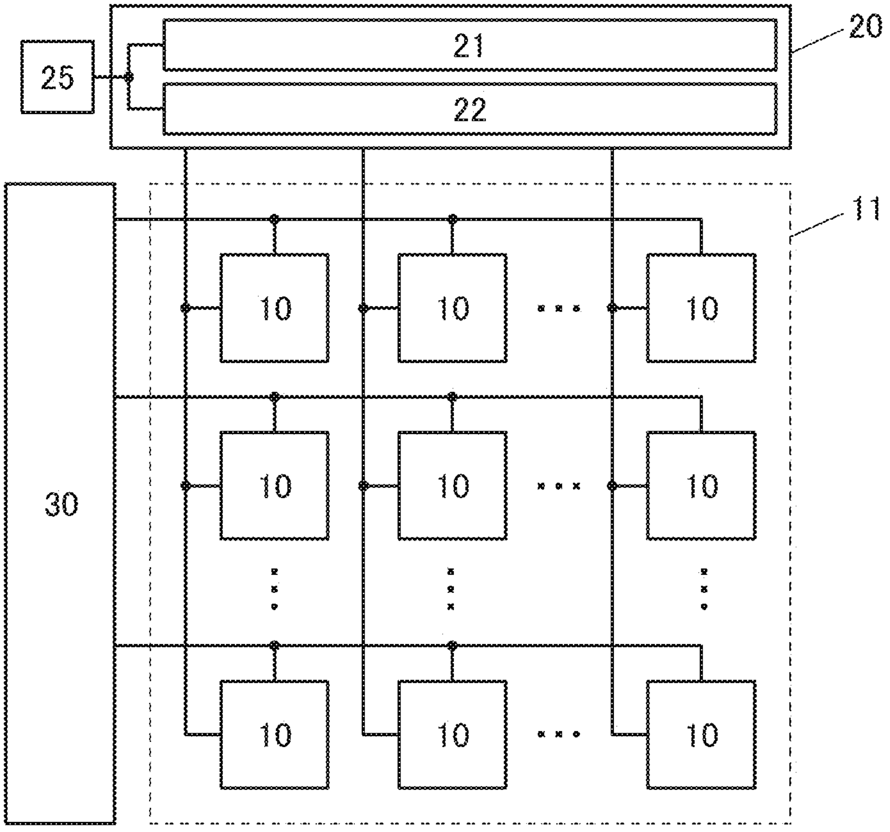
FIG. 1 is a diagram illustrating a display apparatus.

Embodiments are described in detail with reference to the drawings. However, the present invention is not limited to the following description, and it is readily appreciated by those skilled in the art that modes and details can be modified in various ways without departing from the spirit and the scope of the present invention. Therefore, the present invention should not be interpreted as being limited to the descriptions of embodiments below. Note that in structures of the invention described below, the same portions or portions having similar functions are denoted by the same reference numerals in different drawings, and the description thereof is not repeated in some cases. The same components are denoted by different hatching patterns in different drawings, or the hatching patterns are omitted in some cases.

Even in the case where a single component is illustrated in a circuit diagram, the component may be composed of a plurality of parts as long as there is no functional inconvenience. For example, in some cases, a plurality of transistors that operate as a switch are connected in series or in parallel. In some cases, capacitors are separately arranged in a plurality of positions.

One conductor has a plurality of functions such as a wiring, an electrode, and a terminal in some cases. In this specification, a plurality of names are used for the same component in some cases. Even in the case where components are illustrated in a circuit diagram as if they were directly connected to each other, the components may actually be connected to each other through a plurality of conductors; in this specification, even such a structure is included in direct connection.

Embodiment 1

In this embodiment, a display apparatus that is one embodiment of the present invention is described with reference to drawings.

One embodiment of the present invention is a display apparatus including a source driver with low power consumption and a pixel having a function of adding data. The source driver has a configuration in which a logic unit and an amplifier unit operate appropriately by the same power supply voltage. The power supply voltage for the logic unit that operates with low power consumption is used as a reference; thus, the power consumption of the entire source driver can be reduced although a voltage that can be output by the amplifier unit becomes low.

Furthermore, the pixel has a function of retaining first data, a function of adding second data to the first data to generate third data, and a function of supplying the third data to a display device. Thus, even when a voltage output from the source driver is low, the voltage can be boosted by the pixel; accordingly, the display device can operate appropriately.

That is, the combination of the source driver with a low power supply voltage and the pixel capable of voltage boosting enables a display apparatus having extremely low power consumption to be provided.

FIG. 1 is a diagram illustrating a display apparatus of one embodiment of the present invention. The display apparatus includes a pixel array 11, a source driver 20, and a gate driver 30. The pixel array 11 includes pixels 10 arranged in the column direction and the row direction. Note that wirings are illustrated simply, and the details are described later.

The source driver 20 can be configured to include can have a configuration in which a logic unit 21 and an amplifier unit 22. A power supply circuit 25 is electrically connected to the logic unit 21 and the amplifier unit 22. The number of the power supply circuits 25 is not limited to one; however, the same voltage can be supplied to the logic unit 21 and the amplifier unit 22.

Note that for the source driver 20 and the gate driver 30, a method in which an IC chip is attached externally by a COF (chip on film) method, a COG (chip on glass) method, a TCP (tape carrier package) method, or the like can be used. Alternatively, the source driver 20 and the gate driver 30 may be formed on the same substrate as that of the pixel array 11, using transistors manufactured using the same process as that of the pixel array 11.

Although FIG. 1 illustrates an example in which the gate driver 30 is placed on one side of the pixel array 11, two gate drivers 30 may be placed with the pixel array 11 placed therebetween to divide driving rows.

Figure 2:
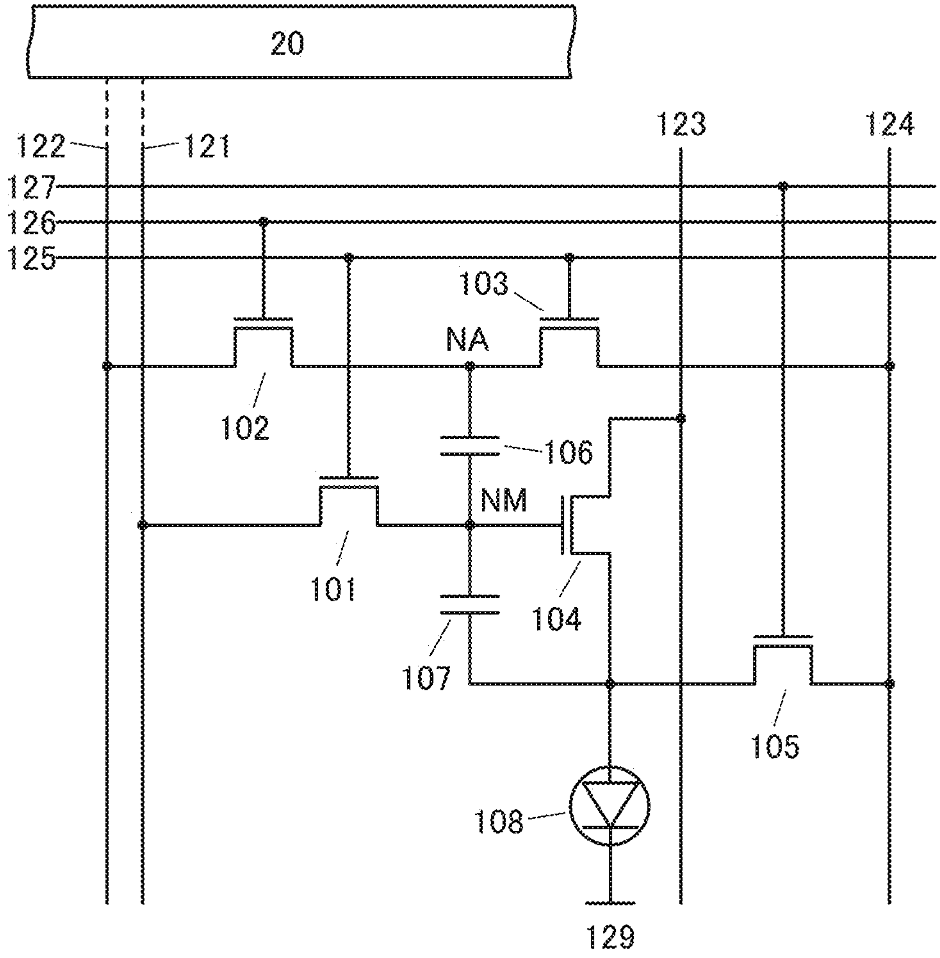
FIG. 2 is a diagram illustrating a pixel circuit.

As a specific example of the pixel 10, FIG. 2 shows a circuit diagram of a pixel including a light-emitting device. The pixel 10 includes a transistor 101, a transistor 102, a transistor 103, a transistor 104, a transistor 105, a capacitor 106, a capacitor 107, and a light-emitting device 108.

One of a source and a drain of the transistor 101 is electrically connected to one electrode of the capacitor 106. The other electrode of the capacitor 106 is electrically connected to one of a source and a drain of the transistor 102. The one of the source and the drain of the transistor 102 is electrically connected to one of a source and a drain of the transistor 103. The one electrode of the capacitor 106 is electrically connected to a gate of the transistor 104. One of a source and a drain of the transistor 104 is electrically connected to one of a source and a drain of the transistor 105. The one of the source and the drain of the transistor 105 is electrically connected to one electrode of the light-emitting device 108. The one electrode of the light-emitting device 108 is electrically connected to one electrode of the capacitor 107. The other electrode of the capacitor 107 is electrically connected to the gate of the transistor 104.

Connections between the components of the pixels 10 and a variety of wirings are described. A gate of the transistor 101 is electrically connected to a wiring 125. A gate of the transistor 102 is electrically connected to a wiring 126. A gate of the transistor 103 is electrically connected to the wiring 125. A gate of the transistor 105 is electrically connected to a wiring 127.

The other of the source and the drain of the transistor 101 is electrically connected to a wiring 121. The other of the source and the drain of the transistor 102 is electrically connected to a wiring 122. The other of the source and the drain of the transistor 103 is electrically connected to a wiring 124. The other of the source and the drain of the transistor 104 is electrically connected to a wiring 123. The other of the source and the drain of the transistor 105 is electrically connected to the wiring 124. The other electrode of the light-emitting device 108 is electrically connected to a wiring 129.

The wirings 125, 126, and 127 each have a function of a gate line and can be electrically connected to the gate driver

30 (see FIG. 1). The wirings 121 and 122 each have a function of a source line and can be electrically connected to the source driver 20.

The wirings 123 and 129 can each have a function of a power supply line. For example, when a high potential is supplied to the wiring 123 and a low potential is supplied to the wiring 129, the light-emitting device 108 can perform a forward bias operation (light emission).

The wiring 124 can have a function of being supplied with a reference potential ($V_{ref}$). For example, 0 V, a GND potential, or the like can be used as "$V_{ref}$". Alternatively, "$V_{ref}$" may be a particular potential.

Here, a wiring that connects the one of the source and the drain of the transistor 101, the one electrode of the capacitor 106, the other electrode of the capacitor 107, and the gate of the transistor 104 is referred to as a node NM. A wiring that connects the one of the source and the drain of the transistor 102, the other electrode of the capacitor 106, and the one of the source and the drain of the transistor 103 is referred to as a node NA.

The transistor 101 can have a function of writing the potential of the wiring 121 to the node NM. The transistor 102 can have a function of writing the potential of the wiring 122 to the node NA. The transistor 103 can have a function of supplying the reference potential ($V_{ref}$) to the node NA. The transistor 104 can have a function of controlling a current flowing into the light-emitting device 108 in accordance with the potential of the node NM. The transistor 105 can have a function of fixing the source potential of the transistor 104 in data writing to the node NM and a function of controlling the timing of the operation of the light-emitting device 108.

The node NM is connected to the node NA through the capacitor 106. Thus, when the node NM is in a floating state, the amount of the change in potential of the node NA can be added by capacitive coupling. The addition of the potential in the node NM is described below.

In the pixel 10, first, the first data (weight: "W") is written to the node NM. At this time, the reference potential "$V_{ref}$" is supplied to the node NA, and the capacitor 106 is made to retain "$W-V_{ref}$". Next, the node NA is set to be floating and the second data (data: "D") is supplied to the node NA.

At this time, when the capacitance value of the capacitor 106 is $C_{106}$ and the capacitance value of the node NM is $C_{NM}$, the potential of the node NM becomes $W+(C_{106}/(C_{106}+C_{NM}))\times(D-V_{ref})$. Here, when the value of $C_{106}$ is increased so that the value of $C_{NM}$ can be ignored, $C_{106}/(C_{106}+C_{NM})$ becomes close to 1, and the potential of the node NM can be regarded as "$W+D-V_{ref}$".

Therefore, when "W"="D", "$V_{ref}$"=0 V, and $C_{106}$ is sufficiently larger than $C_{NM}$, the potential of the node NM becomes close to "2D". In other words, the third data ("2D"), which is a potential approximately twice the output of the source driver 20, can be supplied to the node NM.

Note that when "$V_{ref}$" is "−W" or "−D", the potential of the node NM can be close to "3D" too.

A required voltage can be generated in the pixel 10 by the action even when the output voltage of the source driver 20 is low, so that the light-emitting device 108 can operate appropriately.

The node NM and the node NA function as retention nodes. When the transistor connected to the corresponding node is turned on, data can be written to the node. When the transistor is turned off, the data can be retained in the node. The use of a transistor with an extremely low off-state current as the transistor enables leakage current to be reduced and the potential of the node to be retained for a long time. As the transistor, a transistor using a metal oxide in a channel formation region (hereinafter, OS transistor) is preferably used, for example.

Specifically, OS transistors are preferably used as any or all of the transistors 101, 102, and 103. Alternatively, OS transistors may be used as all of the transistors included in the pixel 10. In the case of operating within a range where the amount of leakage current is acceptable, a transistor containing Si in a channel formation region (hereinafter, Si transistor) may be used. Alternatively, an OS transistor and a Si transistor may be used together. Examples of the Si transistor include a transistor containing amorphous silicon and a transistor containing crystalline silicon (microcrystalline silicon, low-temperature polysilicon, or single crystal silicon).

As a semiconductor material used for an OS transistor, a metal oxide whose energy gap is greater than or equal to 2 eV, preferably greater than or equal to 2.5 eV, more preferably greater than or equal to 3 eV can be used. A typical example is an oxide semiconductor containing indium, and a CAAC-OS or a CAC-OS described later can be used, for example. A CAAC-OS has a crystal structure including stable atoms and is suitable for a transistor that is required to have high reliability, and the like. A CAC-OS has high mobility and is suitable for a transistor that operates at high speed, and the like.

In the OS transistor, the semiconductor layer has a large energy gap, and thus the OS transistor can have an extremely low off-state current of several yA/μm (current per micrometer of a channel width). An OS transistor has features such that impact ionization, an avalanche breakdown, a short-channel effect, or the like does not occur, which are different from those of a Si transistor. Thus, the use of an OS transistor enables formation of a highly reliable circuit. Moreover, variations in electrical characteristics due to crystallinity unevenness, which are caused in Si transistors, are less likely to occur in OS transistors.

The semiconductor layer included in the OS transistor can be, for example, a film represented by an In-M-Zn-based oxide that contains indium, zinc, and M (M is a metal such as aluminum, titanium, gallium, germanium, yttrium, zirconium, lanthanum, cerium, tin, neodymium, or hafnium). The In-M-Zn-based oxide can be typically formed by a sputtering method. Alternatively, the In-M-Zn-based oxide can be formed by an ALD (Atomic layer deposition) method.

It is preferable that the atomic ratio of metal elements of a sputtering target used for forming the In-M-Zn-based oxide by a sputtering method satisfy In M and Zn M. The atomic ratio between metal elements in such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, or In:M:Zn=5:1:8. Note that the atomic ratio between metal elements in the deposited semiconductor layer may vary from the above atomic ratio between metal elements in the sputtering target in a range of ±40%.

An oxide semiconductor with low carrier density is used for the semiconductor layer. For example, an oxide semiconductor whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, yet further preferably lower than $1\times10^{10}/cm^3$, and higher than or equal to $1\times10^{-9}/cm^3$ can be used for the semiconductor layer. Such an oxide semiconductor is referred to as a highly purified intrinsic or substantially highly purified intrinsic oxide semiconductor. The oxide semiconductor has a low density of defect states and can thus be regarded as an oxide semiconductor having stable characteristics.

Note that, examples of a material for the semiconductor layer are not limited to those described above, and a material with an appropriate composition may be used in accordance with required semiconductor characteristics and electrical characteristics (e.g., field-effect mobility and threshold voltage) of the transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When the oxide semiconductor in the semiconductor layer contains silicon or carbon, which is an element belonging to Group 14, the amount of oxygen vacancies is increased in the semiconductor layer, and the semiconductor layer becomes n-type. Thus, the concentration of silicon or carbon (the concentration obtained by secondary ion mass spectrometry (SIMS)) in the semiconductor layer is set to $2\times10^{18}$ atoms/cm$^3$ or lower, preferably $2\times10^{17}$ atoms/cm$^3$ or lower.

An alkali metal and an alkaline earth metal might generate carriers when bonded to an oxide semiconductor, in which case the off-state current of the transistor might be increased. Thus, the concentration of alkali metal or alkaline earth metal in the semiconductor layer (the concentration obtained by SIMS) is set to $1\times10^{18}$ atoms/cm$^3$ or lower, preferably $2\times10^{16}$ atoms/cm$^3$ or lower.

When the oxide semiconductor in the semiconductor layer contains nitrogen, electrons functioning as carriers are generated and the carrier density increases, so that the semiconductor layer easily becomes n-type. Thus, a transistor using an oxide semiconductor that contains nitrogen is likely to be normally on. Hence, the concentration of nitrogen in the semiconductor layer (the concentration obtained by SIMS) is preferably set to $5\times10^{18}$ atoms/cm$^3$ or lower.

Specifically, when hydrogen is contained in an oxide semiconductor included in the semiconductor layer, hydrogen reacts with oxygen bonded to a metal atom to be water, and thus sometimes causes an oxygen vacancy in the oxide semiconductor. If the channel formation region in the oxide semiconductor includes oxygen vacancies, the transistor sometimes has normally-on characteristics. In some cases, a defect that is an oxygen vacancy into which hydrogen enters functions as a donor and generates an electron serving as a carrier. In other cases, bonding of part of hydrogen to oxygen bonded to a metal atom generates electrons serving as carriers. Thus, a transistor including an oxide semiconductor that contains a large amount of hydrogen is likely to have normally-on characteristics.

A defect in which hydrogen has entered an oxygen vacancy can function as a donor of the oxide semiconductor. However, it is difficult to evaluate the defects quantitatively. Thus, the defects in the oxide semiconductor are sometimes evaluated by not its donor concentration but its carrier concentration. Therefore, in this specification and the like, the carrier concentration assuming the state where an electric field is not applied is sometimes used, instead of the donor concentration, as the parameter of the oxide semiconductor. That is, “carrier concentration” in this specification and the like can be replaced with “donor concentration” in some cases.

Therefore, hydrogen in the oxide semiconductor is preferably reduced as much as possible. Specifically, the hydrogen concentration in the oxide semiconductor obtained by SIMS is lower than $1\times10^{20}$ atoms/cm$^3$, preferably lower than $1\times10^{19}$ atoms/cm$^3$, further preferably lower than $5\times10^{18}$ atoms/cm$^3$, and still further preferably lower than $1\times10^{18}$ atoms/cm$^3$. When an oxide semiconductor with a sufficiently low concentration of impurities such as hydrogen is used for a channel formation region of a transistor, the transistor can have stable electrical characteristics.

The semiconductor layer may have a non-single-crystal structure, for example. Examples of a non-single-crystal structure include a CAAC-OS (C-Axis Aligned Crystalline Oxide Semiconductor) including a c-axis aligned crystal, a polycrystalline structure, a microcrystalline structure, and an amorphous structure. Among the non-single-crystal structures, an amorphous structure has the highest density of defect states, whereas the CAAC-OS has the lowest density of defect states.

An oxide semiconductor film having an amorphous structure has disordered atomic arrangement and no crystalline component, for example. In another example, an oxide film having an amorphous structure has a completely amorphous structure and no crystal part.

Note that the semiconductor layer may be a mixed film including two or more of the following: a region having an amorphous structure, a region having a microcrystalline structure, a region having a polycrystalline structure, a region of CAAC-OS, and a region having a single crystal structure. The mixed film has, for example, a single-layer structure or a layered structure including two or more of the foregoing regions in some cases.

The composition of a CAC (Cloud-Aligned Composite)-OS, which is one embodiment of a non-single-crystal semiconductor layer, is described below.

The CAC-OS has, for example, a composition in which elements contained in an oxide semiconductor are unevenly distributed. Materials containing unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions containing the metal element(s) are mixed is referred to as a mosaic pattern or a patch-like pattern. The region has a size greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region containing $GaO_{X3}$ as a main component and a region containing $In_{X2}Zn_{Y2}O_{Z2}$ or $InO_{X1}$ as a main component are mixed. Note that in this specification, when the atomic ratio of In to an element M in a first region is greater than the atomic ratio of In to an element M in a second region, for example, the first region is described as having higher In concentration than the second region.

Note that a compound containing In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

The CAC-OS relates to the material composition of an oxide semiconductor. In a material composition of a CAC-OS containing In, Ga, Zn, and O, nanoparticle regions containing Ga as a main component are observed in part of the CAC-OS and nanoparticle regions containing In as a main component are observed in part thereof. These nanoparticle regions are randomly dispersed to form a mosaic pattern. Thus, the crystal structure is a secondary element for the CAC-OS.

Note that in the CAC-OS, a layered structure including two or more films with different atomic ratios is not included. For example, a two-layer structure of a film containing In as a main component and a film containing Ga as a main component is not included.

A boundary between the region containing $GaO_{X3}$ as a main component and the region containing $In_{X2}Zn_{Y2}O_{Z2}$ or $InO_{X1}$ as a main component is not clearly observed in some cases.

Note that in the case where one kind or a plurality of kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, the CAC-OS refers to a composition in which some regions that include the metal element(s) as a main component and are observed as nanoparticles and some regions that include In as a main component and are observed as nanoparticles are randomly dispersed in a mosaic pattern.

The CAC-OS can be formed by a sputtering method under a condition where a substrate is not heated intentionally, for example. In the case where the CAC-OS is formed by a sputtering method, one or more of an inert gas (typically, argon), an oxygen gas, and a nitrogen gas may be used as a deposition gas. The flow rate of the oxygen gas to the total flow rate of the deposition gas in deposition is preferably as low as possible; for example, the flow rate of the oxygen gas is higher than or equal to 0% and lower than 30%, preferably higher than or equal to 0% and lower than or equal to 10%.

The CAC-OS is characterized in that a clear peak is not observed when measurement is conducted using a θ/2θ scan by an out-of-plane method, which is an X-ray diffraction (XRD) measurement method. That is, it is found by the X-ray diffraction measurement that there are no alignment in the a-b plane direction and no alignment in the c-axis direction in the measured areas.

In an electron diffraction pattern of the CAC-OS that is obtained by irradiation with an electron beam with a probe diameter of 1 nm (also referred to as a nanometer-sized electron beam), a ring-like region (ring region) with high luminance and a plurality of bright spots in the ring region are observed. Thus, it is found from the electron diffraction pattern that the crystal structure of the CAC-OS includes an nc (nano-crystal) structure that does not show alignment in the plane direction and the cross-sectional direction.

For example, energy dispersive X-ray spectroscopy (EDX) is used to obtain EDX mapping, and according to the EDX mapping, the CAC-OS of the In—Ga—Zn oxide has a composition in which the region containing $GaO_{X3}$ as a main component and the region containing $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, the region containing $GaO_{X3}$ or the like as a main component and the region containing $In_{X2}Zn_{Y2}O_{Z2}$ or $InO_{X1}$ as a main component are separated to form a mosaic pattern.

The conductivity of the region containing $In_{X2}Zn_{Y2}O_{Z2}$ or $InO_{X1}$ as a main component is higher than that of the region containing $GaO_{X3}$ or the like as a main component. In other words, when carriers flow through the region containing $In_{X2}Zn_{Y2}O_{Z2}$ or $InO_{X1}$ as a main component, the conductivity of an oxide semiconductor is generated. Accordingly, when the regions containing $In_{X2}Zn_{Y2}O_{Z2}$ or $InO_{X1}$ as a main component are distributed like a cloud in an oxide semiconductor, high field-effect mobility (μ) can be achieved.

By contrast, the insulating property of the region containing $GaO_{X3}$ or the like as a main component is superior to that of the region containing $In_{X2}Zn_{Y2}O_{Z2}$ or $InO_{X1}$ as a main component. In other words, when the regions containing $GaO_{X3}$ or the like as a main component are distributed in an oxide semiconductor, leakage current can be suppressed and a favorable switching operation can be achieved.

Accordingly, when a CAC-OS is used in a semiconductor device, the insulating property derived from $GaO_{X3}$ or the like and the conductivity derived from $In_{X2}Zn_{Y2}O_{Z2}$ or $InO_{X1}$ complement each other, whereby a high on-state current ($I_{on}$) and a high field-effect mobility (μ) can be achieved.

A semiconductor device using a CAC-OS has high reliability. Thus, the CAC-OS is suitably used as a material in a variety of semiconductor apparatuses.

Figure 3A:
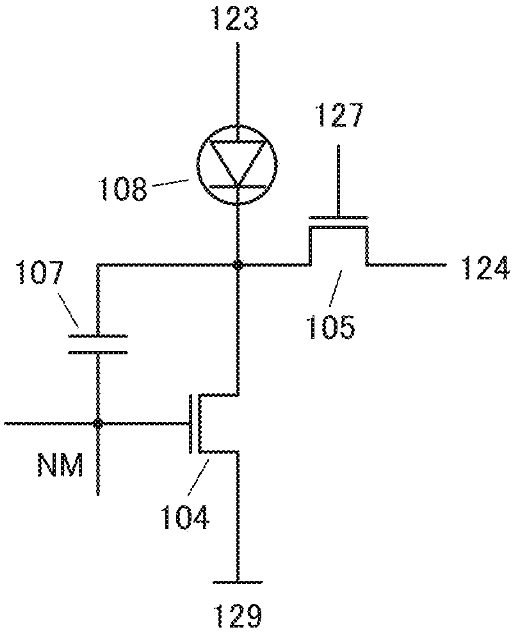
FIG. 3A to FIG. 3C are diagrams illustrating pixel circuits.

Note that the circuit configuration of the pixel 10 illustrated in FIG. 2 is an example, and for example, as illustrated in FIG. 3A, the one electrode of the light-emitting device 108 may be electrically connected to the wiring 123, and the other electrode of the light-emitting device 108 may be electrically connected to the other of the source and the drain of the transistor 104.

Figure 3B:
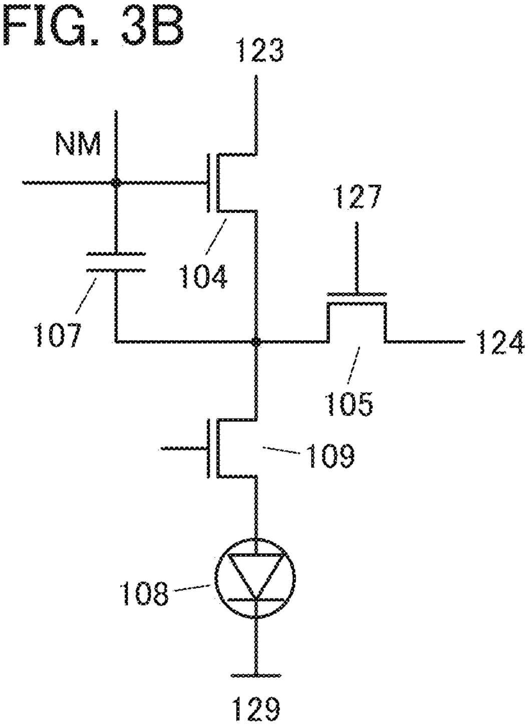

Alternatively, as illustrated in FIG. 3B, a transistor 109 may be provided between the one of the source and the drain of the transistor 104 and the one electrode of the light-emitting device 108. By providing the transistor 109, the timing of light emission can be controlled freely. Alternatively, the configurations illustrated in FIG. 3A and FIG. 3B can be combined.

Figure 3C:
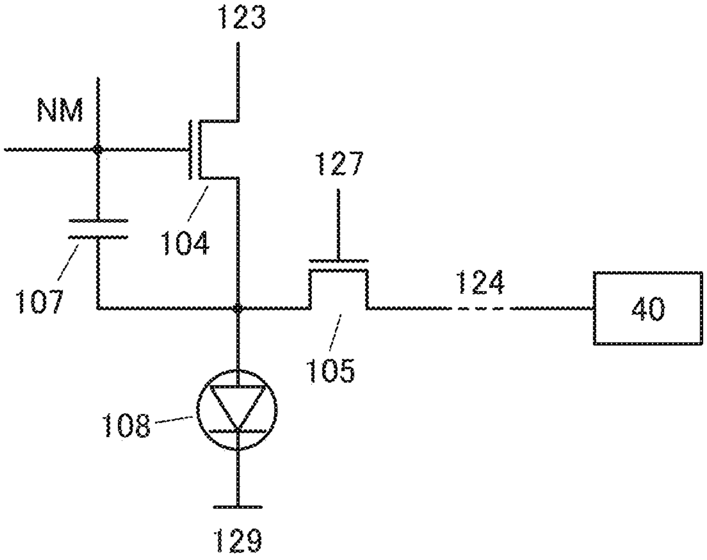

Furthermore, as illustrated in FIG. 3C, a circuit 40 can be electrically connected to the wiring 124 that is connected to the transistor 105. The circuit 40 can have one or more of a function of the supply source of the reference potential ($V_{ref}$), a function of obtaining electrical characteristics of the transistor 104, and a function of generating correction data.

Figure 4:
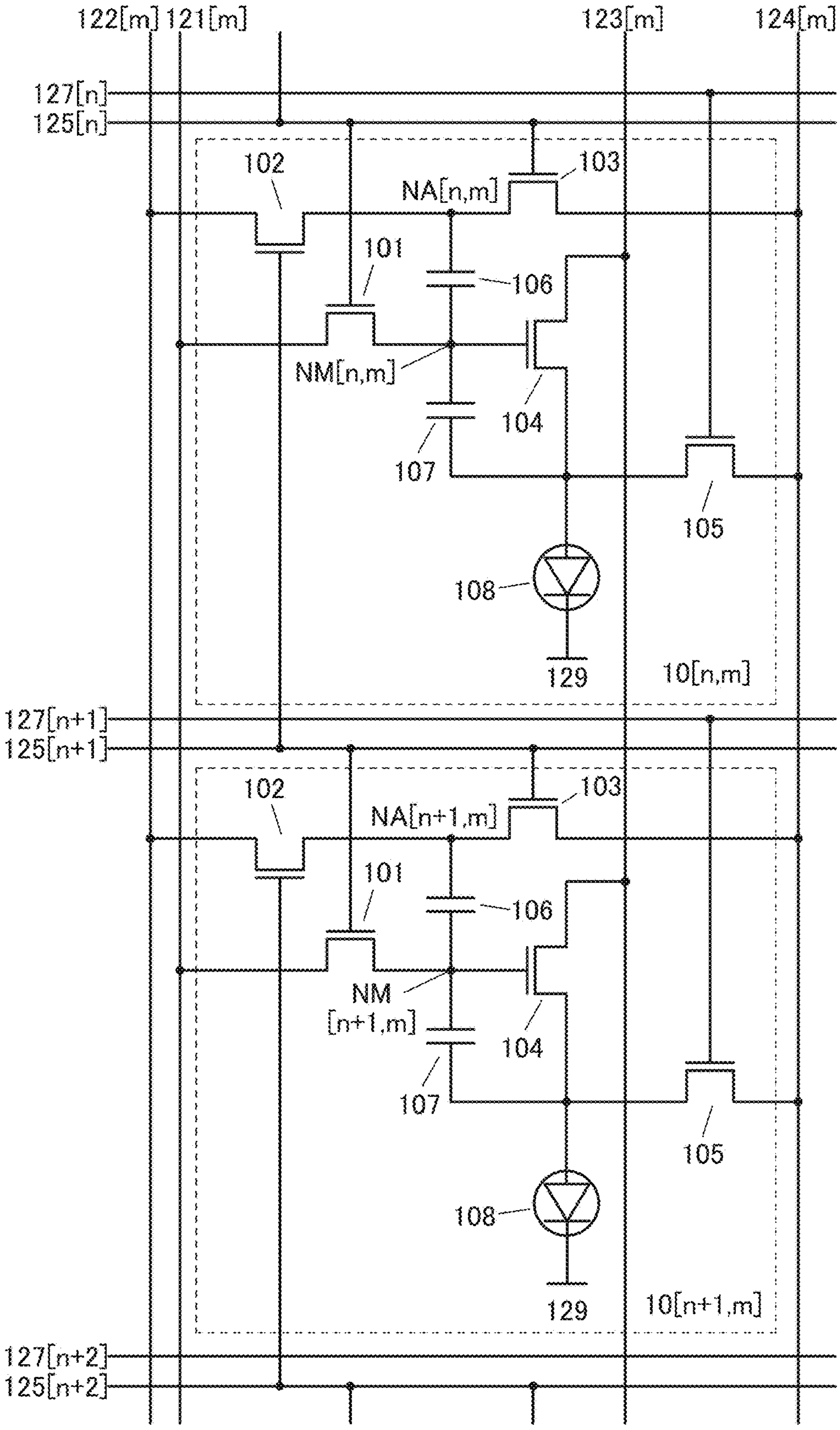
FIG. 4 is a diagram illustrating a pixel circuit.

Furthermore, as illustrated in FIG. 4, two pixels that are adjacent in the vertical direction (the direction in which the source lines (the wirings 121 and 122) extend) may have a common gate line (wiring 125). FIG. 4 is a diagram illustrating a pixel 10[*n,m*] arranged in the n-th row and the m-th column (n and m are each a natural number of greater than or equal to 1) and a pixel 10[*n*+1,m] arranged in the n+1-th row and the m-th column.

The gate of the transistor 102 of the pixel 10[*n,m*] is electrically connected to a wiring 125[*n*+1]. The gate of the transistor 101 and the gate of the transistor 103 of the pixel 10[*n*+1,m] are electrically connected to the wiring 125[*n*+1].

The gate of the transistor 102 of the pixel 10[*n*+1,m] is electrically connected to a wiring 125[*n*+2]. Although not illustrated, the gate of the transistor 101 and the gate of the transistor 103 of a pixel 10[*n*+2,m] are electrically connected to the wiring 125[*n*+2].

In the pixel 10 of one embodiment of the present invention, two writing operations that are the writing of first data (weight) and the writing of second data (data) are performed. Weight and data are supplied from different source lines; thus, in the two pixels that are adjacent in the vertical direction, the timing of the writing of data in one of the pixels can overlap with the timing of the writing of weight in the other of the pixels. Therefore, the gates of the transistors that perform these operations can be connected to a common gate line.

When a common gate line is used for two pixels, the number of gate lines for each pixel can be reduced from three to substantially two; thus, the aperture ratio of the pixel can be increased. Moreover, the operation of the gate driver can be simplified. Furthermore, the number of gate wirings that need the charging and discharging is reduced, so that the power consumption can also be reduced.

Figure 5:
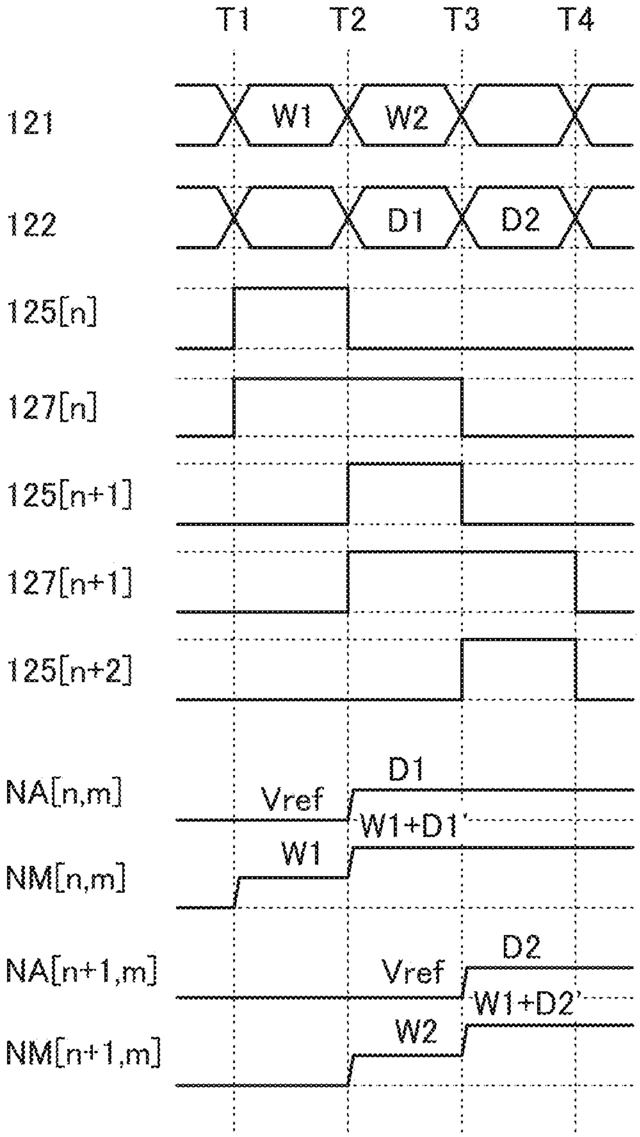
FIG. 5 is a timing chart showing the operation of a pixel circuit.

Next, the operation of the two pixels that are illustrated in FIG. 4 and include the common gate line is described with reference to a timing chart shown in FIG. 5. An example of operation in which a data potential that is approximately twice the data potential output from the source driver is supplied to the display device by the operation of the pixel 10 is described below.

In the operation description, a high potential is represented by "H" and a low potential is represented by "L". In addition, weight supplied to the pixel 10[*n,m*] is "W1", image data supplied to the pixel 10[*n,m*] is "D1", weight supplied to the pixel 10[*n*+1,m] is "W2", and image data supplied to the pixel 10[*n*+1,m] is "D2". As "$V_{ref}$", 0 V, a GND potential, or a certain potential can be used, for example.

Furthermore, suppose that the high potential is always supplied to the wiring 123, the low potential is always supplied to the wiring 129, and the reference potential ($V_{ref}$) is always supplied to the wiring 124. Note that there may be a period in which these potentials are not supplied, as long as the operation is not disturbed.

Note that in potential distribution, potential coupling, or potential loss, detailed changes due to a circuit structure, operation timing, or the like are not considered. A change in potential due to capacitive coupling using a capacitor depends on the capacitance ratio of the capacitor to a component connected thereto; however, for simplicity of the description, the capacitance value of the node NM is assumed to be sufficiently small.

From Time T1 to Time T2, "W1" is supplied to the wiring 121.

At Time T1, the potential of the wiring 125[*n*] is set to "H" and the potential of the wiring 127[n] is set to "H", whereby the transistor 103 is turned on in the pixel [n,m], so that the potential of a node NA[n,m] becomes "$V_{ref}$". This operation is a reset operation for an addition operation (capacitive coupling operation) to be performed later.

In addition, the transistor 101 is turned on, and the potential of the wiring 121[m] is written to a node NM[n,m]. This operation is an operation of writing weight in the pixel 10 [n,m], and a potential "W1" is written to the node NM[n,m]. Moreover, the transistor 105 is turned on, whereby the source potential of the transistor 104 becomes "$V_{ref}$". Thus, even when the transistor 104 is brought into an on state, the light-emitting device 108 does not emit light.

From Time T2 to Time T3, "W2" is supplied to the wiring 121 and "D1" is supplied to the wiring 122.

At Time T2, the potential of the wiring 125[*n*] is set to "L", the potential of the wiring 127[n] is set to "H", the potential of the wiring 125[*n*+1] is set to "H", and the potential of a wiring 127[n+1] is set to "H", whereby the transistor 101 is turned off. At this time, "W1" is retained in the node NM[n,m]. In addition, "$W_1-V_{ref}$" is retained in the capacitor 106.

Then, the transistor 103 is turned off and the transistor 102 is turned on, whereby the potential of the node NA[n,m] becomes "D1", the potential of the wiring 122[m]. At this time, "(D1−$V_{ref}$)'" corresponding to the capacitance ratio between the capacitor 106 and the node NM[n,m] is added to the node NM[n,m]. This operation is an addition operation in the pixel 10[*n,m*], and the potential of the node NM[n,m] becomes "W1+(D1−$V_{ref}$)'". At this time, when "$V_{ref}$"=0, the potential of the node NM[n,m] becomes "W1+D1".

At this time, the source potential of the transistor 104 is "$V_{ref}$", and a potential "W1+D1'" can be written to the node NM[n,m] while the source potential of the transistor 104 is in a stable state.

Moreover, in the pixel [n+1,m], the transistor 103 is turned on, whereby the potential of a node NA[n+1,m] becomes "$V_{ref}$". This operation is a reset operation for the addition operation (capacitive coupling operation) to be performed later.

In addition, the transistor 101 is turned on, and the potential of the wiring 121[m] is written to a node NM[n+1,m]. This operation is an operation of writing weight in the pixel 10[*n*+1,m], and a potential "W2" is written to the node NM[n+1,m]. Moreover, the transistor 105 is turned on, whereby the source potential of the transistor 104 becomes "$V_{ref}$". Thus, even when the transistor 104 is brought into an on state, the light-emitting device 108 does not emit light.

From Time T3 to Time T4, "D2" is supplied to the wiring 122.

At Time T3, the potential of the wiring 127[n] is set to "L", the potential of the wiring 125 [n+1] is set to "L", the potential of the wiring 127[n+1] is set to "H", and the potential of the wiring 125[*n*+2] is set to "H", whereby in the pixel 10[*n,m*], the transistor 105 is turned off, and current flows from the transistor 104 into the light-emitting device 108 in accordance with the potential of the node NM[n,m], so that the light-emitting device 108 emits light.

Furthermore, in the pixel 10[*n*+1,m], the transistor 103 is turned off and the transistor 102 is turned on, whereby the potential of the node NA[n+1,m] becomes "D2", the potential of the wiring 122[m]. At this time, "(D2−$V_{ref}$)'" corresponding to the capacitance ratio between the capacitor 106 and the node NM[n+1,m] is added to the node NM[n+1,m]. This operation is an addition operation in the pixel 10[*n*+1, m], and the potential of the node NM[n+1,m] becomes "W2+(D2−$V_{ref}$)'". At this time, when "$V_{ref}$"=0, the potential of the node NM[n+1,m] becomes "W2+D2'".

At this time, the source potential of the transistor 104 is "$V_{ref}$", and a potential "W1+D2'" can be written to the node NM[n+1,m] while the source potential of the transistor 104 is in a stable state.

At Time T4, the potential of the wiring 127[n+1] is set to "L" and the potential of the wiring 125[*n*+2] is set to "L", whereby in the pixel 10[*n*+1,m], the transistor 105 is turned off, and current flows from the transistor 104 into the light-emitting device 108 in accordance with the potential of the node NM[n+1,m], so that the light-emitting device 108 emits light.

In the above operation, in the case where W1=D1 or W2=D2 and the capacitance of the node NM is sufficiently smaller than the capacitance of the capacitor 106, "W1+D1'" becomes a value close to "2D1" and "W2+D2'" becomes a value close to "2D2". Thus, a data potential approximately twice the data potential output from the source driver can be supplied to the display device.

Figure 6A:
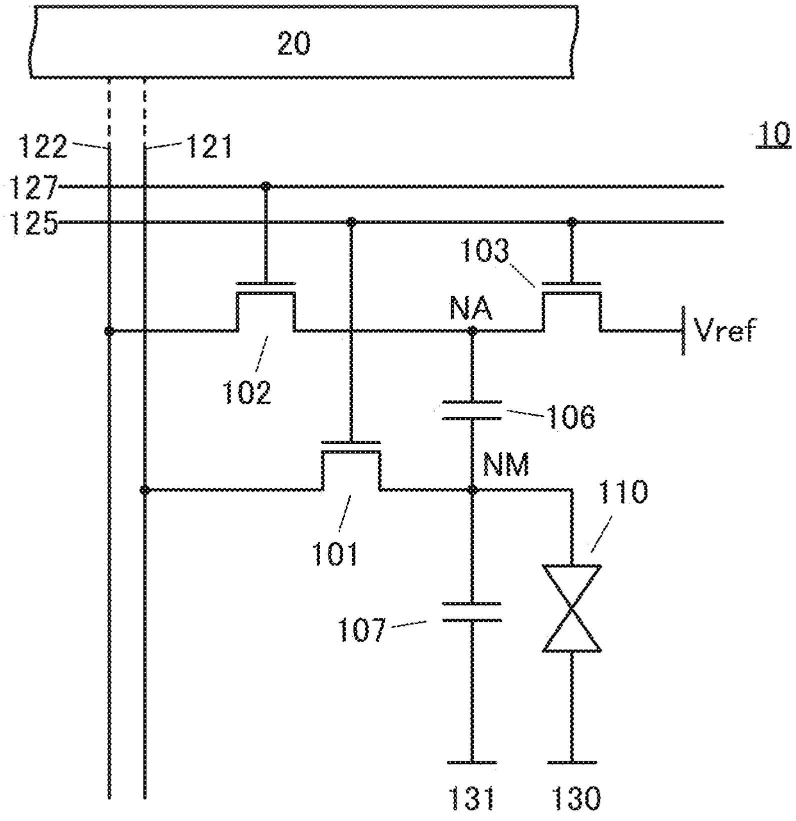
FIG. 6A to FIG. 6C are diagrams illustrating pixel circuits.

Although the example in which a light-emitting device is used in the pixel 10 has been described so far, a liquid crystal device may be used. FIG. 6A is a circuit diagram of the pixel 10 using a liquid crystal device as a display device. One electrode of a liquid crystal device 110 is electrically connected to the node NM, and the other electrode of the liquid crystal device 110 is electrically connected to a wiring 130. Furthermore, the other electrode of the capacitor 107 is electrically connected to a wiring 131.

Note that the wiring 130 and the wiring 131 may be electrically connected to each other. The wirings 130 and 131 have a function of supplying power. The wirings 130 and 131 are capable of supplying a reference potential such as GND or 0 V or a given potential, for example.

Figure 6B:
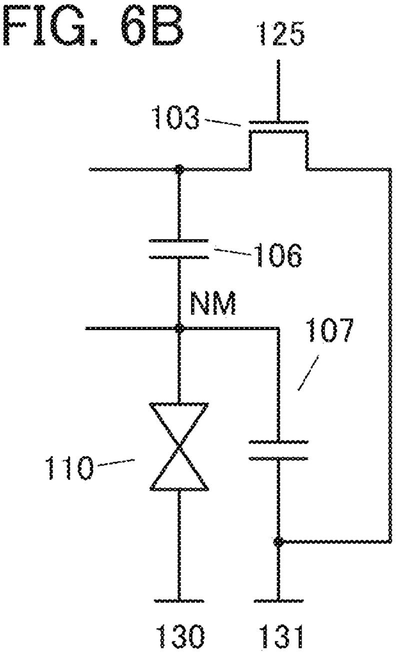

As a wiring for supplying "$V_{ref}$" that is connected to the other of the source and the drain of the transistor 103, the wiring 131 can be used as illustrated in FIG. 6B. Alternatively, the wiring 130 may be used.

Figure 6C:
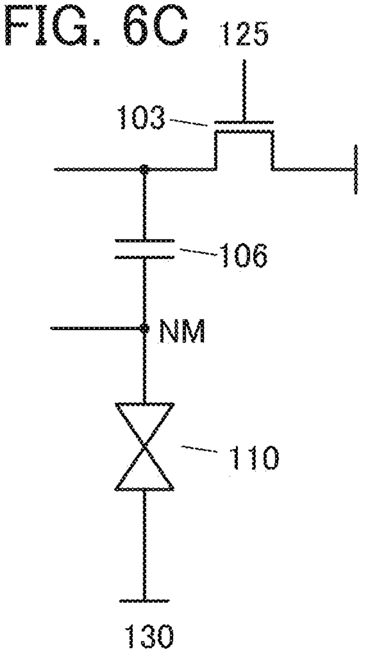

Note that a structure in which the capacitor 107 is omitted may be employed as illustrated in FIG. 6C. As described above, an OS transistor can be used as the transistor connected to the node NM. Since an OS transistor has an extremely low leakage current, an image can be displayed for a comparatively long time even when the capacitor 107 functioning as a storage capacitor is omitted. In addition, regardless of the transistor structure, omitting the capacitor 107 is effective in the case where a high-speed operation allows a shorter display period as in field-sequential driving. The aperture ratio can be improved by omitting the capacitor 107. Alternatively, the transmittance in the pixel can be improved.

Figure 7:
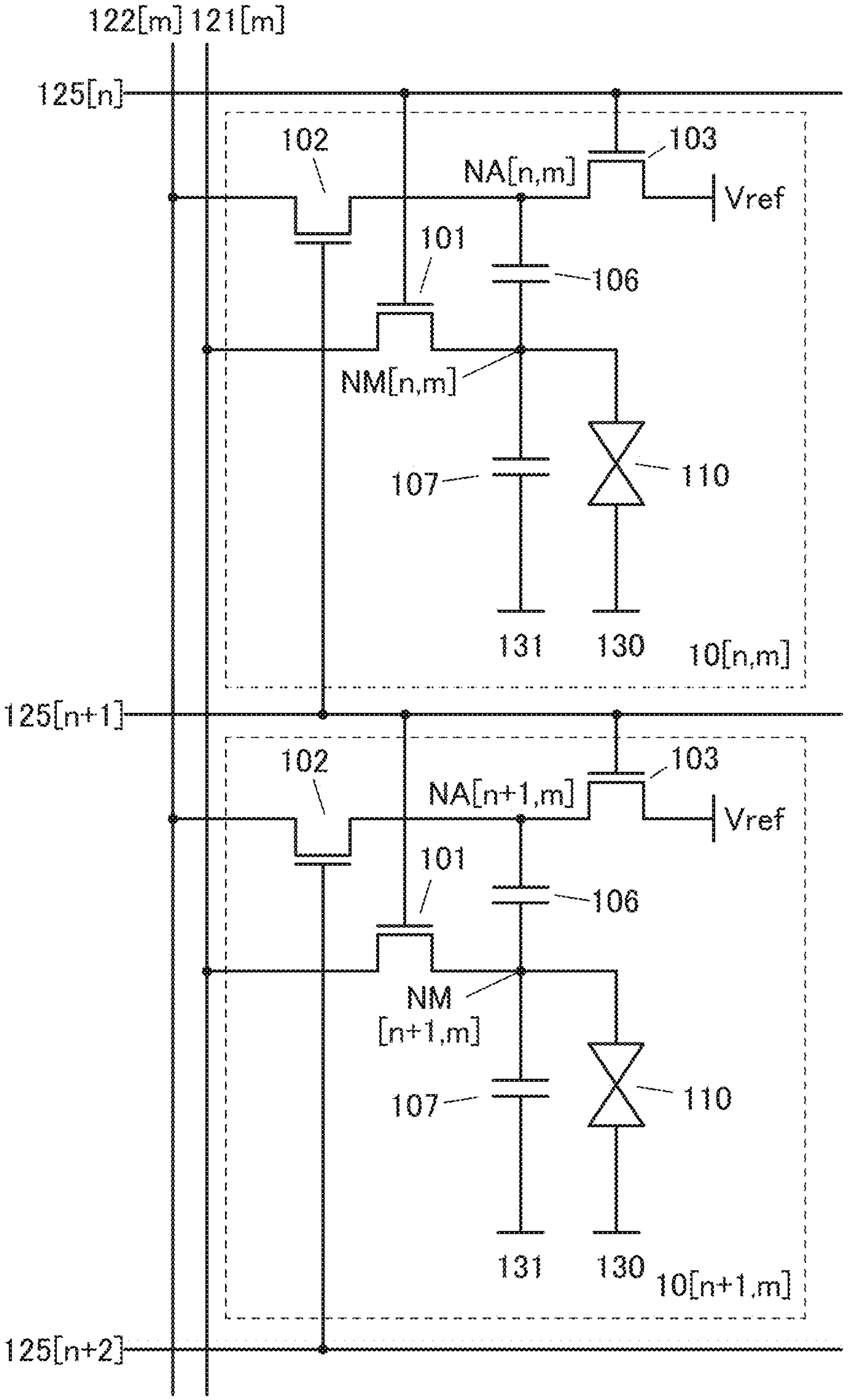
FIG. 7 is a diagram illustrating a pixel circuit.

Moreover, even in the case where a liquid crystal device is used, a common gate line can be used for two pixels in the vertical direction as in FIG. 4. As illustrated in FIG. 7, in the case where a liquid crystal device is used, when the gate line is common between the two pixels, the number of gate lines for each pixel can be reduced from two to substantially one. The operation of the case where a light-emitting device is used can be referred to for the description of the operation of adding a potential in the node NM.

Figure 8:
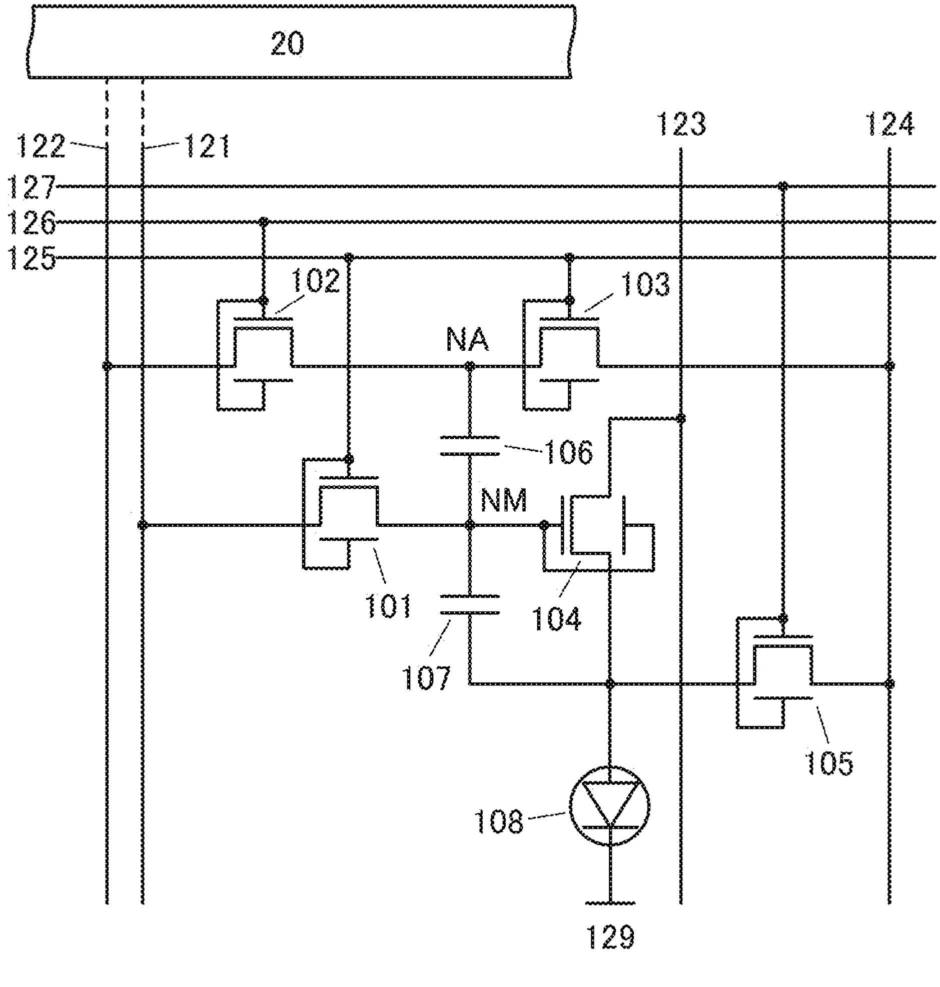
FIG. 8 is a diagram illustrating a pixel circuit.

In the pixel 10 of one embodiment of the present invention, as illustrated in FIG. 8, a configuration in which transistors are provided with back gates may be employed. FIG. 8 illustrates a configuration in which back gates are electrically connected to front gates, which has an effect of increasing on-state currents. Alternatively, a configuration in which the back gates are electrically connected to wirings capable of supplying a constant potential may be employed. This structure enables control of the threshold voltages of the transistors.

Figure 9:
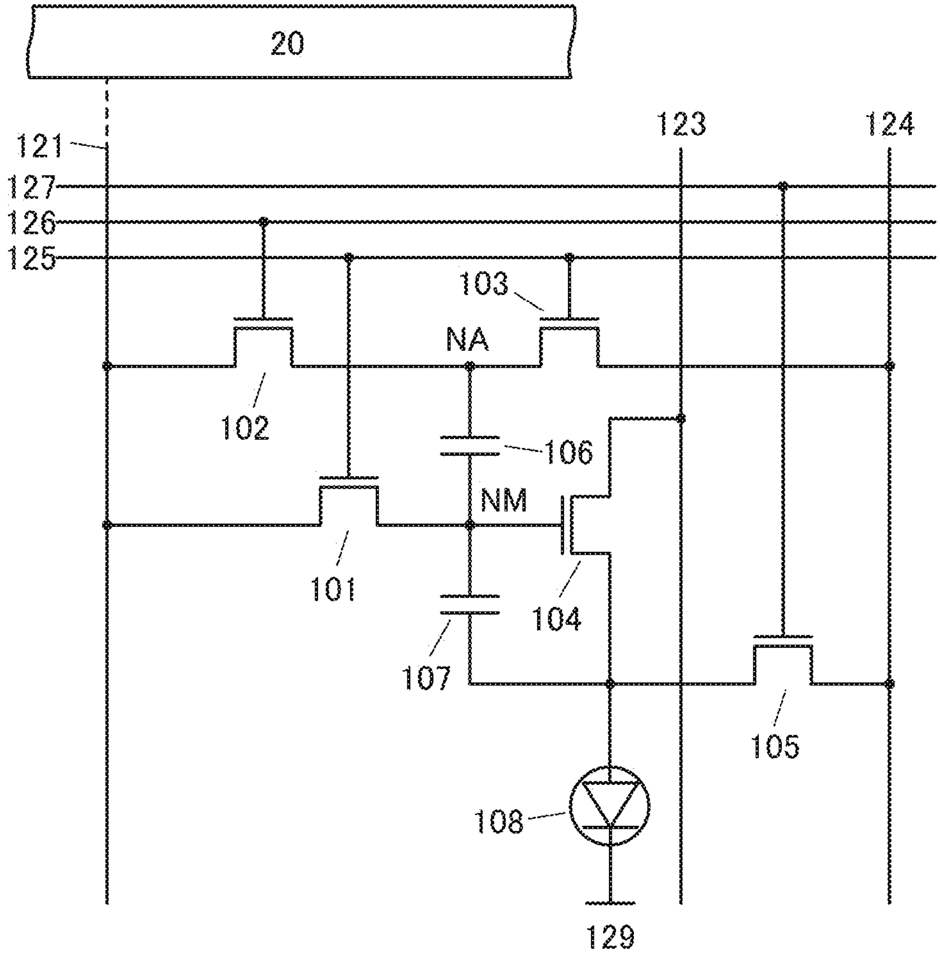
FIG. 9 is a diagram illustrating a pixel circuit.

Moreover, in the pixel 10 of one embodiment of the present invention, as illustrated in FIG. 9, a configuration in which one source line is provided may be employed. Since weight and data are written at different timings in the pixel 10, a common source line can be used to supply them.

Figure 10C:
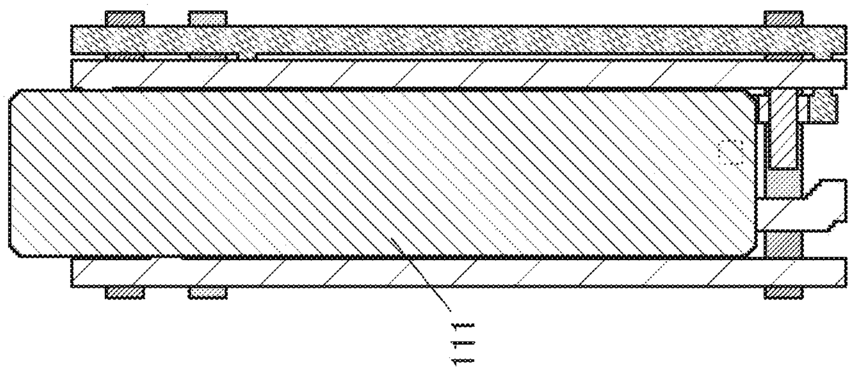
FIG. 10A to FIG. 10C are diagrams illustrating a pixel layout.
Figure 10B:
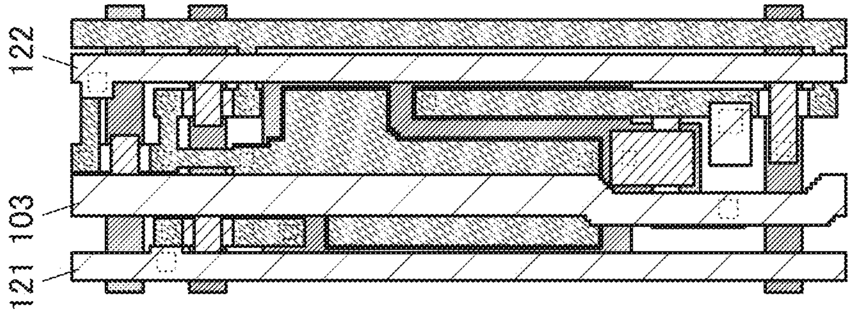
Figure 10A:
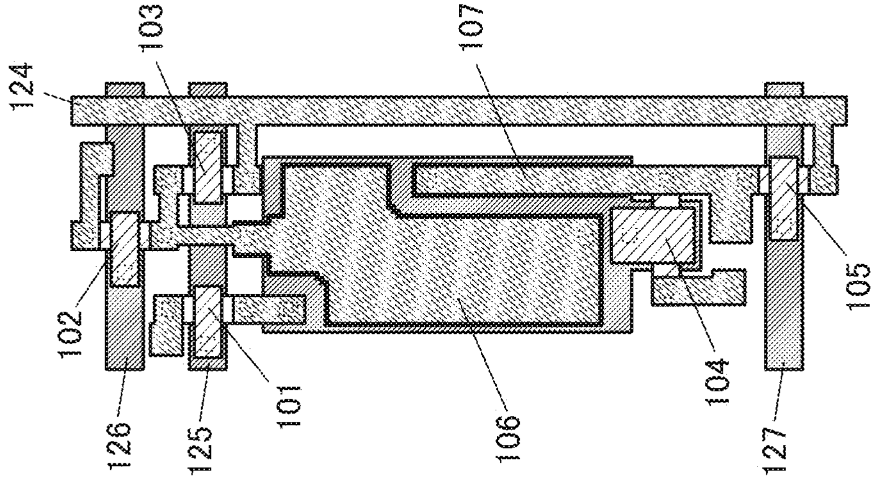

FIG. 10A, FIG. 10B, and FIG. 10C illustrate layout examples of the pixel 10 in which a light-emitting device is used as the display device. FIG. 10A is a diagram illustrating the arrangement and the structure of the transistors and the capacitors and illustrates a stack of a gate wiring, a semiconductor layer (a metal oxide layer), and source-drain wirings.

Each of the transistors 101 to 105 has a top-gate self-aligned structure and includes a back gate. The back gate also functions as a gate wiring. Each of the capacitors 106 and 107 is formed of a conductive layer formed in the same step as that of the gate wiring, an insulating layer formed in the same step as that of a gate insulating film for the back gate, and a conductive layer (a conductive metal oxide layer) formed in the same step as that of the semiconductor layer (the metal oxide layer) of the transistor.

As well as the source region and the drain region of the transistor, the conductive metal oxide layer can be formed as follows: impurities and the like are introduced into a metal oxide layer to increase its carrier concentration. Note that the resistance value of the conductive metal oxide layer functioning as one electrode of the capacitor is easily varied, and the resistance is not as low as that of the metal layer; thus, the conductive metal oxide layer is preferably electrically connected to a conductive layer that is formed in the same step as that of the source-drain wirings formed to overlap with the conductive metal oxide layer so that the function of the wiring is assisted.

FIG. 10B illustrates a structure in which a wiring layer (a source wiring and a power supply line) is provided over the stack in FIG. 10A. FIG. 10C illustrates a structure in which a pixel electrode 111 is provided over the stack in FIG. 10B. The light-emitting device can use the pixel electrode 111 as one electrode and include, for example, a light-emitting layer provided between the pixel electrode 111 and an opposite common electrode.

Figure 11A:
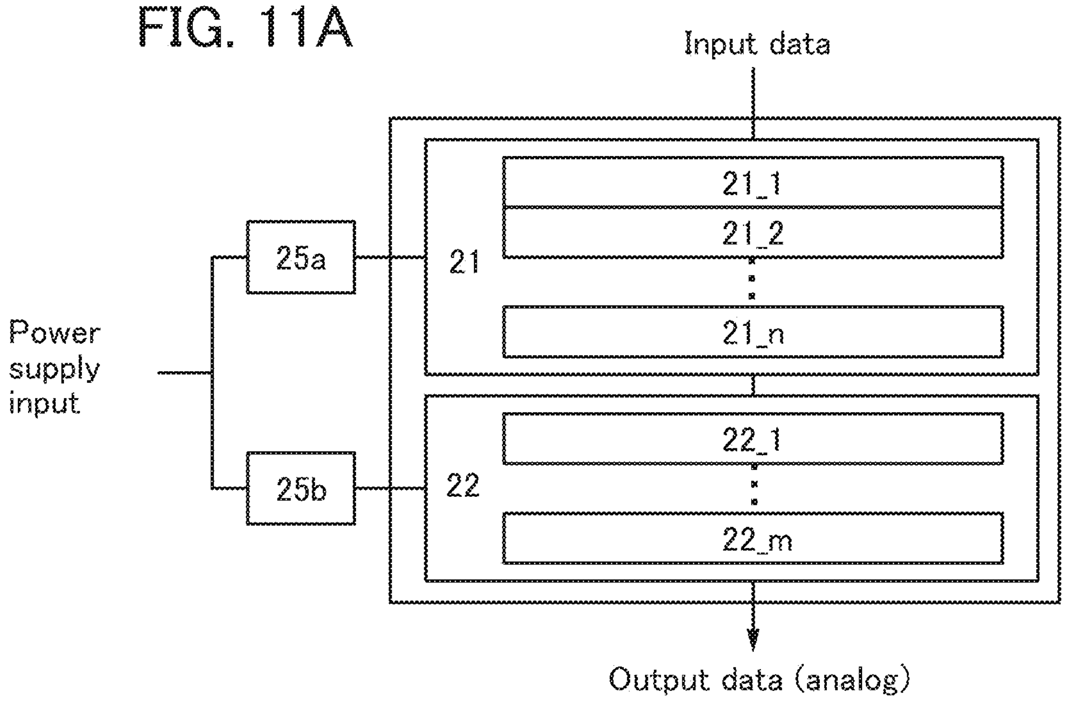
FIG. 11A is a diagram illustrating a source driver.
Figure 11B:
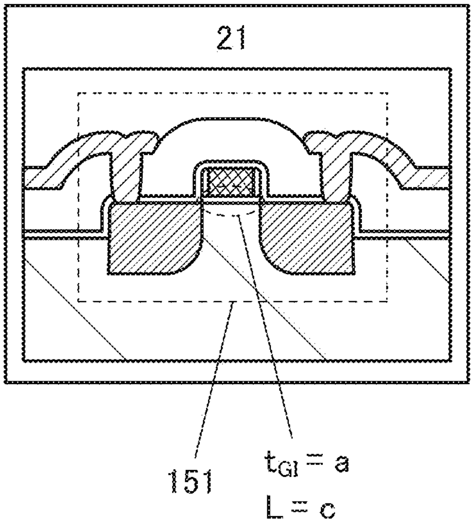
FIG. 11B and FIG. 11C are diagrams illustrating transistors.
Figure 11C:
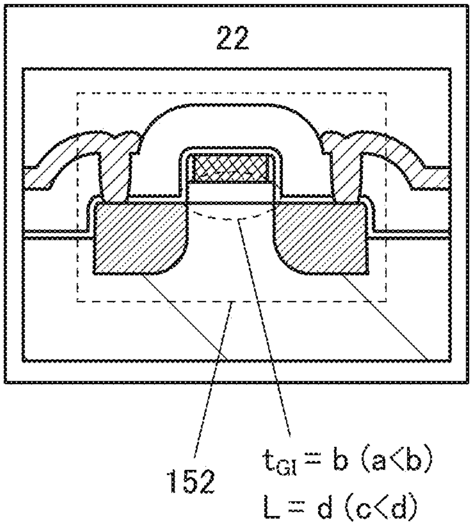

Next, the source driver 20 of one embodiment of the present invention is described. FIG. 11A is a block diagram illustrating a conventional source driver, and FIG. 11B and FIG. 11C are each a diagram illustrating a cross section of a transistor in the channel length direction. The source driver includes a logic unit and an amplifier unit. In the logic unit 21, circuits 21_1 to **21_*n* (n is a natural number of two or more) are provided. In the amplifier unit 22, circuits 22_1 to 22_*m*** (m is a natural number of two or more) are provided. Note that other circuits can also be provided in the source driver.

As the circuits 21_1 to **21_*n***, an input interface circuit, a serial-parallel converter circuit, a shift register circuit, a latch circuit, or the like can be provided, for example.

As the circuits 22_1 to **22*m***, a level shift circuit, a PTL, an amplifier circuit, or the like can be provided, for example.

A circuit that needs a high-speed operation, such as a shift register circuit, is included in the logic unit 21. Thus, as illustrated in FIG. 11B, a thickness ($t_{GI}$) of a gate insulating film of a transistor 151 included in the logic unit 21 is a thickness a, which is relatively small. Furthermore, as shown in Pelgrom Plot, a transistor having a relatively thin gate insulating film has small variations in operation; thus, the channel length (L) of the transistor can be a length c, which is relatively short. Thus, a low voltage operation is possible, and the power consumption of the logic unit 21 is relatively low.

In contrast, in the amplifier unit 22, a circuit that outputs a relatively high voltage, such as an amplifier circuit, is included. To output a high voltage, an increase in a gate voltage is needed. Thus, as illustrated in FIG. 11C, a thickness ($t_{GI}$) of a gate insulating film of a transistor 152 included in the amplifier unit 22 needs to be a thickness b ($a<b$), which is relatively large, to increase the withstand voltage. Furthermore, as shown in Pelgrom Plot, a transistor having a relatively thick gate insulating film has great variations in operation; thus, the channel length (L) of the transistor needs to be a length d ($c<d$), which is relatively long, to reduce variations in output.

As described above, the logic unit 21 and the amplifier unit 22 have different transistor structures. Particularly when transistors having gate insulating films with different thicknesses are in one chip (or over one substrate), the manufacturing steps are increased, leading to an increase in cost.

Furthermore, the logic unit and the amplifier unit have different power supply voltages. Thus, as illustrated in FIG. 11A, for example, a power supply circuit 25*a* that outputs a low voltage is connected to the logic unit 21, and a power supply circuit 25*b* that outputs a high voltage is connected to the amplifier unit 22. The circuit configuration that outputs a plurality of voltages as described above can be one factor of an increase in cost.

Note that although a FIN-type transistor formed in a silicon substrate is illustrated as an example in each of FIG. 11B and FIG. 11C, the transistor may be a planar-type or SOI-type transistor. Alternatively, a transistor that is provided over an insulating substrate and includes single crystal silicon or polycrystalline silicon in a channel formation region may be used. Alternatively, a transistor that is provided over an insulating substrate and includes a metal oxide in a channel formation region may be used. Any of the transistors also has the above-described problems.

Figure 12A:
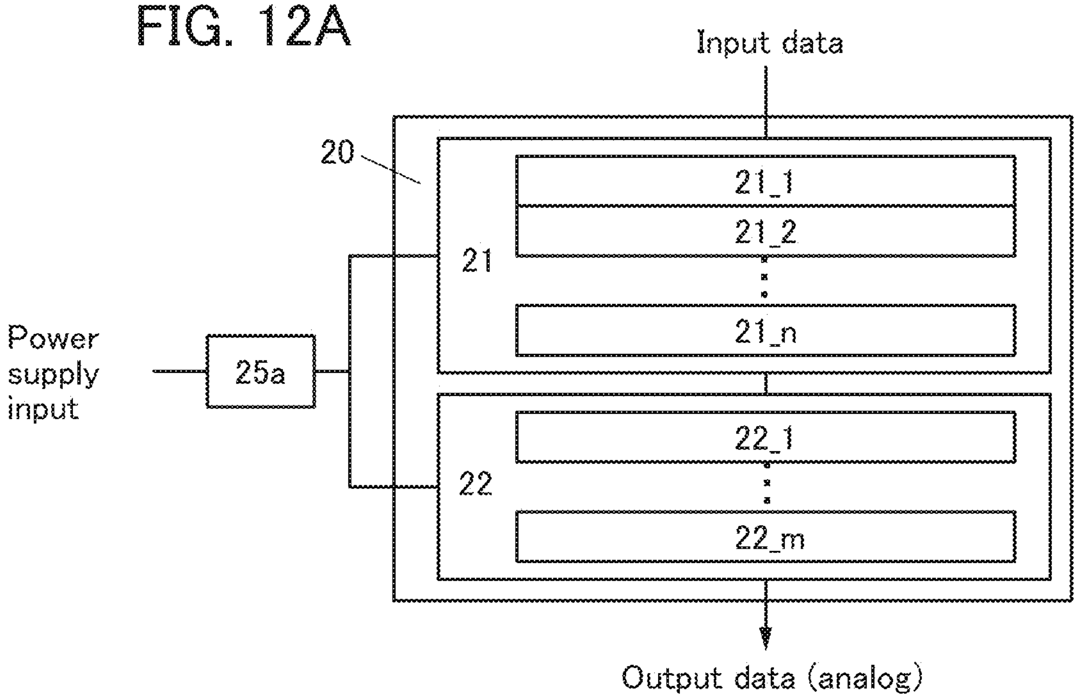
FIG. 12A is a diagram illustrating a source driver.
Figure 12B:
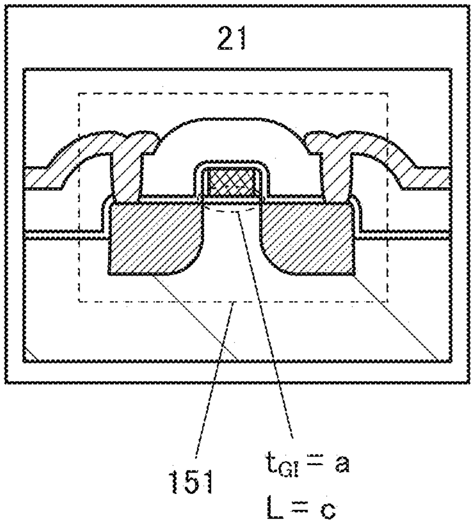
FIG. 12B and FIG. 12C are diagrams illustrating transistors.
Figure 12C:
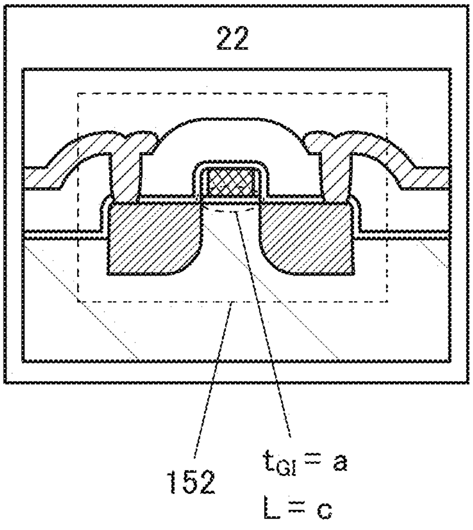

FIG. 12A is a block diagram illustrating the source driver 20 of one embodiment of the present invention, and FIG. 12B and FIG. 12C are each a diagram illustrating a cross section of a transistor in the channel length direction. The logic unit 21, the amplifier unit 22, and other circuits may be included as the circuits provided in the source driver 20, as in the conventional source driver illustrated in FIG. 11A.

The source driver 20 of one embodiment of the present invention differs from the conventional source driver in that the power supply circuit 25*a* that outputs a low voltage is connected also to at least the amplifier unit 22. The power supply circuit 25*a* may be connected to all of the circuits included in the source driver 20. Alternatively, a structure may be employed in which all the circuits included in the source driver 20 can operate at the same low voltage.

As illustrated in FIG. 12B and FIG. 12C, a transistor having a thin gate insulating film and a short channel length can be used also for a transistor used in the amplifier unit 22, as in the logic unit 21. As a result, power consumption of the amplifier unit 22 can be reduced.

Moreover, the same transistor can be used also for a digital-analog converter circuit, a bias generation circuit, and the like included in the source driver 20. Therefore, the power consumption of the entire source driver 20 can be extremely low.

Moreover, since the transistors included in the logic unit 21 and the amplifier unit 22 can have the gate insulating films having the same thickness, the manufacturing steps can be greatly reduced, leading to a reduction in a manufacturing cost.

Moreover, since it becomes unnecessary to provide the power supply circuit 25*b* that is for the amplifier unit 22 and is needed for the conventional source driver, the above-described factor of an increase in cost can be removed. Note that a plurality of power supply circuits 25*a* may be connected to the source driver 20.

The use of the gate insulating films having the same thickness for the transistors included in the logic unit 21 and the transistors included in the amplifier unit 22, which are described above, is a big advantage in the manufacturing process. Here, the same thickness is a thickness of a result in the case where separate formation is not made.

When the design rule of the transistors included in the source driver 20 is several nanometers to several hundred nanometers, the thickness of the gate insulating film is several nanometers to several ten nanometers, for example. Alternatively, the thickness of the gate insulating film is less than or equal to 1 nm in some cases. With such a thickness level, a certain number of variations in the thicknesses of the gate insulating films occurs due to the unevenness of a base over which the gate insulating film is provided even when the gate insulating films are manufactured in the same step. These can be observed by a cross-sectional TEM observation or the like.

In view of the above, in the source driver 20, in the case where the transistor included in one of the logic unit and the amplifier unit includes a region of a gate insulating film having a thickness of a, and the other transistor includes a region of a gate insulating film having a thickness of greater than or equal to 0.8α and less than or equal to 1.2a, it can be regarded that separate formation of the gate insulating films is not made as in the one embodiment of the present invention. When a more stable step is used, the transistors can be manufactured so that the transistor included in one of the logic unit and the amplifier unit includes a region of a gate insulating film having a thickness of a, and the other transistor includes a region of a gate insulating film having a thickness of greater than or equal to 0.9α and less than or equal to 1.1α.

The above is the description of the source driver 20 of one embodiment of the present invention. The logic unit and the amplifier unit included in the source driver 20 can operate at lower than or equal to 3.3 V, for example. As described above, although the source driver 20 is capable of low power consumption operation, its output voltage is small; thus, it is difficult to operate the display device appropriately with normal pixels. The combination of the source driver 20 and the above-described pixel 10 enables a display apparatus having an extremely low power consumption to be provided.

Furthermore, in a high-resolution display apparatus having 4K2K, 8K4K, or more pixels, when the display portion is larger, an effect of reduction in power consumption becomes greater. When the number of the pixels is larger, the number of writing in one frame period becomes larger, and when the size of the display portion is larger, the power for charging and discharging the source line becomes larger; thus, the effect of the low voltage operation is shown significantly.

This embodiment can be implemented in an appropriate combination with the structures described in the other embodiments and Example.

Embodiment 2

In this embodiment, a structure example of a display apparatus using a liquid crystal device and a structure example of a display apparatus using a light-emitting device are described. Note that the description of the components, operations, and functions of the display apparatus described in Embodiment 1 is omitted in this embodiment.

The pixel described in Embodiment 1 can be used in the display apparatus described in this embodiment. Note that a scan line driver circuit and a signal line driver circuit which are described below correspond to the gate driver and the source driver, respectively. As the signal line driver circuit, the source driver described in Embodiment 1 can be used.

Figure 13A:
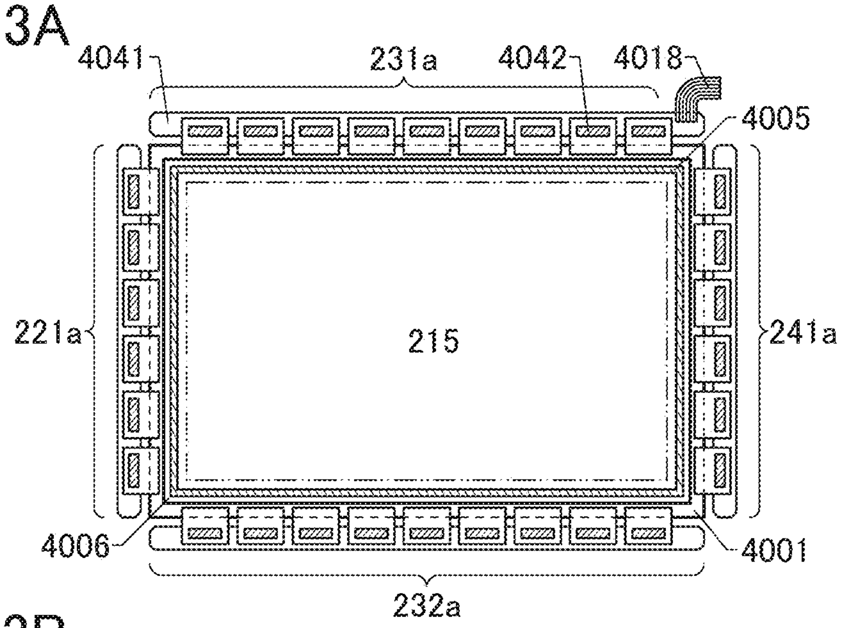
FIG. 13A to FIG. 13C are diagrams illustrating display apparatuses.
Figure 13B:
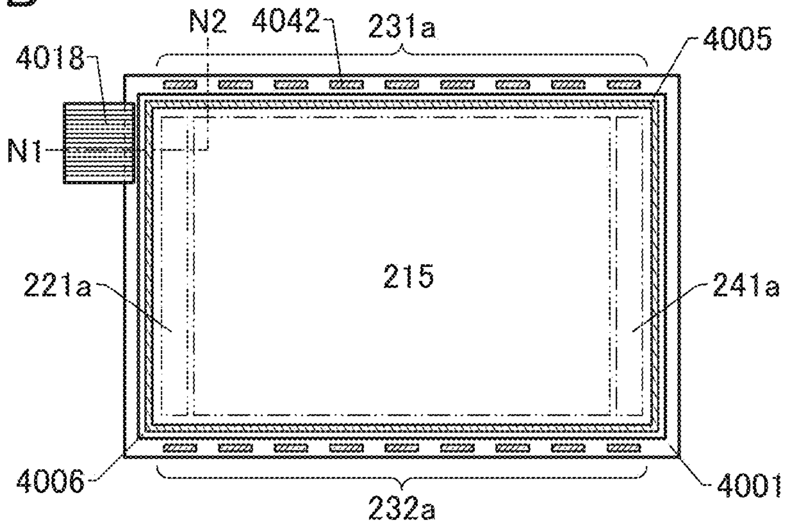
Figure 13C:
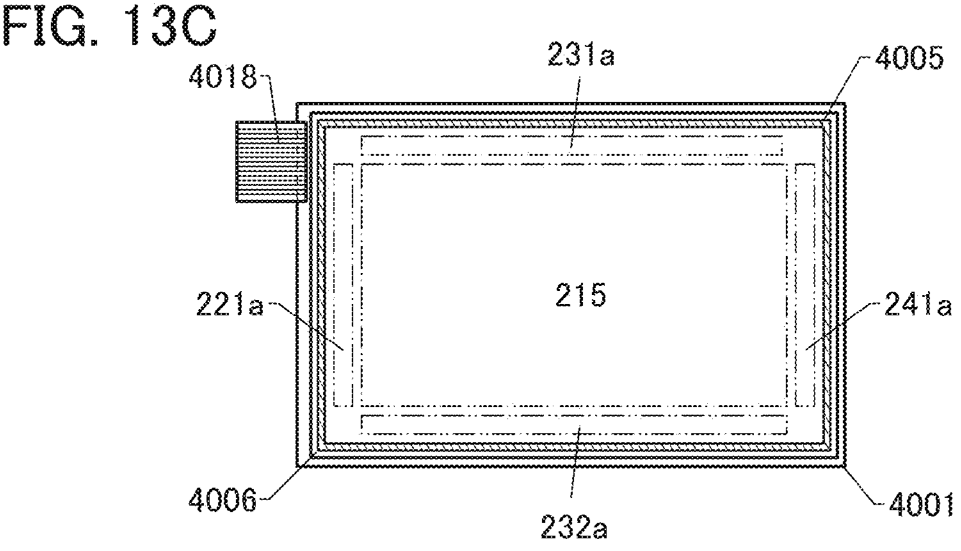

FIG. 13A to FIG. 13C are diagrams each illustrating a structure of a display apparatus in which one embodiment of the present invention can be used.

In FIG. 13A, a sealant 4005 is provided to surround a display portion 215 provided over a first substrate 4001, and the display portion 215 is sealed with the sealant 4005 and a second substrate 4006.

In FIG. 13A, a scan line driver circuit 221*a*, a signal line driver circuit 231*a*, a signal line driver circuit 232*a*, and a common line driver circuit 241*a* each include a plurality of integrated circuits 4042 provided over a printed circuit board 4041. The integrated circuits 4042 are each formed using a single crystal semiconductor or a polycrystalline semiconductor. The common line driver circuit 241*a* has a function of supplying a prescribed potential to the wirings 123, 124, 129, 130, 131, and the like described in Embodiment 1.

Signals and potentials are supplied to the scan line driver circuit 221*a*, the common line driver circuit 241*a*, the signal line driver circuit 231*a*, and the signal line driver circuit 232*a* through an FPC (Flexible printed circuit) 4018.

The integrated circuits 4042 included in the scan line driver circuit 221*a* and the common line driver circuit 241*a* each have a function of supplying a selection signal to the display portion 215. The integrated circuits 4042 included in the signal line driver circuit 231*a* and the signal line driver circuit 232*a* each have a function of supplying image data to the display portion 215. The integrated circuits 4042 are mounted in a region different from the region surrounded by the sealant 4005 over the first substrate 4001.

Note that the connection method of the integrated circuits 4042 is not particularly limited; a wire bonding method, a COF method, a COG method, a TCP method, or the like can be used.

FIG. 13B illustrates an example in which the integrated circuits 4042 included in the signal line driver circuit 231*a* and the signal line driver circuit 232*a* are mounted by a COG method. Some or all of the driver circuits can be formed over the same substrate as the display portion 215, whereby a system-on-panel can be formed.

In the example illustrated in FIG. 13B, the scan line driver circuit 221*a* and the common line driver circuit 241*a* are formed over the same substrate as the display portion 215. When the driver circuits are formed concurrently with pixel circuits in the display portion 215, the number of components can be reduced. Accordingly, the productivity can be increased.

In FIG. 13B, the sealant 4005 is provided to surround the display portion 215, the scan line driver circuit 221*a*, and the common line driver circuit 241*a* provided over the first substrate 4001. The second substrate 4006 is provided over the display portion 215, the scan line driver circuit 221*a*, and the common line driver circuit 241*a*. Consequently, the display portion 215, the scan line driver circuit 221*a*, and the common line driver circuit 241*a* are sealed with the use of the first substrate 4001, the sealant 4005, and the second substrate 4006 together with the display device.

Although the signal line driver circuit 231*a* and the signal line driver circuit 232*a* are separately formed and mounted on the first substrate 4001 in the example illustrated in FIG. 13B, one embodiment of the present invention is not limited to this structure. The scan line driver circuit may be separately formed and then mounted, part of the signal line driver circuits or part of the scan line driver circuits may be separately formed and then mounted. The signal line driver circuit 231*a* and the signal line driver circuit 232*a* may be formed over the same substrate as the display portion 215, as illustrated in FIG. 13C.

In some cases, the display device encompasses a panel in which the display device is sealed, and a module in which an IC or the like including a controller is mounted on the panel.

The display portion and the scan line driver circuit provided over the first substrate each include a plurality of transistors. As the transistors, the Si transistor or the OS transistor described in Embodiment 1 can be used.

The transistors included in the peripheral driver circuit and transistors included in the pixel circuits of the display portion may have the same structure or different structures. The transistors included in the peripheral driver circuit may have the same structure, or two or more kinds of structures may be used in combination. Similarly, the transistors included in the pixel circuits may have the same structure, or two or more kinds of structures may be used in combination.

An input apparatus 4200 can be provided over the second substrate 4006. The display apparatuses illustrated in FIG. 13A to FIG. 13C and provided with the input apparatus 4200 can function as a touch panel.

There is no particular limitation on a sensor device (also referred to as a sensor element) included in the touch panel of one embodiment of the present invention. A variety of sensors capable of sensing an approach or a contact of a sensing target such as a finger or a stylus can be used as the sensor device.

For example, a variety of types such as a capacitive type, a resistive type, a surface acoustic wave type, an infrared type, an optical type, and a pressure-sensitive type can be used for the sensor.

In this embodiment, a touch panel including a capacitive sensor device is described as an example.

Examples of the capacitive sensor device include a surface capacitive sensor device and a projected capacitive sensor device. Examples of the projected capacitive sensor device include a self-capacitive sensor device and a mutual capacitive sensor device. The use of a mutual capacitive sensor device is preferred because multiple points can be sensed simultaneously.

The touch panel of one embodiment of the present invention can have any of a variety of structures, including a structure in which a display apparatus and a sensor device that are separately formed are attached to each other and a structure in which an electrode and the like included in a sensor device are provided on one or both of a substrate supporting a display device and a counter substrate.

Figure 14A:
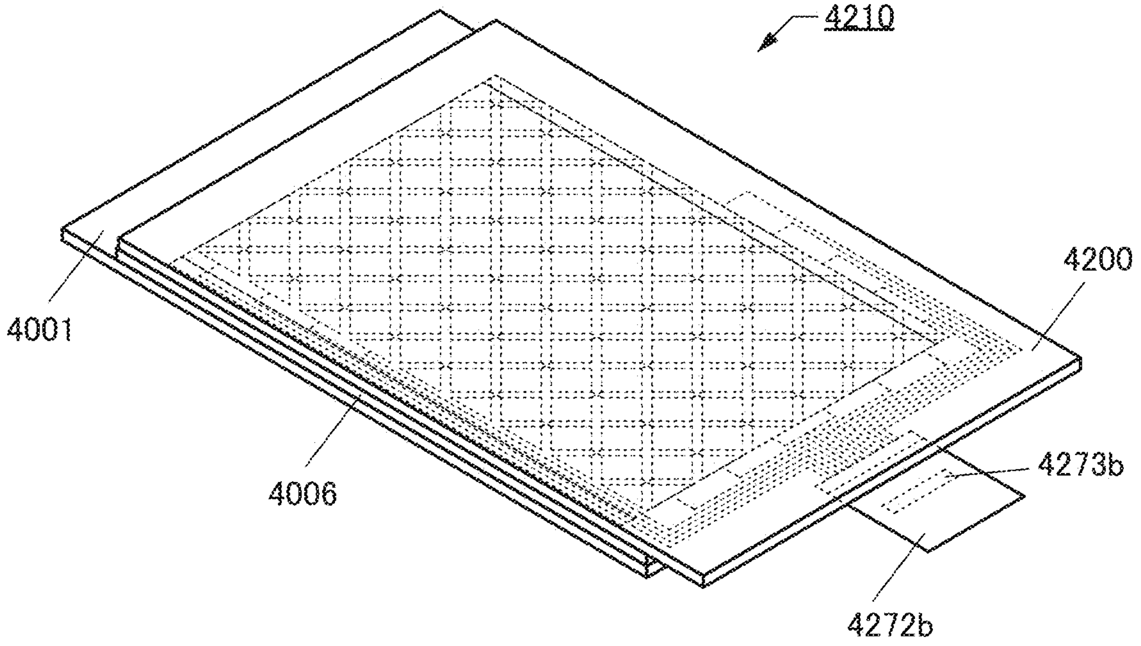
FIG. 14A and FIG. 14B are diagrams illustrating a touch panel.
Figure 14B:
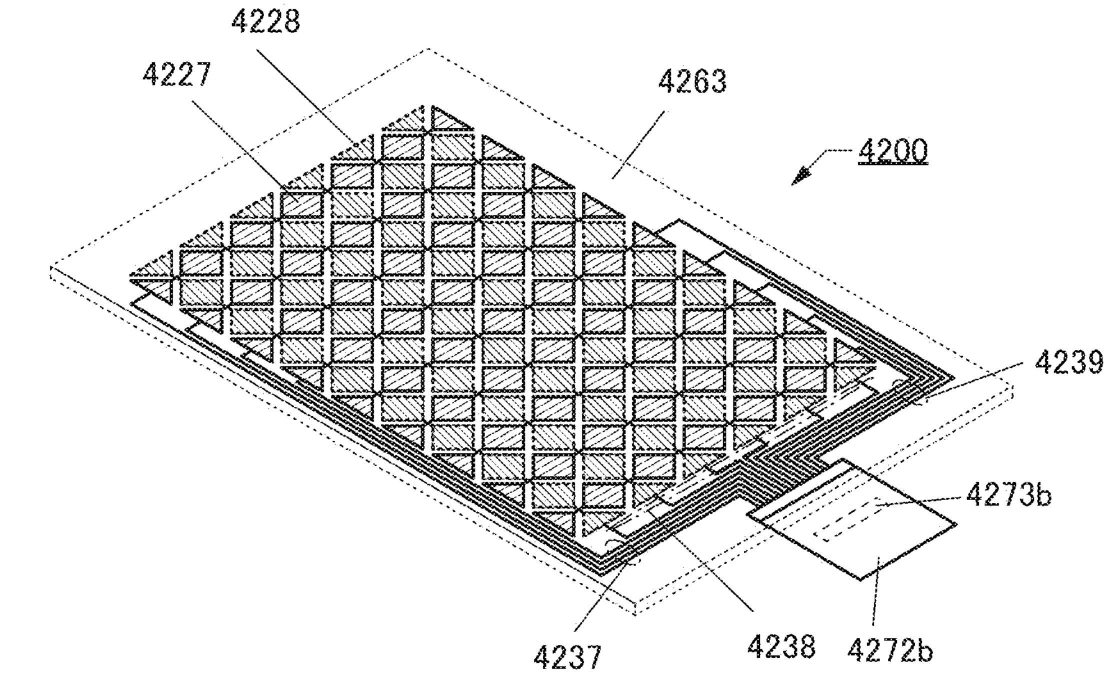

FIG. 14A and FIG. 14B illustrate an example of the touch panel. FIG. 14A is a perspective view of a touch panel 4210. FIG. 14B is a schematic perspective view of the input apparatus 4200. Note that for clarity, only typical components are illustrated.

The touch panel 4210 has a structure in which a display apparatus and a sensor device that are separately formed are attached to each other.

The touch panel 4210 includes the input apparatus 4200 and the display apparatus, which are provided to overlap with each other.

The input apparatus 4200 includes a substrate 4263, an electrode 4227, an electrode 4228, a wiring 4237, a wiring 4238, and a wiring 4239. For example, the electrode 4227 can be electrically connected to the wiring 4237 or the wiring 4239. In addition, the electrode 4228 can be electrically connected to the wiring 4238. An FPC 4272*b* is electrically connected to each of the wiring 4237, the wiring 4238, and the wiring 4239. An IC 4273*b* can be provided for the FPC 4272*b*.

Alternatively, a touch sensor may be provided between the first substrate 4001 and the second substrate 4006 in the display apparatus. In the case where a touch sensor is provided between the first substrate 4001 and the second substrate 4006, either a capacitive touch sensor or an optical touch sensor including a photoelectric conversion element may be used.

Figure 15A:
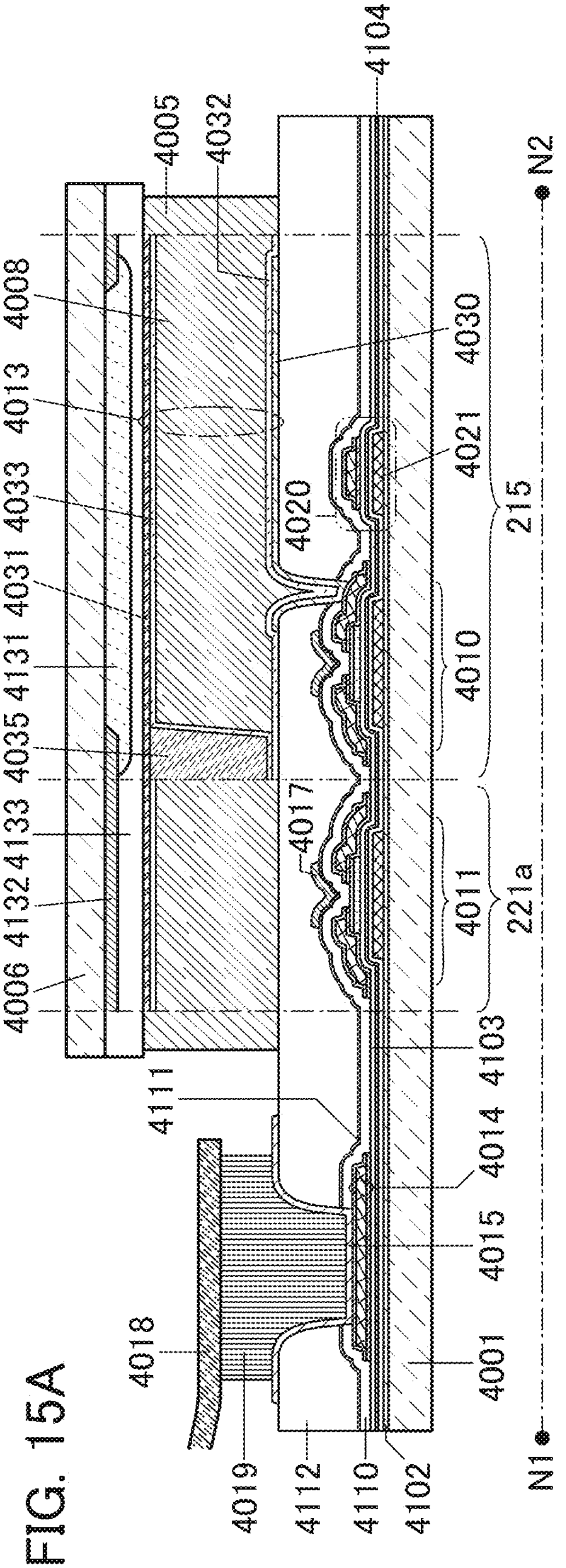
FIG. 15A and FIG. 15B are diagrams illustrating display apparatuses.
Figure 15B:
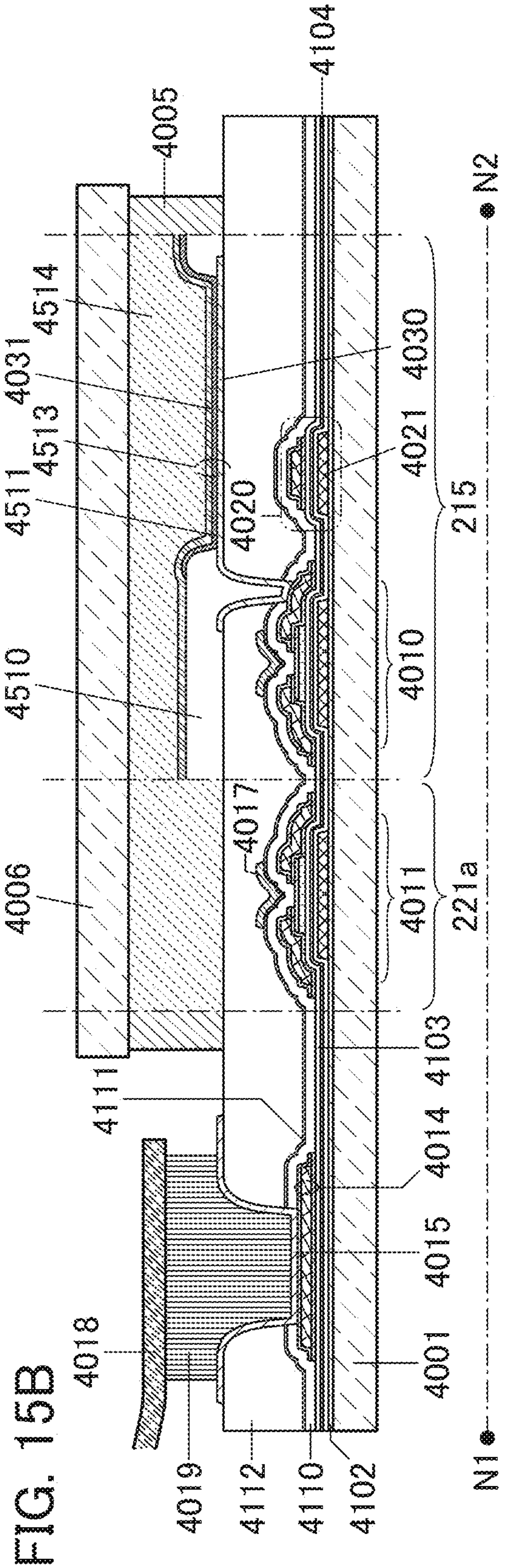

FIG. 15A and FIG. 15B are cross-sectional views of a portion indicated by chain line N1-N2 in FIG. 13B. Display apparatuses illustrated in FIG. 15A and FIG. 15B each include an electrode 4015, and the electrode 4015 is electrically connected to a terminal included in the FPC 4018 through an anisotropic conductive layer 4019. In FIG. 15A and FIG. 15B, the electrode 4015 is electrically connected to a wiring 4014 in an opening formed in an insulating layer 4112, an insulating layer 4111, and an insulating layer 4110.

The electrode 4015 is formed of the same conductive layer as a first electrode layer 4030, and the wiring 4014 is formed of the same conductive layer as source electrodes and drain electrodes of a transistor 4010 and a transistor 4011.

The display portion 215 and the scan line driver circuit 221*a* provided over the first substrate 4001 each include a plurality of transistors. In FIG. 15A and FIG. 15B, the transistor 4010 included in the display portion 215 and the transistor 4011 included in the scan line driver circuit 221*a* are illustrated as an example. Note that in the examples illustrated in FIG. 15A and FIG. 15B, the transistor 4010 and the transistor 4011 are bottom-gate transistors but may be top-gate transistors.

In FIG. 15A and FIG. 15B, the insulating layer 4112 is provided over the transistor 4010 and the transistor 4011. In FIG. 15B, a partition wall 4510 is formed over the insulating layer 4112.

The transistor 4010 and the transistor 4011 are provided over an insulating layer 4102. The transistor 4010 and the transistor 4011 each include an electrode 4017 formed over the insulating layer 4111. The electrode 4017 can serve as a back gate electrode.

The display apparatuses illustrated in FIG. 15A and FIG. 15B each include a capacitor 4020. The capacitor 4020 includes an electrode 4021 formed in the same step as a gate electrode of the transistor 4010, an insulating layer 4103, and an electrode formed in the same step as the source electrode and the drain electrode. The capacitor 4020 is not limited to having this structure and may be formed using another conductive layer and another insulating layer.

In general, the capacitance of a capacitor provided in a pixel portion of a display apparatus is set in consideration of the leakage current or the like of transistors provided in the pixel portion so that charges can be held for a predetermined period. The capacitance of the capacitor is set in consideration of the off-state current of the transistors electrically connected to the capacitor, for example.

The transistor 4010 provided in the display portion 215 is electrically connected to the display device. FIG. 15A illustrates an example of a liquid crystal display apparatus using a liquid crystal device as the display device. In FIG. 15A, a liquid crystal device 4013 serving as the display device includes the first electrode layer 4030, a second electrode layer 4031, and a liquid crystal layer 4008. Note that an insulating layer 4032 and an insulating layer 4033 functioning as alignment films are provided so that the liquid crystal layer 4008 is positioned therebetween. The second electrode layer 4031 is provided on the second substrate 4006 side, and the first electrode layer 4030 and the second electrode layer 4031 overlap with each other with the liquid crystal layer 4008 therebetween.

A liquid crystal device having a variety of modes can be used as the liquid crystal device 4013. For example, a liquid crystal device using a VA (Vertical Alignment) mode, a TN (Twisted Nematic) mode, an IPS (In-Plane-Switching) mode, an ASM (Axially Symmetric aligned Micro-cell) mode, an OCB (Optically Compensated Bend) mode, an FLC (Ferroelectric Liquid Crystal) mode, an AFLC (Anti-Ferroelectric Liquid Crystal) mode, an ECB (Electrically Controlled Birefringence) mode, a VA-IPS mode, a guest-host mode, or the like can be used.

As the liquid crystal display apparatus described in this embodiment, a normally black liquid crystal display apparatus such as a transmissive liquid crystal display apparatus employing a vertical alignment (VA) mode may be used. As the vertical alignment mode, an MVA (Multi-Domain Vertical Alignment) mode, a PVA (Patterned Vertical Alignment) mode, an ASV (Advanced Super View) mode, and the like can be used.

Note that the liquid crystal device is an element that controls transmission and non-transmission of light by the optical modulation action of liquid crystal. The optical modulation action of the liquid crystal is controlled by an electric field applied to the liquid crystal (including a horizontal electric field, a vertical electric field, and an oblique electric field). As the liquid crystal used for the liquid crystal device, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Although an example of a liquid crystal display apparatus including a liquid crystal device with a vertical electric field mode is illustrated in FIG. 15A, one embodiment of the present invention can be applied to a liquid crystal display apparatus including a liquid crystal device with a horizontal electric field mode. In the case of employing a horizontal electric field mode, liquid crystal exhibiting a blue phase for which an alignment film is not used may be used. The blue phase is one of liquid crystal phases, which is generated just before a cholesteric phase changes into an isotropic phase while the temperature of cholesteric liquid crystal is increased. Since the blue phase appears only in a narrow temperature range, a liquid crystal composition in which a chiral material of 5 weight % or more is mixed is used for the liquid crystal layer 4008 in order to improve the temperature range. The liquid crystal composition that contains liquid crystal exhibiting a blue phase and a chiral material has a short response speed and exhibits optical isotropy. In addition, the liquid crystal composition containing liquid crystal exhibiting a blue phase and a chiral material does not need alignment treatment and has small viewing angle dependence. Since an alignment film does not need to be provided and rubbing treatment is unnecessary, electrostatic discharge damage caused by the rubbing treatment can be prevented and defects or damage of the liquid crystal display apparatus in the manufacturing process can be reduced.

A spacer 4035 is a columnar spacer obtained by selective etching of an insulating layer and is provided in order to control a distance (a cell gap) between the first electrode layer 4030 and the second electrode layer 4031. Note that a spherical spacer may alternatively be used.

A black matrix (a light-blocking layer); a coloring layer (a color filter); an optical member (an optical substrate) such as a polarizing member, a retardation member, or an anti-reflection member; or the like may be provided as appropriate if needed. For example, circular polarization may be employed by using a polarizing substrate and a retardation substrate. In addition, a backlight, a side light, or the like may be used as a light source. A micro LED or the like may be used as the backlight or the side light.

In the display apparatus illustrated in FIG. 15A, a light-blocking layer 4132, a coloring layer 4131, and an insulating layer 4133 are provided between the second substrate 4006 and the second electrode layer 4031.

Examples of a material that can be used for the light-blocking layer include carbon black, titanium black, a metal, a metal oxide, and a composite oxide containing a solid solution of a plurality of metal oxides. The light-blocking layer may be a film containing a resin material or may be a thin film of an inorganic material such as a metal. Stacked films containing the material used for the coloring layer can also be used for the light-blocking layer. For example, a stacked-layer structure of a film containing a material of a coloring layer which transmits light of a certain color and a film containing a material of a coloring layer which transmits light of another color can be employed. It is preferable that the coloring layer and the light-blocking layer be formed using the same material because the same manufacturing apparatus can be used and the process can be simplified.

Examples of a material that can be used for the coloring layer include a metal material, a resin material, and a resin material containing a pigment or a dye. The light-blocking layer and the coloring layer can be formed by, for example, an inkjet method or the like.

The display apparatuses illustrated in FIG. 15A and FIG. 15B each include the insulating layer 4111 and an insulating layer 4104. For the insulating layer 4111 and the insulating layer 4104, insulating layers through which an impurity element does not easily pass are used. A semiconductor layer of the transistor is positioned between the insulating layer 4111 and the insulating layer 4104, whereby entry of impurities from the outside can be prevented.

A light-emitting device can be used as the display device included in the display apparatus. As the light-emitting device, for example, an EL device that utilizes electroluminescence can be used. An EL device includes a layer containing a light-emitting compound (also referred to as an "EL layer") between a pair of electrodes. By generating a potential difference between the pair of electrodes that is greater than the threshold voltage of the EL device, holes are injected to the EL layer from the anode side and electrons are injected to the EL layer from the cathode side. The injected electrons and holes are recombined in the EL layer and a light-emitting compound contained in the EL layer emits light.

As the EL device, an organic EL device or an inorganic EL device can be used, for example. Note that an LED (including a micro LED) that uses a compound semiconductor as a light-emitting material can also be used.

In the organic EL device, by voltage application, electrons are injected from one electrode to the EL layer and holes are injected from the other electrode to the EL layer. The carriers (electrons and holes) are recombined, the light-emitting organic compound forms an excited state, and the organic compound emits light when the excited state returns to a ground state. Owing to such a mechanism, this light-emitting device is referred to as a current-excitation light-emitting device.

Note that in addition to the light-emitting compound, the EL layer may further include a substance with a high hole-injection property, a substance with a high hole-transport property, a hole-blocking material, a substance with a high electron-transport property, a substance with a high electron-injection property, a substance with a bipolar property (a substance with a high electron- and hole-transport property), or the like.

The EL layer can be formed by a method such as an evaporation method (including a vacuum evaporation method), a transfer method, a printing method, an inkjet method, or a coating method.

The inorganic EL devices are classified according to their element structures into a dispersion-type inorganic EL device and a thin-film inorganic EL device. A dispersion-type inorganic EL device includes a light-emitting layer where particles of a light-emitting material are dispersed in a binder, and its light emission mechanism is donor-acceptor recombination type light emission that utilizes a donor level and an acceptor level. A thin-film inorganic EL device has a structure where a light-emitting layer is positioned between dielectric layers, which are further positioned between electrodes, and its light emission mechanism is localization type light emission that utilizes inner-shell electron transition of metal ions. Note that the description is made here using an organic EL device as the light-emitting device.

In order to extract light emitted from the light-emitting device, at least one of the pair of electrodes needs to be transparent. A transistor and a light-emitting device are formed over a substrate. The light-emitting device can have a top emission structure in which light emission is extracted from the surface on the side opposite to the substrate; a bottom emission structure in which light emission is extracted from the surface on the substrate side; or a dual emission structure in which light emission is extracted from both surfaces. The light-emitting device having any of the emission structures can be used.

FIG. 15B illustrates an example of a light-emitting display apparatus using a light-emitting device as a display device (also referred to as an "EL display apparatus"). A light-emitting device 4513 serving as the display device is electrically connected to the transistor 4010 provided in the display portion 215. Note that the structure of the light-emitting device 4513 is a stacked-layer structure of the first electrode layer 4030, a light-emitting layer 4511, and the second electrode layer 4031; however, this embodiment is not limited to this structure. The structure of the light-emitting device 4513 can be changed as appropriate depending on the direction in which light is extracted from the light-emitting device 4513, or the like.

The partition wall 4510 is formed using an organic insulating material or an inorganic insulating material. It is particularly preferable that the partition wall 4510 be formed using a photosensitive resin material to have an opening portion over the first electrode layer 4030 such that a side surface of the opening portion slopes with continuous curvature.

The light-emitting layer 4511 may be formed using a single layer or a plurality of layers stacked.

The emission color of the light-emitting device 4513 can be white, red, green, blue, cyan, magenta, yellow, or the like depending on the material for the light-emitting layer 4511.

As a color display method, there are a method in which the light-emitting device 4513 that emits white light is combined with a coloring layer and a method in which the light-emitting device 4513 that emits light of a different emission color is provided in each pixel. The former method is more productive than the latter method. In contrast, the latter method can provide higher color purity of the emission color than the former method. In the latter method, the color purity can be further increased when the light-emitting device 4513 has a microcavity structure.

Note that the light-emitting layer 4511 may contain an inorganic compound such as quantum dots. For example, when used for the light-emitting layer, the quantum dots can function as a light-emitting material.

A protective layer may be formed over the second electrode layer 4031 and the partition wall 4510 in order to prevent entry of oxygen, hydrogen, moisture, carbon dioxide, or the like into the light-emitting device 4513. For the protective layer, silicon nitride, silicon nitride oxide, aluminum oxide, aluminum nitride, aluminum oxynitride, aluminum nitride oxide, DLC (Diamond Like Carbon), or the like can be used. In a space enclosed by the first substrate 4001, the second substrate 4006, and the sealant 4005, a filler 4514 is provided for sealing. It is preferable that the light-emitting element be packaged (sealed) with a protective film (such as a laminate film or an ultraviolet curable resin film) or a cover member with high air-tightness and little degasification in this manner so that the light-emitting element is not exposed to the outside air.

As the filler 4514, an ultraviolet curable resin or a thermosetting resin can be used as well as an inert gas such as nitrogen or argon; PVC (polyvinyl chloride), an acrylic resin, polyimide, an epoxy-based resin, a silicone-based resin, PVB (polyvinyl butyral), EVA (ethylene vinyl acetate), or the like can be used. A drying agent may be contained in the filler 4514.

A glass material such as a glass frit or a resin material such as a curable resin that is curable at room temperature, such as a two-component-mixture-type resin, a light curable resin, or a thermosetting resin can be used for the sealant 4005. A drying agent may be contained in the sealant 4005.

If necessary, an optical film such as a polarizing plate, a circularly polarizing plate (including an elliptically polarizing plate), a retardation plate (a quarter-wave plate or a half-wave plate), or a color filter may be provided as appropriate on an emission surface of the light-emitting device. Furthermore, the polarizing plate or the circularly polarizing plate may be provided with an anti-reflection film. For example, anti-glare treatment by which reflected light can be diffused by projections and depressions on a surface so as to reduce the glare can be performed.

When the light-emitting device has a microcavity structure, light with high color purity can be extracted. Furthermore, when a microcavity structure and a color filter are used in combination, the glare can be reduced and visibility of a displayed image can be increased.

The first electrode layer and the second electrode layer (also called a pixel electrode layer, a common electrode layer, a counter electrode layer, or the like) for applying voltage to the display device each have a light-transmitting property or a light-reflecting property, which depends on the direction in which light is extracted, the position where the electrode layer is provided, and the pattern structure of the electrode layer.

Each of the first electrode layer 4030 and the second electrode layer 4031 can be formed using a light-transmitting conductive material such as indium oxide containing tungsten oxide, indium zinc oxide containing tungsten oxide, indium oxide containing titanium oxide, indium tin oxide, indium tin oxide containing titanium oxide, indium zinc oxide, or indium tin oxide to which silicon oxide is added.

Each of the first electrode layer 4030 and the second electrode layer 4031 can also be formed using one or more kinds selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a metal nitride thereof.

A conductive composition containing a conductive high molecule (also referred to as conductive polymer) can be used for the first electrode layer 4030 and the second electrode layer 4031. As the conductive high molecule, a π-electron conjugated conductive high molecule can be used. For example, polyaniline or a derivative thereof, polypyrrole or a derivative thereof, polythiophene or a derivative thereof, and a copolymer of two or more of aniline, pyrrole, and thiophene or a derivative thereof can be given.

Since the transistor is easily broken by static electricity or the like, a protective circuit for protecting the driver circuit is preferably provided. The protective circuit is preferably formed using a nonlinear element.

Figure 16:
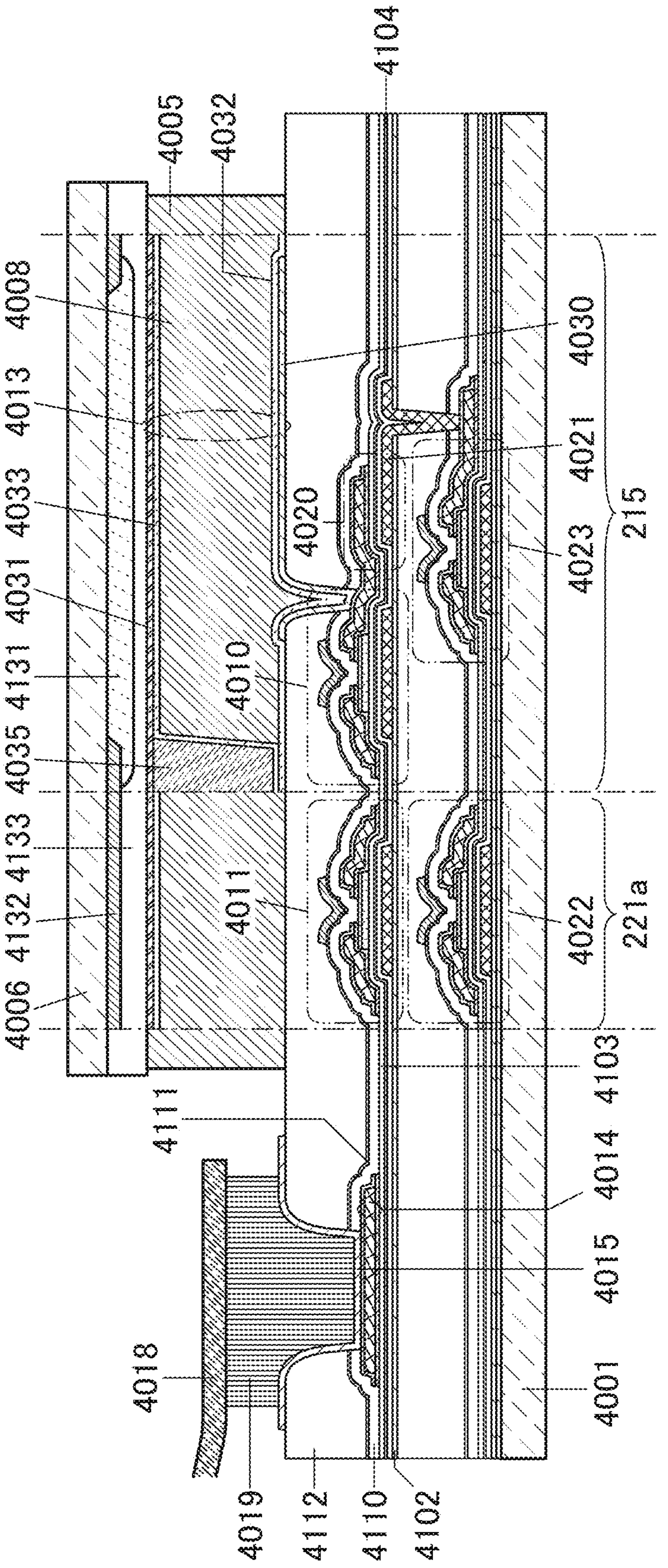
FIG. 16 is a diagram illustrating a display apparatus.

Note that as illustrated in FIG. 16, a stacked structure including a region where a transistor and a capacitor overlap with each other in the height direction may be employed. For example, when the transistor 4011 and a transistor 4022 included in the driver circuit are provided to overlap with each other, a display apparatus with a narrow frame can be provided. Furthermore, when the transistor 4010, a transistor 4023, the capacitor 4020, and the like included in the pixel circuit are provided to at least partly overlap with each other, the aperture ratio and the resolution can be improved. Although an example in which the stacked structure is employed for the liquid crystal display apparatus illustrated in FIG. 15A is illustrated in FIG. 16, the stacked structure may be employed for the EL display apparatus illustrated in FIG. 15B.

In addition, a conductive film with high visible-light-transmitting property is used as an electrode or a wiring in the pixel circuit, whereby transmittance of light in the pixel can be increased and the aperture ratio can be substantially improved. Note that in the case where an OS transistor is used, a semiconductor layer also has a light-transmitting property and thus the aperture ratio can be further increased. These are effective even when transistors and the like are not stacked.

The display apparatus may have a structure with a combination of a liquid crystal display apparatus and a light-emitting apparatus.

The light-emitting apparatus is disposed on the side opposite to the display surface or on an end portion of the display surface. The light-emitting apparatus has a function of supplying light to the display device. The light-emitting apparatus can also be referred to as a backlight.

Here, the light-emitting apparatus can include a plate-like or sheet-like light guide portion (also referred to as a light guide plate) and a plurality of light-emitting devices which emit light of different colors. When the light-emitting devices are disposed in the vicinity of the side surface of the light guide portion, light can be emitted from the side surface of the light guide portion to the inside. The light guide portion has a mechanism that changes an optical path (also referred to as a light extraction mechanism), and this enables the light-emitting apparatus to emit light uniformly to a pixel portion of a display panel. Alternatively, the light-emitting apparatus may be provided directly under the pixel without providing the light guide portion.

The light-emitting apparatus preferably includes light-emitting devices of three colors, red (R), green (G), and blue (B). In addition, a light-emitting device of white (W) may be included. A light emitting diode (LED) is preferably used as these light-emitting devices.

Furthermore, the light-emitting devices preferably have extremely high color purities; the full width at half maximum (FWHM) of the emission spectrum of the light-emitting device is less than or equal to 50 nm, preferably less than or equal to 40 nm, further preferably less than or equal to 30 nm, still further preferably less than or equal to 20 nm. Note that the full width at half maximum of the emission spectrum is preferably as small as possible, and can be, for example, greater than or equal to 1 nm. Thus, when a color image is displayed, a vivid image with high color reproducibility can be displayed.

As the red light-emitting device, an element whose wavelength of an emission spectrum peak is in a range from 625 nm to 650 nm is preferably used. As the green light-emitting device, an element whose wavelength of an emission spectrum peak is in a range from 515 nm to 540 nm is preferably used. As the blue light-emitting device, an element whose wavelength of an emission spectrum peak is in a range from 445 nm to 470 nm is preferably used.

The display apparatus can make the light-emitting devices of the three colors blink sequentially, drive the pixels in synchronization with these light-emitting elements, and display a color image on the basis of the successive additive color mixing method. This driving method can also be referred to as field-sequential driving.

By the field-sequential driving, a clear color image can be displayed. In addition, a smooth moving image can be displayed. When the above-described driving method is used, one pixel does not need to be formed with subpixels of different colors, which can make an effective reflection area (also referred to as an effective display area or an aperture ratio) per pixel large; thus, a bright image can be displayed. Furthermore, the pixels do not need to be provided with color filters, and thus can have improved transmittance and achieve brighter image display. In addition, the manufacturing process can be simplified, and the manufacturing costs can be reduced.

Figure 17A:
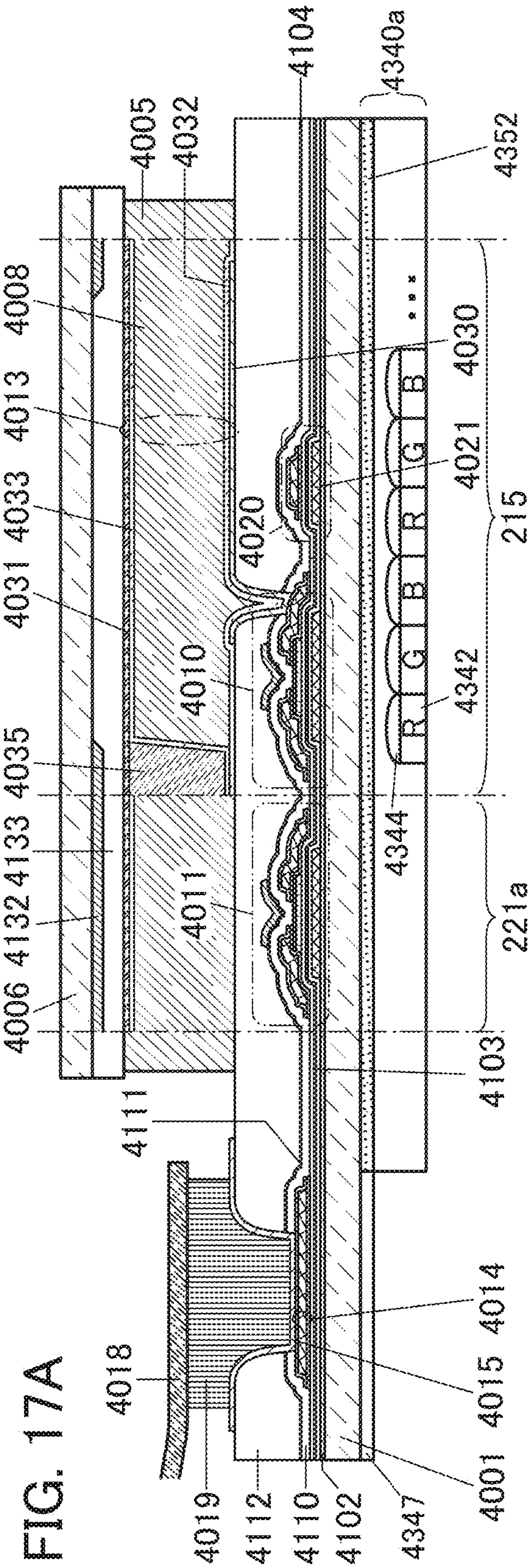
FIG. 17A and FIG. 17B are diagrams illustrating display apparatuses.
Figure 17B:
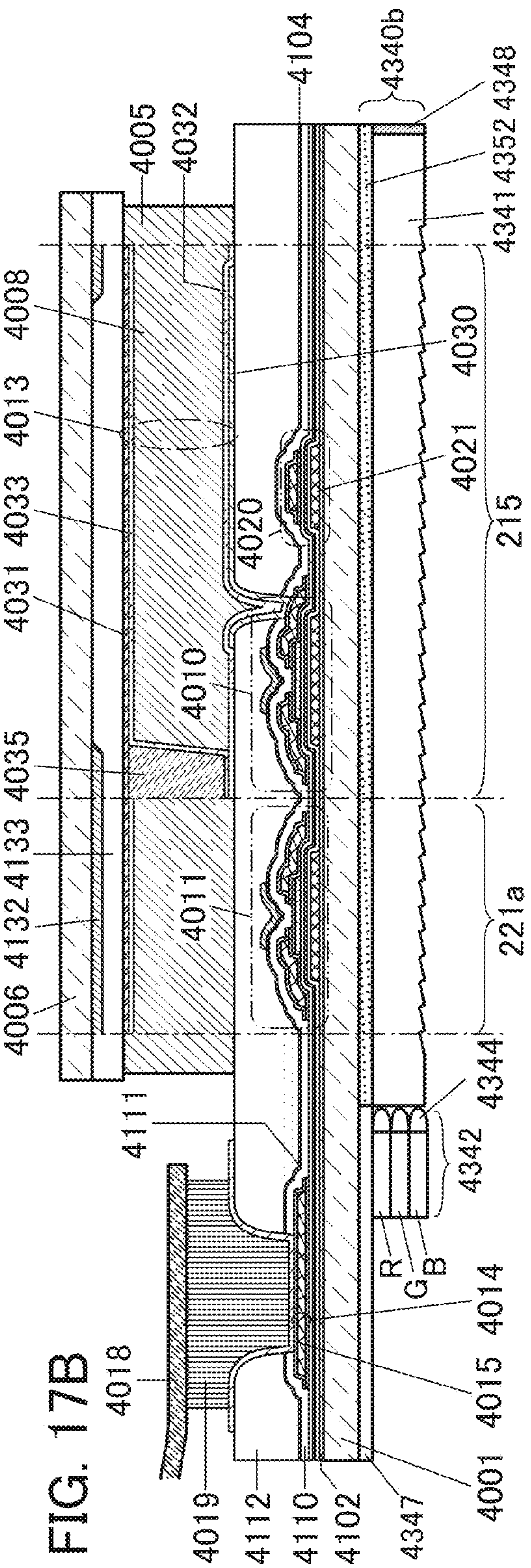

FIG. 17A and FIG. 17B each illustrate an example of a schematic cross-sectional view of a display apparatus capable of the field-sequential driving. A backlight unit capable of emitting light of RGB colors is provided on the first substrate 4001 side of the display apparatus. Note that in the field-sequential driving, the RGB colors are expressed through time division light emission, and thus color filters are not needed.

A backlight unit 4340*a* illustrated in FIG. 17A has a structure in which a plurality of light-emitting devices 4342 are provided directly under a pixel with a diffusing plate 4352 positioned therebetween. The diffusing plate 4352 have functions of diffusing light emitted from the light-emitting device 4342 to the first substrate 4001 side and making the luminance in a display portion uniform. Between the light-emitting device 4342 and the diffusing plate 4352, a polarizing plate may be provided if necessary. The diffusing plate 4352 does not need to be provided if not needed. The light-blocking layer 4132 may be omitted.

The backlight unit 4340*a* can include a large number of light-emitting devices 4342, which enables bright image display. Moreover, there are advantages that a light guide plate is not needed and light efficiency of the light-emitting device 4342 is less likely to be lowered. Note that the light-emitting device 4342 may be provided with a light diffusion lens 4344 if necessary.

A backlight unit 4340*b* illustrated in FIG. 17B has a structure in which a light guide plate 4341 is provided directly under a pixel with the diffusing plate 4352 positioned therebetween. The plurality of light-emitting devices 4342 are provided at an end portion of the light guide plate 4341. The light guide plate 4341 has an uneven shape on the side opposite to the diffusing plate 4352, and can scatter waveguided light with the uneven shape to emit the light in the direction of the diffusing plate 4352.

The light-emitting device 4342 can be fixed to a printed circuit board 4347. Note that in FIG. 17B, the light-emitting devices 4342 of RGB colors overlap with each other; however, the light-emitting devices 4342 of RGB colors can be arranged to be lined up in the depth direction. A reflective layer 4348 that reflects visible light may be provided on the side surface of the light guide plate 4341 which is opposite to the light-emitting device 4342.

The backlight unit 4340*b* can reduce the number of light-emitting devices 4342, leading to reductions in cost and thickness.

A light-scattering liquid crystal device may be used as the liquid crystal device. The light-scattering liquid crystal device is preferably an element containing a composite material of liquid crystal and a polymer molecule. For example, a polymer dispersed liquid crystal device can be used. Alternatively, a polymer network liquid crystal (PNLC) element may be used.

The light-scattering liquid crystal device has a structure in which a liquid crystal portion is provided in a three-dimensional network structure of a resin portion sandwiched between a pair of electrodes. As a material used in the liquid crystal portion, for example, a nematic liquid crystal can be used. A photocurable resin can be used for the resin portion. The photocurable resin can be a monofunctional monomer, such as acrylate or methacrylate; a polyfunctional monomer, such as diacrylate, triacrylate, dimethacrylate, or trimethacrylate; or a polymerizable compound obtained by mixing these.

The light-scattering liquid crystal device displays an image by transmitting or scattering light utilizing the anisotropy of a refractive index of a liquid crystal material. The resin portion may have the anisotropy of a refractive index. When liquid crystal molecules are arranged in a certain direction in accordance with a voltage applied to the light-scattering liquid crystal device, a direction is generated at which a difference in a refractive index between the liquid crystal portion and the resin portion is small. Incident light along the direction passes without being scattered in the liquid crystal portion. Thus, the light-scattering liquid crystal device is perceived in a transparent state from the direction. By contrast, when liquid crystal molecules are arranged randomly in accordance with the applied voltage, a large difference in refractive index between the liquid crystal portion and the resin portion is not generated, and incident light is scattered in the liquid crystal portion. Thus, the light-scattering liquid crystal device is in an opaque state regardless of the viewing direction.

Figure 18A:
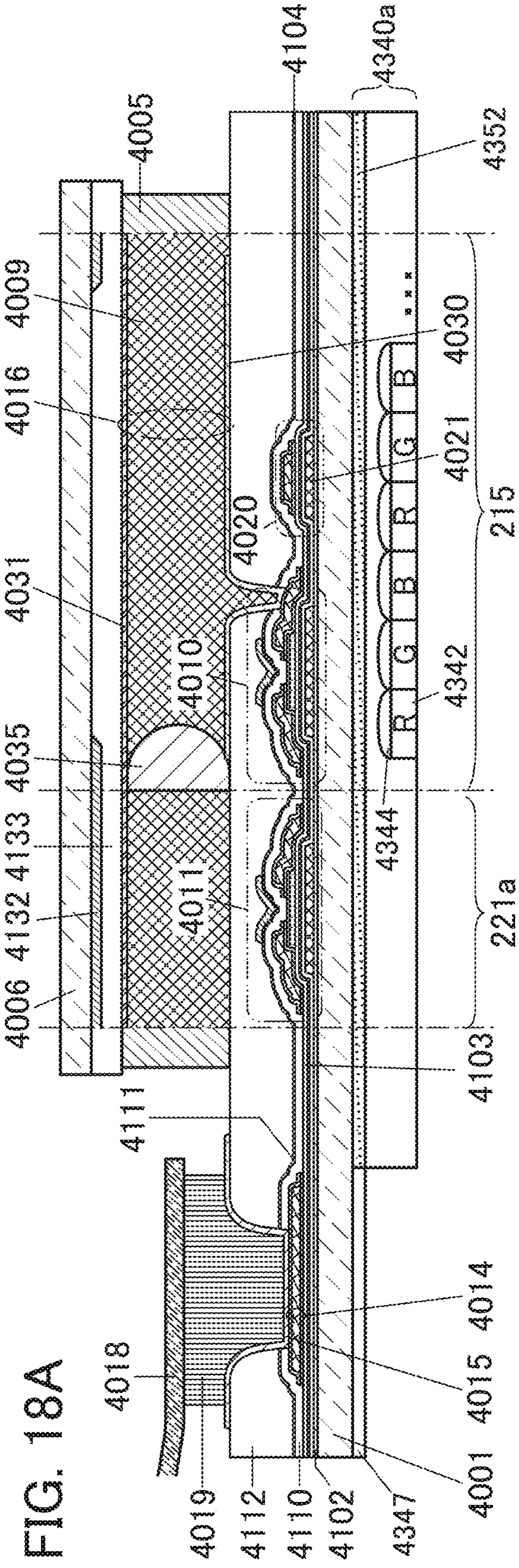
FIG. 18A and FIG. 18B are diagrams illustrating display apparatuses.

FIG. 18A illustrates a structure in which the liquid crystal device 4013 of the display apparatus illustrated in FIG. 17A is replaced by a light-scattering liquid crystal device 4016. The light-scattering liquid crystal device 4016 includes a composite layer 4009 including a liquid crystal portion and a resin portion, the first electrode layer 4030, and the second electrode layer 4031. Although components relating to the field-sequential driving are the same as those in FIG. 17A, when the light-scattering liquid crystal device 4016 is used, an alignment film and a polarizing plate are not necessary. Note that the spherical spacer 4035 is illustrated, but the spacer 4035 may have a columnar shape.

Figure 18B:
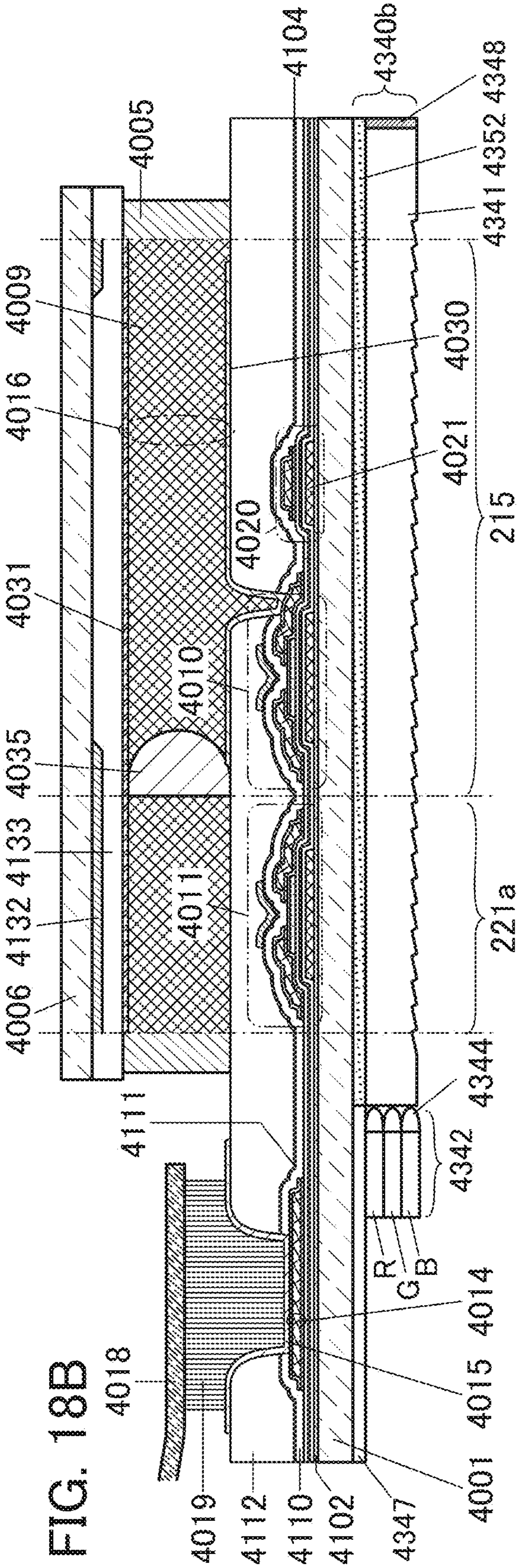

FIG. 18B illustrates a structure in which the liquid crystal device 4013 of the display apparatus illustrated in FIG. 17B is replaced by the light-scattering liquid crystal device 4016. In the structure of FIG. 17B, it is preferable that light be transmitted when a voltage is not applied to the light-scattering liquid crystal device 4016, and light be scattered when a voltage is applied. With such a structure, the display apparatus can be transparent in a normal state (state in which no image is displayed). In that case, a color image can be displayed when a light scattering operation is performed.

FIG. 19A to FIG. 19E illustrate modification examples of the display apparatus in FIG. 18B. Note that in FIG. 19A to FIG. 19E, some components in FIG. 18B are used and the other components are not illustrated for simplicity.

Figure 19A:
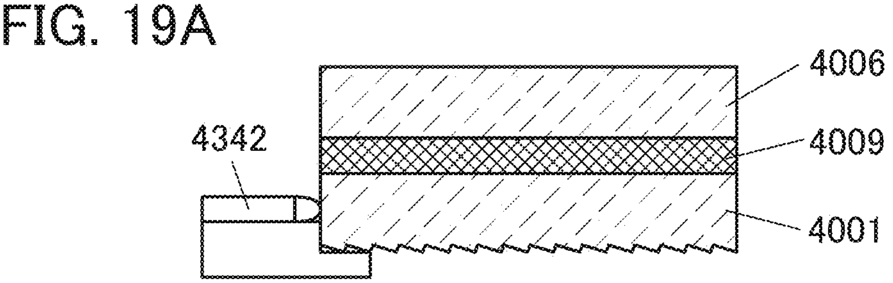
FIG. 19A to FIG. 19E are diagrams illustrating display apparatuses.

FIG. 19A illustrates a structure in which the first substrate 4001 has a function of a light guide plate. An uneven surface may be provided on an outer surface of the first substrate 4001. With this structure, a light guide plate does not need to be provided additionally, leading to a reduction in a manufacturing cost. Furthermore, the attenuation of light caused by the light guide plate also does not occur; accordingly, light emitted from the light-emitting device 4342 can be efficiently utilized.

Figure 19B:
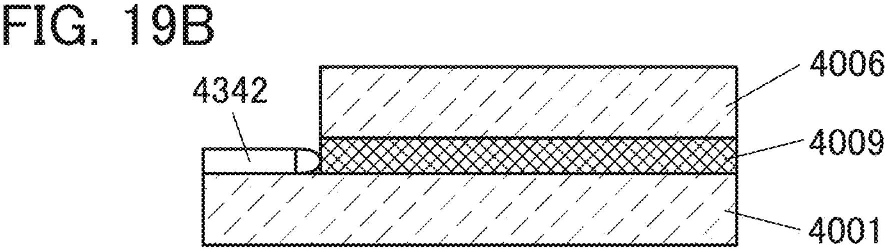

FIG. 19B illustrates a structure in which light enters from the vicinity of an end portion of the composite layer 4009. By utilizing total reflection at the interface between the composite layer 4009 and the second substrate 4006 and the interface between the composite layer 4009 and the first substrate 4001, light can be emitted to the outside from the light-scattering liquid crystal device. For the resin portion of the composite layer 4009, a material having a refractive index higher than that of the first substrate 4001 and that of the second substrate 4006 is used.

Figure 19C:
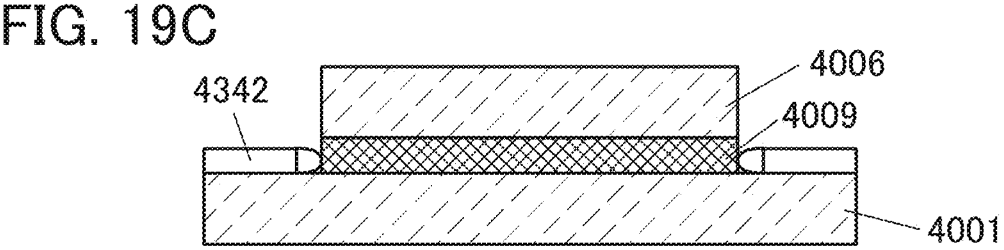

Note that the light-emitting device 4342 may be provided on one side of the display apparatus, or may be provided on each of two sides facing each other as illustrated in FIG. 19C. Furthermore, the light-emitting devices 4342 may be provided on three sides or four sides. When the light-emitting devices 4342 are provided on a plurality of sides, attenuation of light can be compensated for and application to a large-area display device is possible.

Figure 19D:
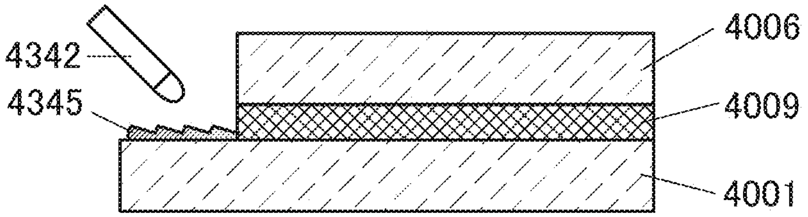

FIG. 19D illustrates a structure in which light emitted from the light-emitting device 4342 is guided to the display apparatus through a mirror 4345. With this structure, light can be guided easily with a certain angle to the display apparatus; thus, total reflection light can be obtained efficiently.

Figure 19E:
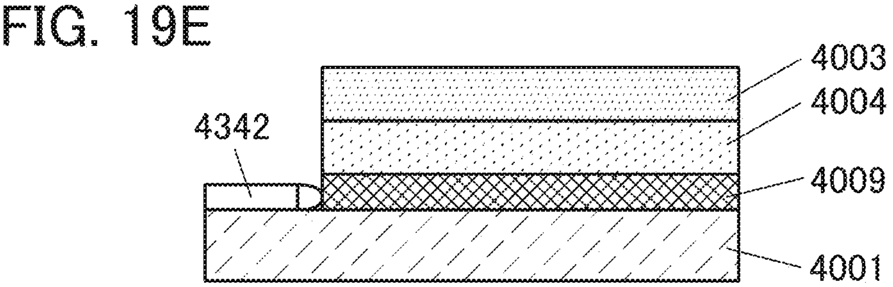

FIG. 19E illustrates a structure in which a layer 4003 and a layer 4004 are stacked over the composite layer 4009. One of the layer 4003 and the layer 4004 is a support such as a glass substrate, and the other can be formed of an inorganic film, a coating film of an organic resin, a film, or the like. For the resin portion of the composite layer 4009, a material having a refractive index higher than that of the layer 4004 is used. For the layer 4004, a material having a refractive index higher than that of the layer 4003 is used.

A first interface is formed between the composite layer 4009 and the layer 4004, and a second interface is formed between the layer 4004 and the layer 4003. With this structure, light passing through the first interface without being totally reflected is totally reflected at the second interface and can be returned to the composite layer 4009. Accordingly, light emitted from the light-emitting device 4342 can be efficiently utilized.

Note that the structures in FIG. 18B and FIGS. 19A to FIG. 19E can be combined with each other.

This embodiment can be implemented in an appropriate combination with the structures described in the other embodiments and Example.

Embodiment 3

In this embodiment, examples of transistors which can be used as the transistors described in the above embodiments are described with reference to drawings.

The display apparatus of one embodiment of the present invention can be manufactured using a transistor with any of various structures, such as a bottom-gate transistor or a top-gate transistor. Therefore, a material of a semiconductor layer or the structure of a transistor can be easily changed depending on the existing production line.

[Bottom-Gate Transistor]

FIG. 20A1 is a cross-sectional view of a channel-protective transistor 810, which is a type of bottom-gate transistor, in the channel length direction. In FIG. 20A1, the transistor 810 is formed over a substrate 771. The transistor 810 includes an electrode 746 over the substrate 771 with an insulating layer 772 therebetween. The transistor 810 also includes a semiconductor layer 742 over the electrode 746 with an insulating layer 726 therebetween. The electrode 746 can function as a gate electrode. The insulating layer 726 can function as a gate insulating layer.

Furthermore, an insulating layer 741 is provided over a channel formation region in the semiconductor layer 742. Furthermore, an electrode **744*a* and an electrode 744*b* are provided over the insulating layer 726 to be partly in contact with the semiconductor layer 742. The electrode 744*a* can function as one of a source electrode and a drain electrode. The electrode 744*b* can function as the other of the source electrode and the drain electrode. Part of the electrode 744*a* and part of the electrode 744*b* are formed over the insulating layer 741**.

The insulating layer 741 can function as a channel protective layer. With the insulating layer 741 provided over the channel formation region, the semiconductor layer 742 can be prevented from being exposed at the time of forming the electrode **744*a* and the electrode 744*b*. Thus, the channel formation region in the semiconductor layer 742 can be prevented from being etched at the time of forming the electrode 744*a* and the electrode 744*b***. According to one embodiment of the present invention, a transistor with favorable electrical characteristics can be provided.

The transistor 810 includes an insulating layer 728 over the electrode **744*a*, the electrode 744*b*, and the insulating layer 741 and also includes an insulating layer 729 over the insulating layer 728**.

In the case where an oxide semiconductor is used for the semiconductor layer 742, a material capable of removing oxygen from part of the semiconductor layer 742 to generate oxygen vacancies is preferably used at least for portions of the electrode 744*a* and the electrode 744*b* which are in contact with the semiconductor layer 742. The carrier concentration in the regions of the semiconductor layer 742 where oxygen vacancies are generated is increased, so that the regions become n-type regions ($n^+$ regions). Accordingly, the regions can function as a source region and a drain region. When an oxide semiconductor is used for the semiconductor layer 742, examples of the material capable of removing oxygen from the semiconductor layer 742 to generate oxygen vacancies include tungsten and titanium.

Formation of the source region and the drain region in the semiconductor layer 742 makes it possible to reduce contact resistance between the semiconductor layer 742 and each of the electrode 744*a* and the electrode 744*b*. Accordingly, the electrical characteristics of the transistor, such as the field-effect mobility and the threshold voltage, can be improved.

In the case where a semiconductor such as silicon is used for the semiconductor layer 742, a layer that functions as an n-type semiconductor or a p-type semiconductor is preferably provided between the semiconductor layer 742 and the electrode 744*a* and between the semiconductor layer 742 and the electrode 744*b*. The layer that functions as an n-type semiconductor or a p-type semiconductor can function as the source region or the drain region in the transistor.

The insulating layer 729 is preferably formed using a material that has a function of preventing or reducing diffusion of impurities into the transistor from the outside. Note that the insulating layer 729 can be omitted as necessary.

A transistor 811 illustrated in FIG. 20A2 is different from the transistor 810 in that an electrode 723 that can function as a back gate electrode is provided over the insulating layer 729. The electrode 723 can be formed using a material and a method similar to those for the electrode 746.

In general, a back gate electrode is formed using a conductive layer and positioned so that a channel formation region in a semiconductor layer is positioned between the gate electrode and the back gate electrode. Thus, the back gate electrode can function in a manner similar to that of the gate electrode. The potential of the back gate electrode may be the same as the potential of the gate electrode or may be a ground potential (GND potential) or a given potential. When the potential of the back gate electrode is changed independently of the potential of the gate electrode, the threshold voltage of the transistor can be changed.

The electrode 746 and the electrode 723 can each function as a gate electrode. Thus, the insulating layer 726, the insulating layer 728, and the insulating layer 729 can each function as a gate insulating layer. Note that the electrode 723 may be provided between the insulating layer 728 and the insulating layer 729.

Note that in the case where one of the electrode 746 and the electrode 723 is referred to as a "gate electrode", the other is referred to as a "back gate electrode". For example, in the transistor 811, in the case where the electrode 723 is referred to as a "gate electrode", the electrode 746 is referred to as a "back gate electrode". In the case where the electrode 723 is used as a "gate electrode", the transistor 811 can be regarded as a kind of top-gate transistor. One of the electrode 746 and the electrode 723 may be referred to as a "first gate electrode", and the other may be referred to as a "second gate electrode".

By providing the electrode 746 and the electrode 723 with the semiconductor layer 742 therebetween and setting the potential of the electrode 746 equal to the potential of the electrode 723, a region of the semiconductor layer 742 through which carriers flow is enlarged in the film thickness direction; thus, the number of transferred carriers is increased. As a result, the on-state current of the transistor 811 is increased and the field-effect mobility is increased.

Therefore, the transistor 811 is a transistor having a high on-state current for its occupation area. That is, the occupation area of the transistor 811 can be small for required on-state current. According to one embodiment of the present invention, the occupation area of a transistor can be reduced. Therefore, according to one embodiment of the present invention, a semiconductor apparatus having a high degree of integration can be provided.

The gate electrode and the back gate electrode are formed using conductive layers and thus each have a function of preventing an electric field generated outside the transistor from affecting the semiconductor layer in which the channel is formed (in particular, an electric field blocking function against static electricity and the like). Note that when the back gate electrode is formed larger than the semiconductor layer such that the semiconductor layer is covered with the back gate electrode, the electric field blocking function can be enhanced.

When the back gate electrode is formed using a light-blocking conductive film, light can be prevented from entering the semiconductor layer from the back gate electrode side. Therefore, photodegradation of the semiconductor layer can be prevented, and deterioration in electrical characteristics of the transistor, such as a shift of the threshold voltage, can be prevented.

According to one embodiment of the present invention, a transistor with favorable reliability can be provided. Moreover, a semiconductor apparatus with favorable reliability can be provided.

FIG. 20B1 is a cross-sectional view of a channel-protective transistor 820, which has a structure different from FIG. 20A1, in the channel length direction. The transistor 820 has substantially the same structure as the transistor 810 but is different from the transistor 810 in that the insulating layer 741 covers end portions of the semiconductor layer 742. The semiconductor layer 742 is electrically connected to the electrode 744*a* through an opening portion formed by selectively removing part of the insulating layer 741 that overlaps with the semiconductor layer 742. The semiconductor layer 742 is electrically connected to the electrode 744*b* through another opening portion formed by selectively removing part of the insulating layer 741 that overlaps with the semiconductor layer 742. A region of the insulating layer 741 that overlaps with the channel formation region can function as a channel protective layer.

A transistor 821 illustrated in FIG. 20B2 is different from the transistor 820 in that the electrode 723 that can function as a back gate electrode is provided over the insulating layer 729.

With the insulating layer 741, the semiconductor layer 742 can be prevented from being exposed at the time of forming the electrode 744*a* and the electrode 744*b*. Thus, the semiconductor layer 742 can be prevented from being reduced in thickness at the time of forming the electrode 744*a* and the electrode 744*b*.

The distance between the electrode 744*a* and the electrode 746 and the distance between the electrode 744*b* and the electrode 746 are longer in the transistor 820 and the transistor 821 than in the transistor 810 and the transistor 811. Thus, the parasitic capacitance generated between the electrode 744*a* and the electrode 746 can be reduced. Moreover, the parasitic capacitance generated between the electrode 744*b* and the electrode 746 can be reduced. According to one embodiment of the present invention, a transistor with favorable electrical characteristics can be provided.

FIG. 20C1 is a cross-sectional view of a channel-etched transistor 825, which is a type of bottom-gate transistor, in the channel length direction. In the transistor 825, the electrode 744*a* and the electrode 744*b* are formed without the insulating layer 741. Thus, part of the semiconductor layer 742 that is exposed at the time of forming the electrode 744*a* and the electrode 744*b* might be etched. However, since the insulating layer 741 is not provided, the productivity of the transistor can be increased.

A transistor 826 illustrated in FIG. 20C2 is different from the transistor 825 in that the electrode 723 that can function as a back gate electrode is provided over the insulating layer 729.

FIG. 21A1 to FIG. 21C2 are cross-sectional views of the transistors 810, 811, 820, 821, 825, and 826 in the channel width direction, respectively.

In each of the structures illustrated in FIG. 21B2 and FIG. 21C2, the gate electrode is connected to the back gate electrode, and the gate electrode and the back gate electrode have the same potential. In addition, the semiconductor layer 742 is positioned between the gate electrode and the back gate electrode.

The length of each of the gate electrode and the back gate electrode in the channel width direction is longer than the length of the semiconductor layer 742 in the channel width direction. In the channel width direction, the whole of the semiconductor layer 742 is covered with the gate electrode and the back gate electrode with the insulating layers 726, 741, 728, and 729 positioned therebetween.

In this structure, the semiconductor layer 742 included in the transistor can be electrically surrounded by electric fields of the gate electrode and the back gate electrode.

The transistor device structure in which the semiconductor layer 742 in which the channel formation region is formed is electrically surrounded by electric fields of the gate electrode and the back gate electrode, as in the transistor 821 and the transistor 826, can be referred to as a Surrounded channel (S-channel) structure.

With the S-channel structure, an electric field for inducing a channel can be effectively applied to the semiconductor layer 742 by one or both of the gate electrode and the back gate electrode, which improves the current drive capability of the transistor and offers high on-state current characteristics. In addition, the transistor can be miniaturized because the on-state current can be increased. The S-channel structure can also increase the mechanical strength of the transistor.

[Top-Gate Transistor]

A transistor 842 illustrated as an example in FIG. 22A1 is a type of top-gate transistor. The electrode 744*a* and the electrode 744*b* are electrically connected to the semiconductor layer 742 through opening portions formed in the insulating layer 728 and the insulating layer 729.

Part of the insulating layer 726 that does not overlap with the electrode 746 is removed, and an impurity is introduced into the semiconductor layer 742 using the electrode 746 and the remaining insulating layer 726 as masks, so that an impurity region can be formed in the semiconductor layer 742 in a self-aligned manner. The transistor 842 includes a region where the insulating layer 726 extends beyond end portions of the electrode 746. The semiconductor layer 742 in a region into which the impurity is introduced through the insulating layer 726 has a lower impurity concentration than the semiconductor layer 742 in a region into which the impurity is introduced not through the insulating layer 726. Thus, an LDD (Lightly Doped Drain) region is formed in a region of the semiconductor layer 742 which overlaps with the insulating layer 726 but does not overlap with the electrode 746.

A transistor 843 illustrated in FIG. 22A2 is different from the transistor 842 in that the electrode 723 is included. The transistor 843 includes the electrode 723 that is formed over the substrate 771. The electrode 723 includes a region overlapping with the semiconductor layer 742 with the insulating layer 772 therebetween. The electrode 723 can function as a back gate electrode.

As in a transistor 844 illustrated in FIG. 22B1 and a transistor 845 illustrated in FIG. 22B2, the insulating layer 726 in a region that does not overlap with the electrode 746 may be completely removed. Alternatively, as in a transistor 846 illustrated in FIG. 22C1 and a transistor 847 illustrated in FIG. 22C2, the insulating layer 726 may be left.

Also in the transistor 842 to the transistor 847, after the formation of the electrode 746, an impurity is introduced into the semiconductor layer 742 using the electrode 746 as a mask, so that an impurity region can be formed in the semiconductor layer 742 in a self-aligned manner. According to one embodiment of the present invention, a transistor with favorable electrical characteristics can be provided. Furthermore, according to one embodiment of the present invention, a semiconductor apparatus having a high degree of integration can be provided.

FIG. 23A1 to FIG. 23C2 are cross-sectional views of the transistors 842, 843, 844, 845, 846, and 847 in the channel width direction, respectively.

The transistor 843, the transistor 845, and the transistor 847 each have the above-described S-channel structure. However, one embodiment of the present invention is not limited to this, and the transistor 843, the transistor 845, and the transistor 847 do not necessarily have the S-channel structure.

This embodiment can be implemented in an appropriate combination with the structures described in the other embodiments and Example.

Embodiment 4

Examples of an electronic device that can use the display apparatus of one embodiment of the present invention include display apparatuses, personal computers, image storage apparatuses or image reproducing apparatuses provided with storage media, cellular phones, game machines including portable game machines, portable data terminals, e-book readers, cameras such as video cameras and digital still cameras, goggle-type displays (head mounted displays), navigation systems, audio reproducing apparatuses (e.g., car audio players and digital audio players), copiers, facsimiles, printers, multifunction printers, automated teller machines (ATM), and vending machines. FIG. 24 illustrates specific examples of such electronic devices.

Figure 24A:
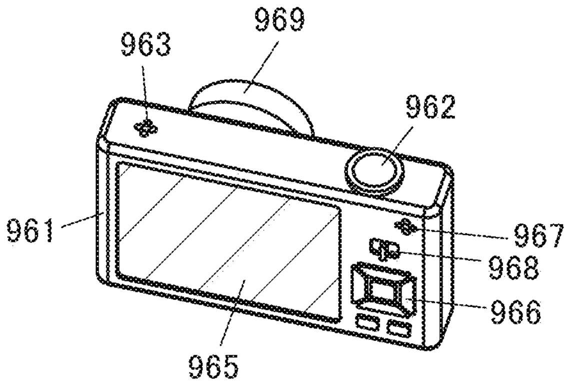
FIG. 24A to FIG. 24F are diagrams illustrating electronic devices.

FIG. 24A illustrates a digital camera, which includes a housing 961, a shutter button 962, a microphone 963, a speaker 967, a display portion 965, operation keys 966, a zoom lever 968, a lens 969, and the like. With the use of the display apparatus of one embodiment of the present invention for the display portion 965, a variety of images can be displayed.

Figure 24B:
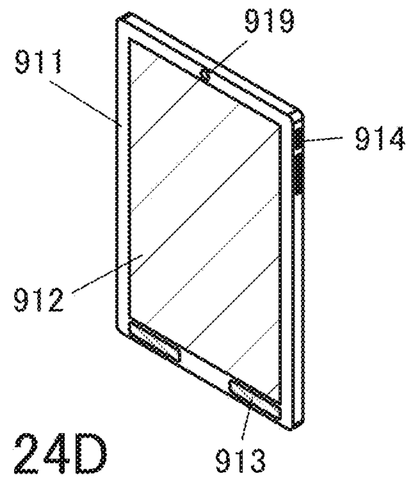

FIG. 24B is a portable data terminal, which includes a housing 911, a display portion 912, speakers 913, operation buttons 914, a camera 919, and the like. A touch panel function of the display portion 912 enables input and output of information. With the use of the display apparatus of one embodiment of the present invention for the display portion 912, an image can be displayed with high display quality.

Figure 24C:
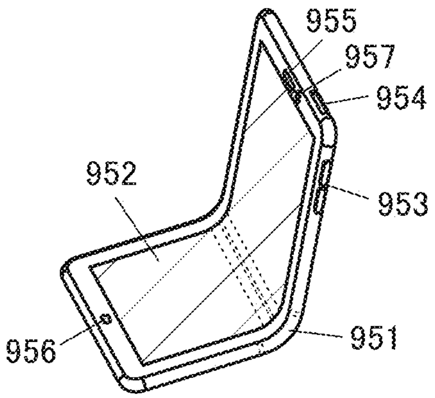

FIG. 24C illustrates a cellular phone, which includes a housing 951, a display portion 952, an operation button 953, an external connection port 954, a speaker 955, a microphone 956, a camera 957, and the like. The display portion 952 of the cellular phone includes a touch sensor. Operations such as making a call and inputting text can be performed by touch on the display portion 952 with a finger, a stylus, or the like. The housing 951 and the display portion 952 have flexibility and can be used in a bent state as illustrated in the figure. With the use of the display apparatus of one embodiment of the present invention for the display portion 952, a variety of images can be displayed.

Figure 24D:
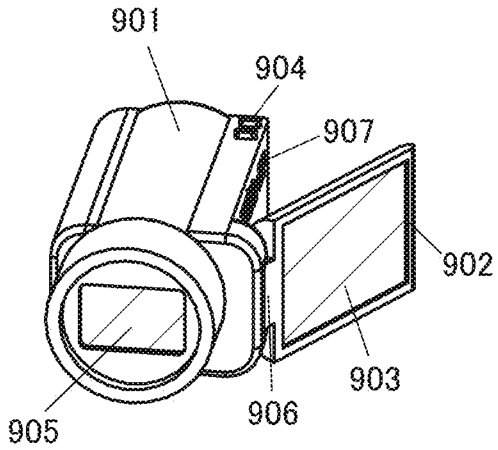

FIG. 24D illustrates a video camera, which includes a first housing 901, a second housing 902, a display portion 903, an operation key 904, a lens 905, a connection portion 906, a speaker 907, and the like. The operation key 904 and the lens 905 are provided on the first housing 901, and the display portion 903 is provided on the second housing 902. With the use of the display apparatus of one embodiment of the present invention for the display portion 903, a variety of images can be displayed.

Figure 24E:
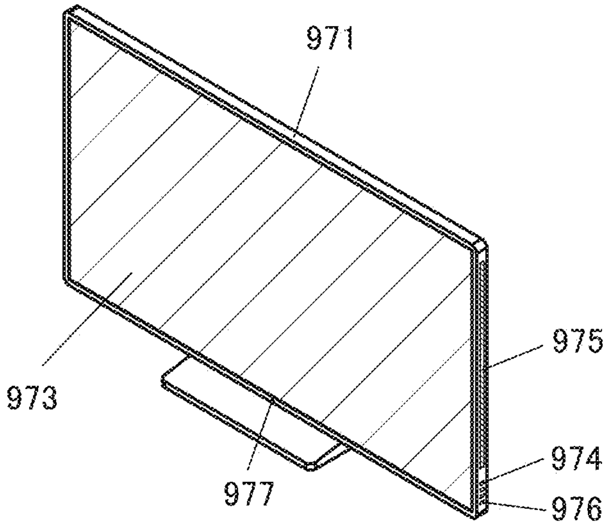

FIG. 24E illustrates a television, which includes a housing 971, a display portion 973, an operation button 974, speakers 975, a communication connection terminal 976, an optical sensor 977, and the like. The display portion 973 includes a touch sensor that enables an input operation. With the use of the display apparatus of one embodiment of the present invention for the display portion 973, a variety of images can be displayed.

Figure 24F:
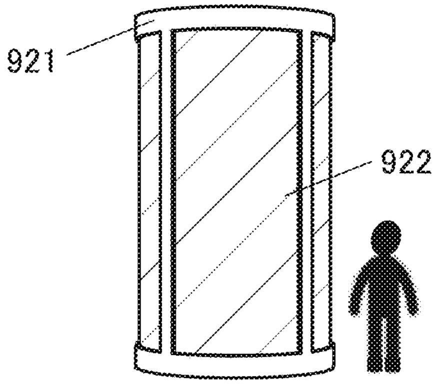

FIG. 24F is digital signage that has a large display portion 922. The large display portion 922 in the digital signage is attached to a side surface of a pillar 921, for example. With the use of the display apparatus of one embodiment of the present invention for the display portion 922, display with high display quality can be performed.

This embodiment can be implemented in an appropriate combination with the structures described in the other embodiments and Example.

EXAMPLE

In this example, the results of fabricating the transistor and the display apparatus of one embodiment of the present invention are described.

<Transistor Characteristics>

Figure 25A:
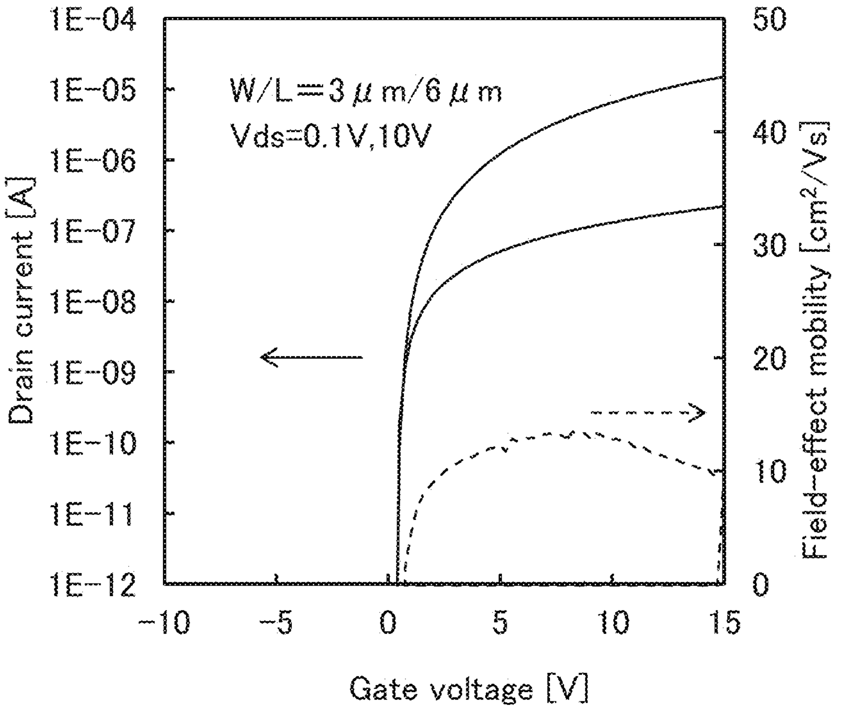
FIG. 25A and FIG. 25B are diagrams showing the $I_D$-$V_G$ characteristics of transistors.
Figure 25B:
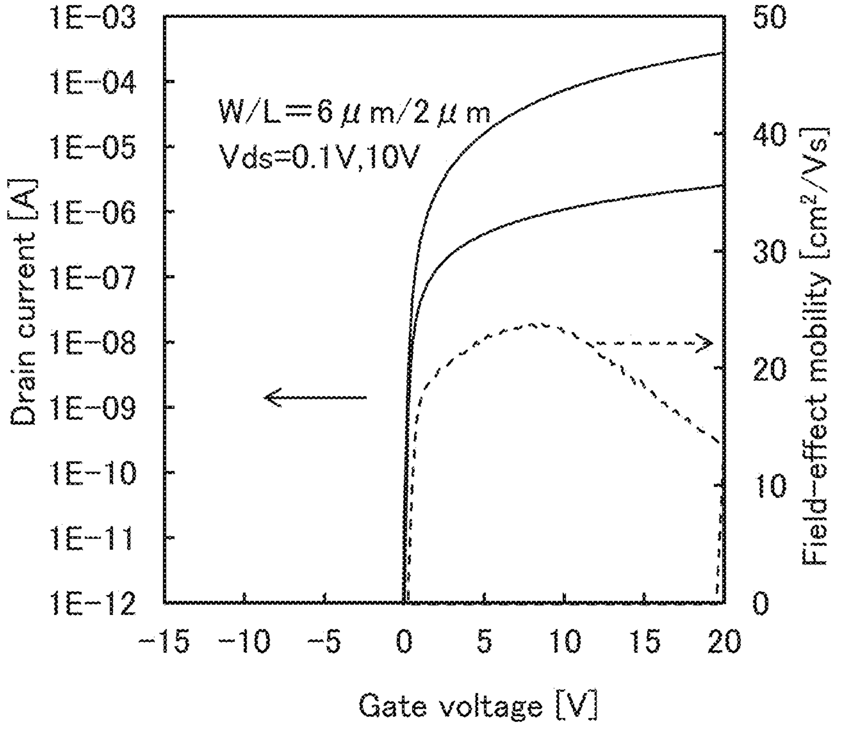

FIG. 25A shows the $I_D$–$V_G$ characteristics (Vds=0.1 V, 10 V) of an OS transistor (W/L=3 μm/6 μm) manufactured through the same process as the manufacturing process of the display apparatus. FIG. 25B shows the $I_D$–$V_G$ characteristics ($V_{ds}$=0.1 V, 10 V) of an OS transistor (W/L=6 μm/2 μm). The transistor is normally off; its off-state current is less than the lower measurement limit of measuring equipment. An OS transistor having a channel length of less than or equal to 2 μm has substantially the same current capability as that of a general low temperature polycrystalline silicon (hereinafter, LTPS) transistor.

<EL Pixel Circuit>

Figure 26A:
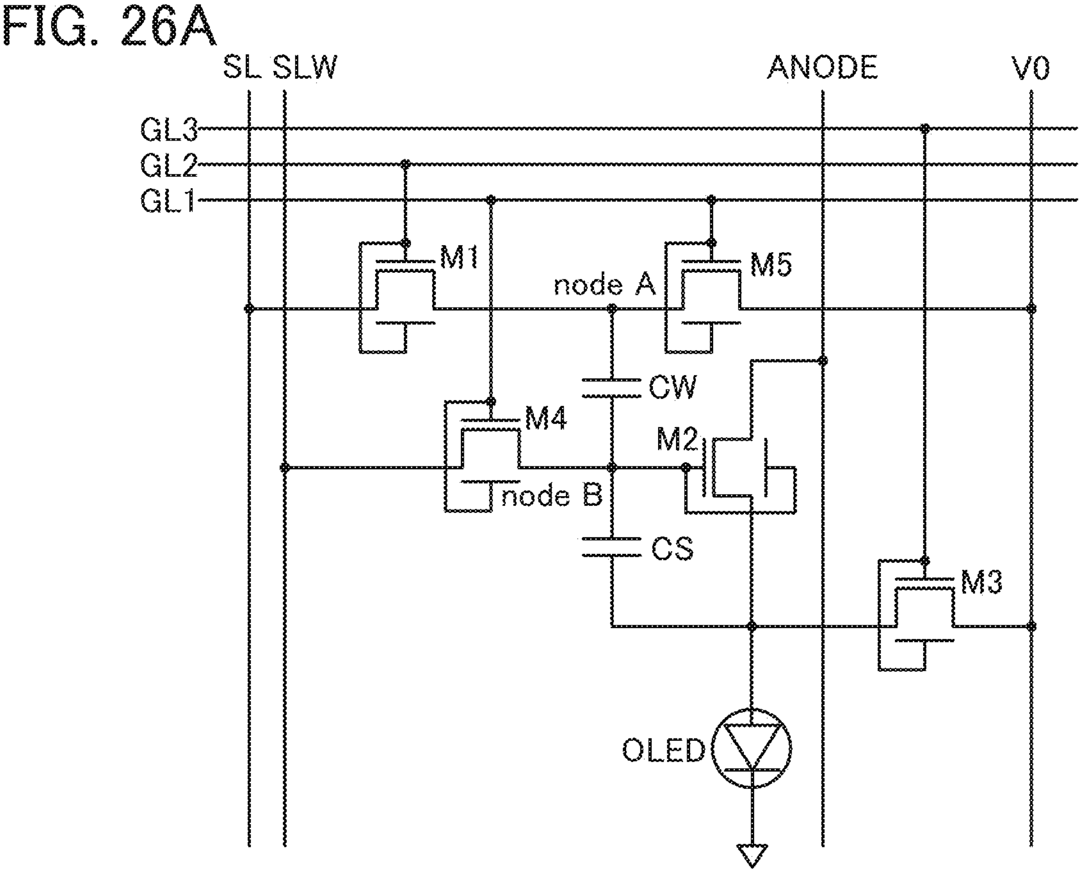
FIG. 26A is a diagram illustrating an EL pixel circuit.

FIG. 26A illustrates a circuit diagram of a pixel using a light-emitting device as a display element. A memory circuit that is formed of one transistor (M4) and one capacitor (CW) is provided in the pixel circuit, and five transistors (M1 to M5), two capacitors (CW and CS), and a light-emitting device (OLED) are included as the whole pixel circuit. Each of the transistors has a back gate electrically connected to a front gate thereof. The components included in the pixel circuit are electrically connected to at least one of gate lines (GL1 to GL3), source lines (SL and SLW), power supply lines (ANODE and CATHODE), and a reference potential line (V0). Furthermore, the pixel circuit includes a node A and a node B to which some components are connected. The description of FIG. 2 can be referred to for the details.

Since an OS transistor has an extremely low leakage current, a memory circuit can be formed of one transistor and one capacitor. Thus, a memory circuit with fewer components than in the case of using an LTPS transistor can be incorporated in a pixel. Furthermore, an analog value can be retained in the memory circuit.

Figure 26B:
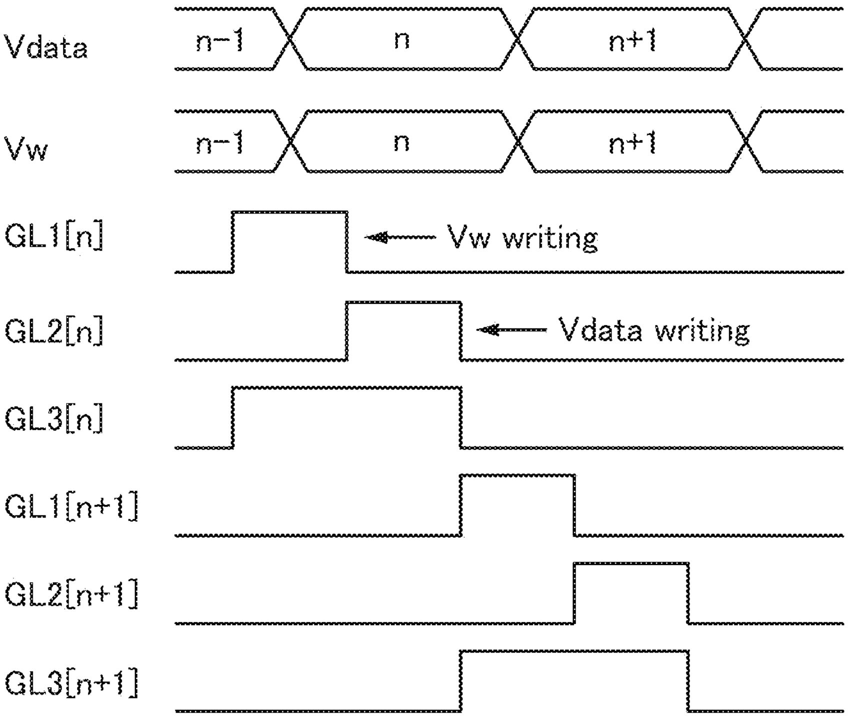
FIG. 26B is a timing chart.

Next, a driving method in accordance with a timing chart shown in FIG. 26B is briefly described. The timing of a period for writing weight ($V_w$) and the timing of a period for writing display data ($V_{data}$) are made different. Note that n shown in the timing chart denotes the number of a row of a pixel, and n is a natural number of 1 or more.

<Writing of Weight ($V_w$)>

First, the gate line GL1 is set to a high potential to turn on the transistors M4 and M5, whereby a reference potential $V_0$ supplied from the reference potential line (V0) is written to the node A. Moreover, a potential ($V_w$) supplied to the source line SLW is written to the node B.

<Writing of Display Data ($V_{data}$)>

Next, the gate line GL1 is set to a low potential and the gate line GL2 is set to a high potential, so that a potential ($V_{data}$) supplied to the source line SL is written to the node A. At this time, a voltage $V_g$ of the node B (a gate of the transistor M2) becomes $(C_W(V_w-V_0)+C_S(V_w-V_0)+C_W \cdot V_{data})/(C_W+C_S)$. Note that $C_W$ is a capacitance value of the capacitor CW, and $C_S$ is a capacitance value of the capacitor CS.

Here, when $V_0$=0 V, $V_g=V_w+(C_W/(C_W+C_S)) \cdot V_{data}$. Thus, when $V_w>(C_S/(C_W+C_S)) \cdot V_{data}$, a voltage higher than the output of a source driver can be applied to the pixel.

<Liquid Crystal Pixel Circuit>

Figure 27A:
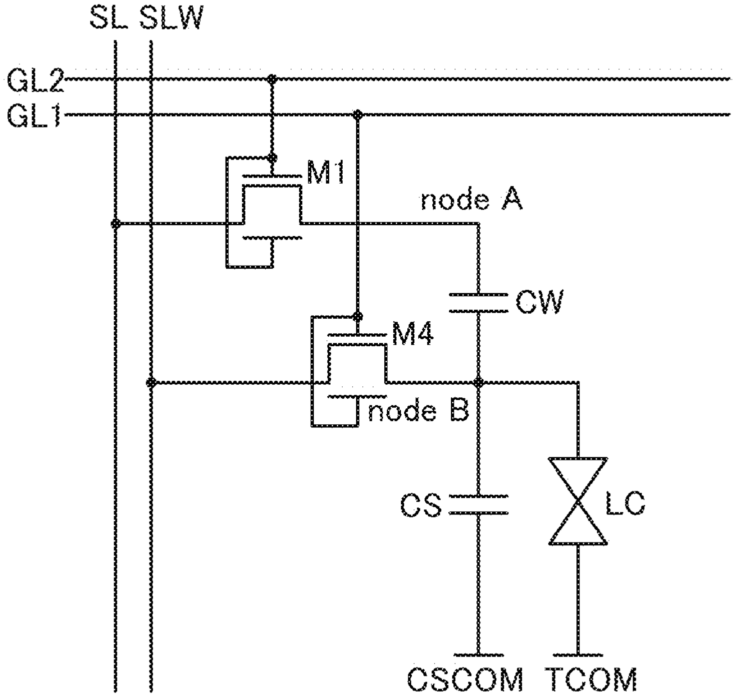
FIG. 27A and FIG. 27B are diagrams showing liquid crystal pixel circuits.

FIG. 27A illustrates a circuit diagram of a pixel using a liquid crystal device as a display element. In the pixel circuit, a memory circuit formed of one transistor (M4) and one capacitor (CW) is provided as in the EL pixel circuit. As the whole pixel circuit, two transistors (M1 and M4), two capacitors (CW and CS), and a liquid crystal device (LC) are included. Each of the transistors has a back gate electrically connected to a front gate. The components included in the pixel circuit are electrically connected to at least one of gate lines (GL1 and GL2), source lines (SL and SLW), and reference potential lines (TCOM and CSCOM). Furthermore, the pixel circuit includes the node A and the node B to which some components are connected. The description of FIG. 6A can be referred to for the details. Note that common reference numerals are used for components common to those of the EL pixel circuit.

Next, a method for driving the liquid crystal pixel circuit is briefly described.

<Writing of Weight ($V_w$)>

First, the gate lines GL1 and GL2 are set to a high potential to turn on the transistors M1 and M4, whereby a potential (the reference potential $V_r$) supplied to the source line SL is written to the node A. Moreover, a potential ($V_w$) supplied to SLW is written to the node B.

<Writing of Display Data ($V_{data}$)>

Next, the gate line GL1 is set to a low potential and the gate line GL2 is set to a high potential to turn off only M4, so that a potential ($V_{data}$) supplied to the source line SL is written to the node A. At this time, a potential of the node B becomes $(C_W(V_w-V_r)+(C_S+C_{lc})\cdot(V_w-V_r)+C_W\cdot(V_{data})/(C_W+C_S+C_{lc})$ owing to the capacitive coupling of the capacitor CW. Note that $C_{lc}$ is a capacitance value of the liquid crystal device LC.

The potential of the node B can be a potential higher than $V_{data}$ by the formula, although the potential of the node B also depends on the ratio between $C_W$ and $(C_S+C_{lc})$. That is, a potential higher than $V_{data}$ supplied from a source driver can be applied to the liquid crystal device LC.

<Source Driver>

When the above-described effect is used, in the case where a voltage of 5 V is needed as the voltage $V_g$ at maximum in the EL pixel circuit, the output voltage of the source driver can be lower than 5 V. Although the voltage $V_g$ depends on the capacitance ratio between the capacitor CW and the capacitor CS, 3.3 V can be enough for the output voltage of the source driver, for example.

In the case where a voltage of 5 V is needed at the node B at maximum in the liquid crystal pixel circuit, the output voltage of the source driver can be lower than 5 V. Although the voltage at the node B depends on the capacitance ratio between the capacitor CW and the capacitor CS+the liquid crystal device LC, 3.3 V can be enough for the output voltage of the source driver, for example.

This effect also leads to a reduction in the upper limit of the withstand voltage of the amplifier circuit included in the source driver. With the use of the above-described EL pixel circuit, the amplifier circuit of the source driver does not need to be formed with a technology of the withstand voltage of 5 V and may be formed with a technology of the withstand voltage of 3.3 V. Furthermore, with the use of the above-described liquid crystal pixel circuit, the amplifier circuit of the source driver does not need to be formed with a technology of the withstand voltage of 10 V or higher and may be formed with a technology of the withstand voltage of 10 V or lower.

Figure 28:
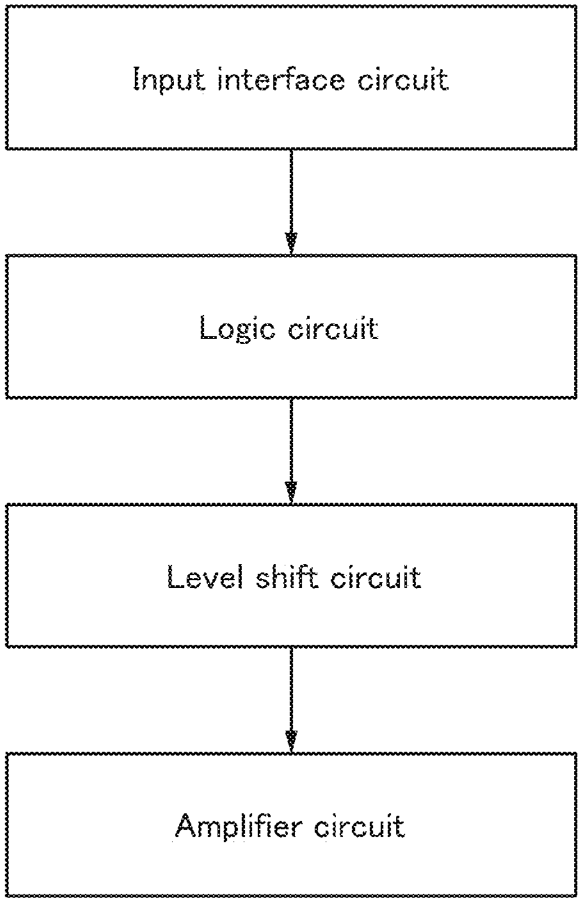
FIG. 28 is a block diagram illustrating a source driver.

With the source driver having a configuration of a block diagram illustrated in FIG. 28, the power consumption of each block was simulated assuming the case of a 5 V technology and a 3.3 V technology. The assumed panel was a smartphone-sized panel, and the number of pixels was 1080×1920. Note that for the simulation, SmartSpice produced by Silvaco, Inc was used.

Note that as the operation condition of the panel, the case where 30% of the display portion is rewritten was assumed. Furthermore, the following case was assumed: the configurations of the logic unit and the like of the source driver were common, and the size of the transistor was changed only in the amplifier circuit.

Figure 29A:
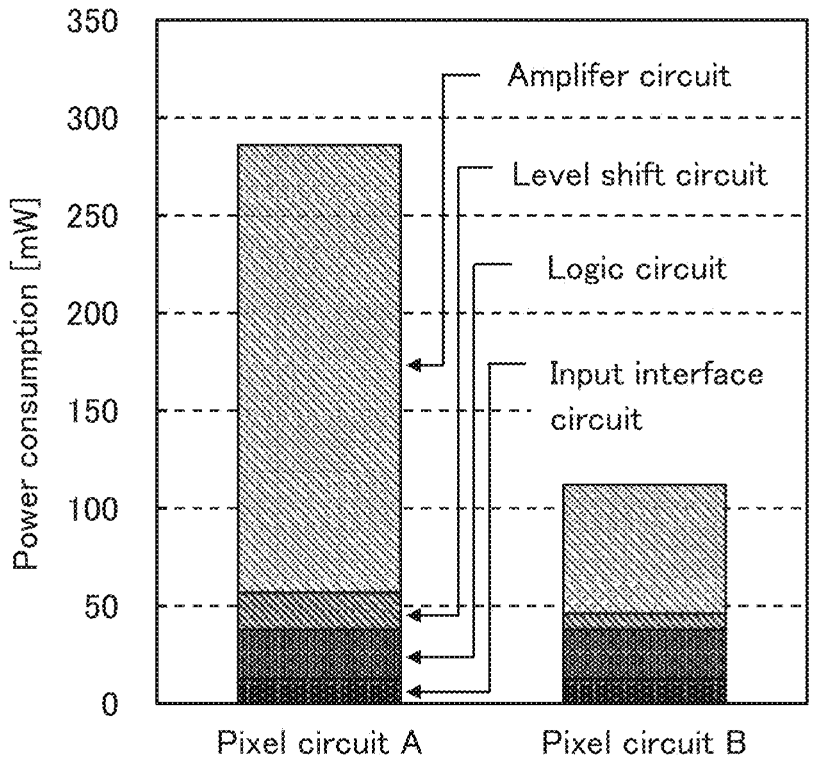
FIG. 29A and FIG. 29B are diagrams showing simulation results of power consumption of source drivers.

FIG. 29A shows the estimation comparison results of the power consumption of the source drivers that are used in the EL pixel circuits. A pixel circuit A is an assumption of a conventional pixel circuit (transistor×3+capacitor×1; in FIG. 26A, the transistors M1 and M3 and the capacitor CW are not included), and the power consumption of a source driver of an amplifier circuit with a 5 V technology is shown. A pixel circuit B is an assumption of the pixel circuit of one embodiment of the present invention (transistor×5+capacitor×2; the configuration in FIG. 26A), and the power consumption of a source driver including an amplifier circuit with a 3.3 V technology is shown.

As illustrated in FIG. 29A, it is found that with the use of the pixel circuit B and a source driver with an appropriate technology, the power consumption can be greatly reduced. This great reduction in power consumption is because a technology for a low voltage can be used for the amplifier circuit whose power consumption is the great majority of the power consumption of the source driver. Furthermore, the power consumption of the level shift circuit depends on the power supply voltage. Thus, it is found that with the use of the pixel circuit of one embodiment of the present invention, the source driver can have lower power consumption.

Figure 27B:
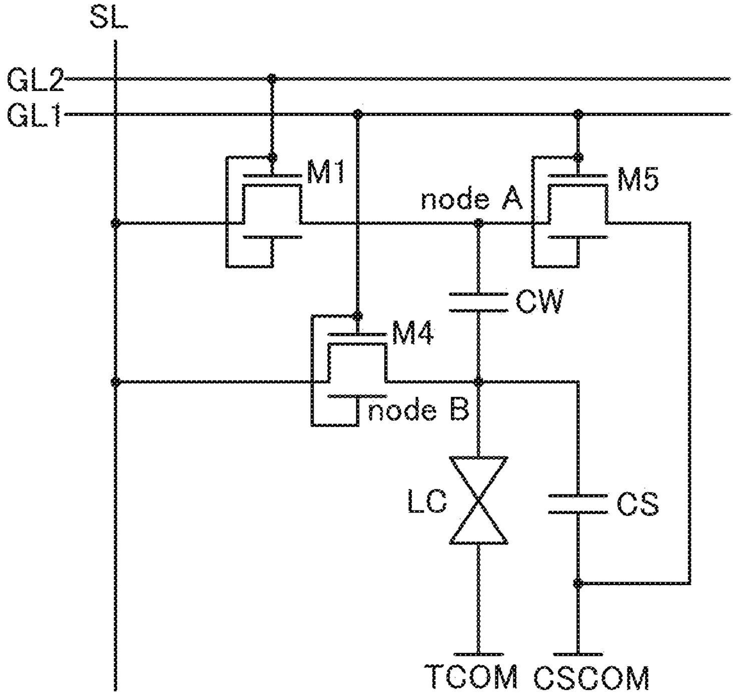
Figure 29B:
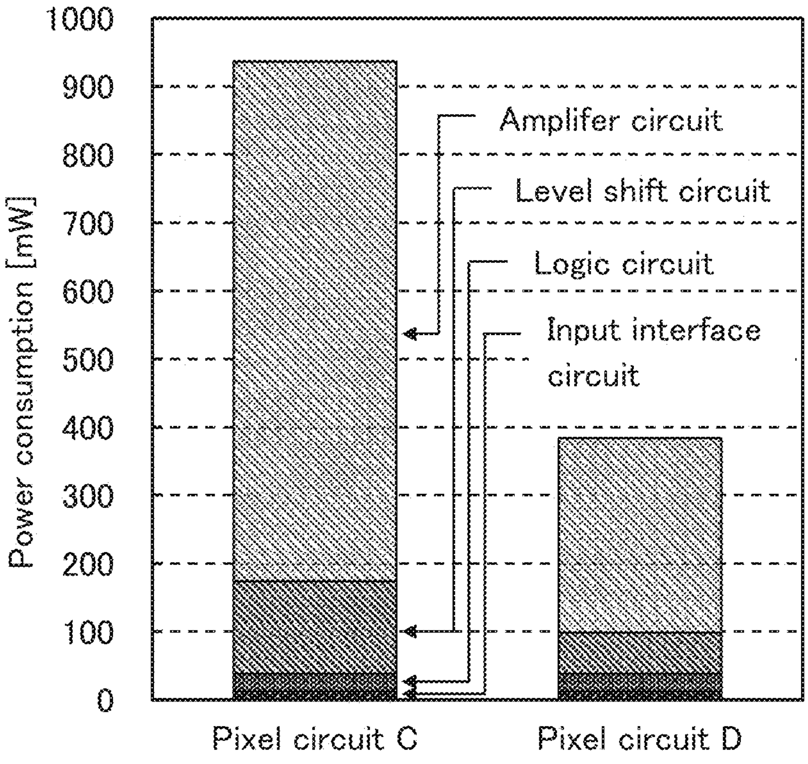

FIG. 29B shows the estimation comparison results of the power consumption of the source drivers that are used in the liquid crystal pixel circuits. The power consumption of a pixel circuit C is shown on the assumption of a conventional pixel circuit (transistor×1+capacitor×1; in FIG. 27A, the transistor M1 and the capacitor CW are not included) and the source driver. Furthermore, the power consumption of a pixel circuit D is shown on the assumption of the pixel circuit of one embodiment of the present invention and the source driver with an appropriate technology. Note that as the pixel circuit D, the pixel circuit illustrated in FIG. 27B (transistor×3+capacitor×2) capable of operation with which lower power consumption can be expected is used. The results shown in FIG. 29B show that with the use of the pixel circuit of one embodiment of the present invention, the source driver can have lower power consumption like the results of the source driver used in the EL pixel circuit.

Although the pixel circuit illustrated in FIG. 26A corresponds to the above-described pixel circuit B (transistor×5+capacitor×2), the pixel circuit can also operate as the pixel circuit A (transistor×3+capacitor×1). Here, a panel including the pixel circuits illustrated in FIG. 26A was fabricated, and the actual measurement results of the power consumption in the case of operation as the pixel circuit A (A mode) and in the case of operation as the pixel circuit B (B mode) are described. Note that a 5 V technology is used for the source driver.

As the display image, three kinds were used: an all white image, a checkered pattern (black and white grid) image, and a natural image (an image of zebras). Furthermore, between the A mode and the B mode, the luminance of a light-emitting device (OLED) was set to the same, so that the power consumption was set to the same.

Figure 30:
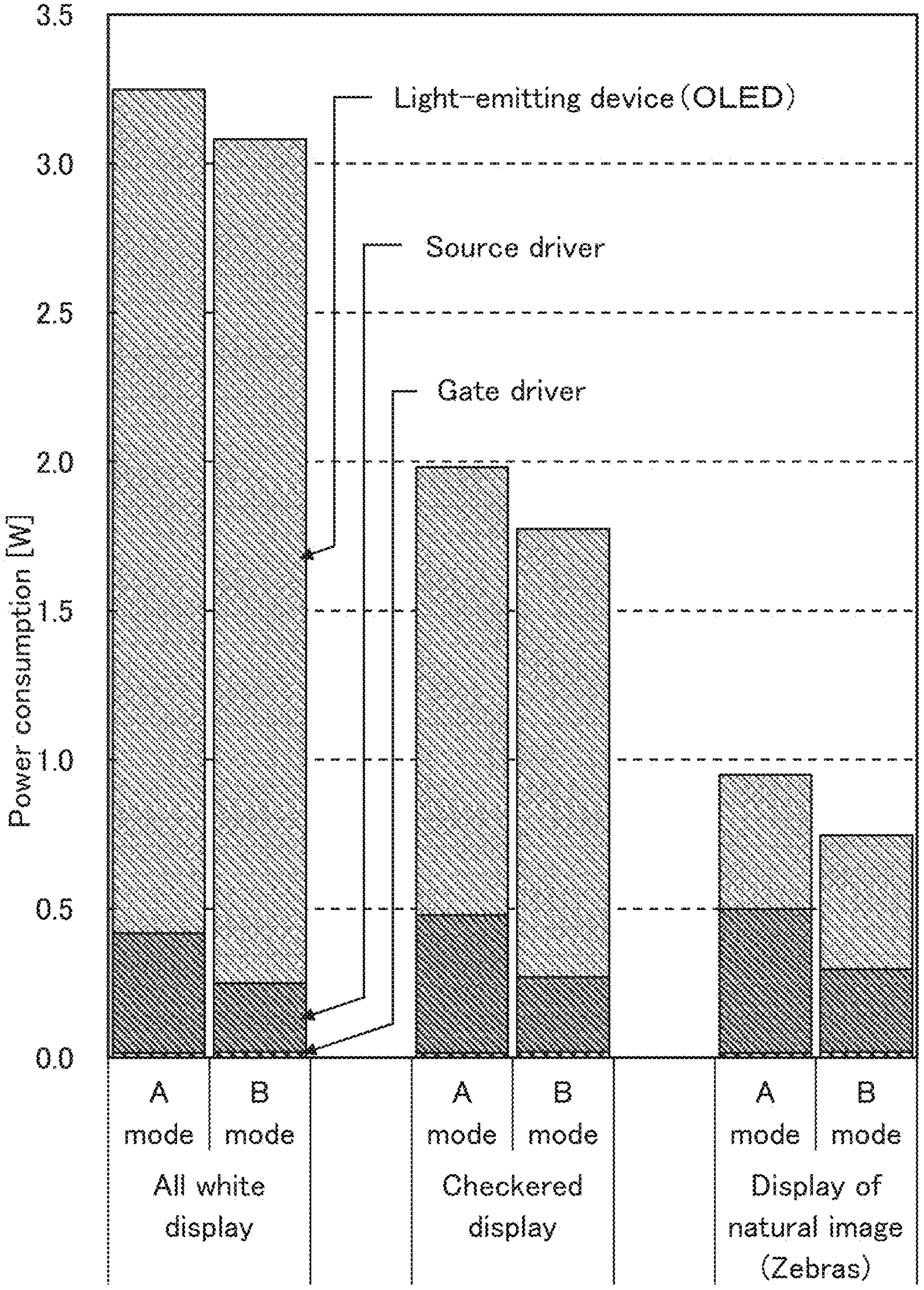
FIG. 30 is a diagram showing actual measurement results of power consumption of a panel.

FIG. 30 shows the comparison results of the power consumption in the case where each image was displayed. The power consumption is a value obtained by adding the power consumption of the light-emitting device, the power consumption of the source driver, and the power consumption of the gate driver. Among them, the power consumption of the light-emitting device is the same between the A mode and the B mode as described above. Although the power consumption of the gate driver becomes larger in the B mode, in which the number of driven gate lines is greater by one, its influence on the comparison results of the power consumption is small because the power consumption of the gate driver is smaller than the power consumption of the source driver by one digit.

It is found that the gap in power consumption among the displays is substantially the gap itself of the power consumption of the source driver, and the power consumption can be reduced by operation in the B mode. That is, it is assured that the pixel circuit of one embodiment of the present invention can operate with lower power consumption than the conventional pixel circuit.

<EL Display Panel>

Figure 32A:
FIG. 32A is a display image photograph of an EL display panel.

Table 1 shows the specifications of the fabricated EL display panel. The gate driver was provided using OS transistors over the same substrate as that of the pixel circuit. As the light-emitting device, a white tandem organic EL device was used, and a method for coloring with a color filter was used. FIG. 32A is the display result of the fabricated EL display panel.

TABLE 1

| | Specifications |
|---|---|
| Diagonal size | 4.68 inches |
| Resolution | 720 × 1280 |
| Pixel size | 84 μm × 84 μm |
| Pixel density | 302 ppi |
| Aperture ratio | 43.7% |
| Pixel arrangement | RGB stripe |
| Color method | White tandem OLED + color filter |
| Light extraction method | Top emission |
| Source driver | COG |
| Gate driver | Incorporated |

<Liquid Crystal Display Panel>

Figure 31A:
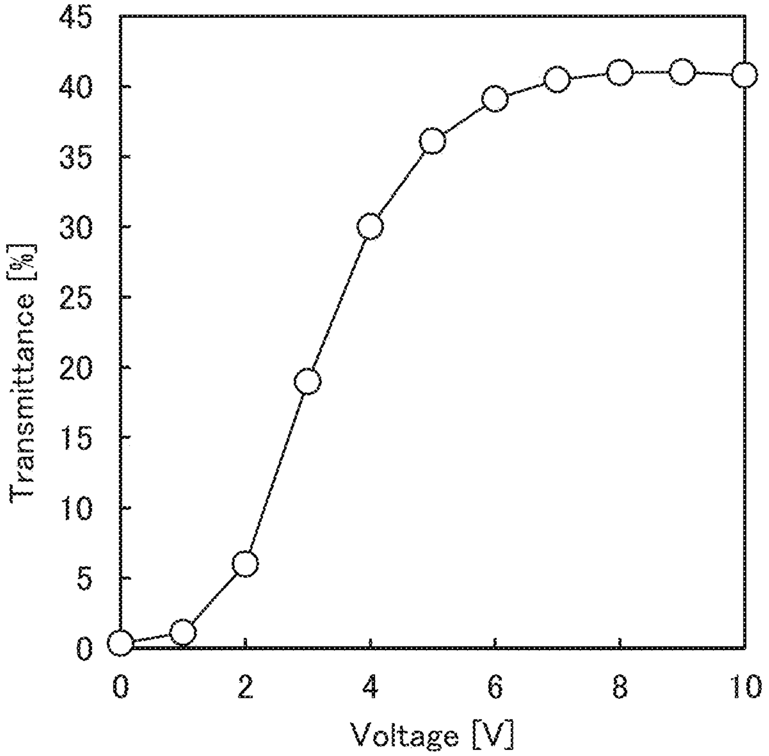
FIG. 31A is a diagram showing transmittance in a liquid crystal device.

A liquid crystal display panel having the specifications shown in Table 2 was fabricated. The gate driver was provided using OS transistors over the same substrate as that of the pixel circuit. For the source driver, an IC chip that can output from −4 V to +4 V was used. A liquid crystal material in an FFS mode was used, and the fabrication was made in the condition where the saturation voltage was 10 V as shown in FIG. 31A. This voltage is higher than the output voltage of the source driver; thus, the saturation operation of the liquid crystal device is not possible with the conventional pixel circuit.

TABLE 2

| | Specifications |
|---|---|
| Diagonal size | 10.2 inches |
| Resolution | 720 × 1920 |
| Pixel size | 126 μm × 126 μm |
| Pixel density | 201 ppi |
| Aperture ratio | 46.2% |
| Liquid crystal | FFS mode |
| Source driver | COG |
| Gate driver | Incorporated |

Figure 31B:
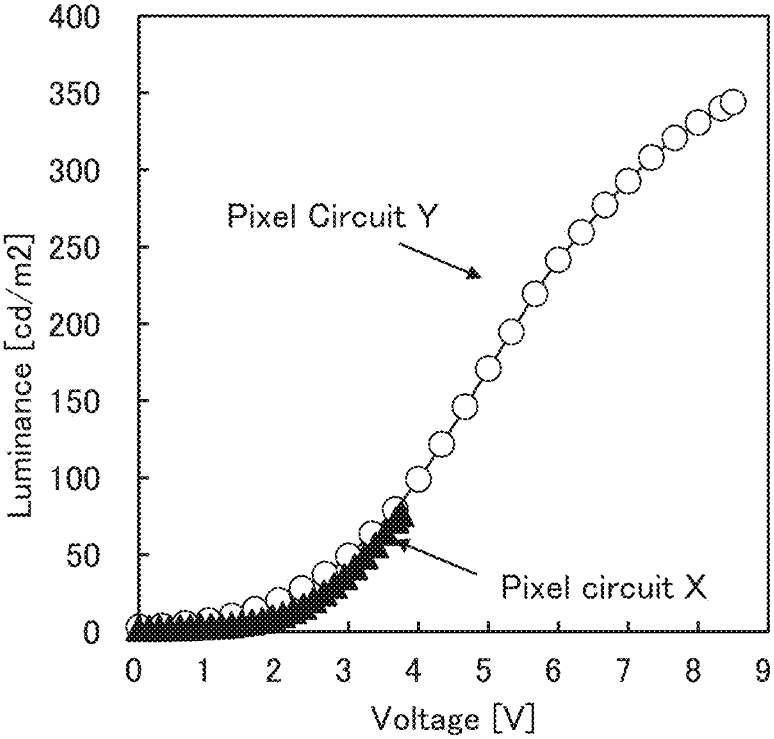
FIG. 31B is a diagram showing luminance in a liquid crystal display panel.
Figure 32B:
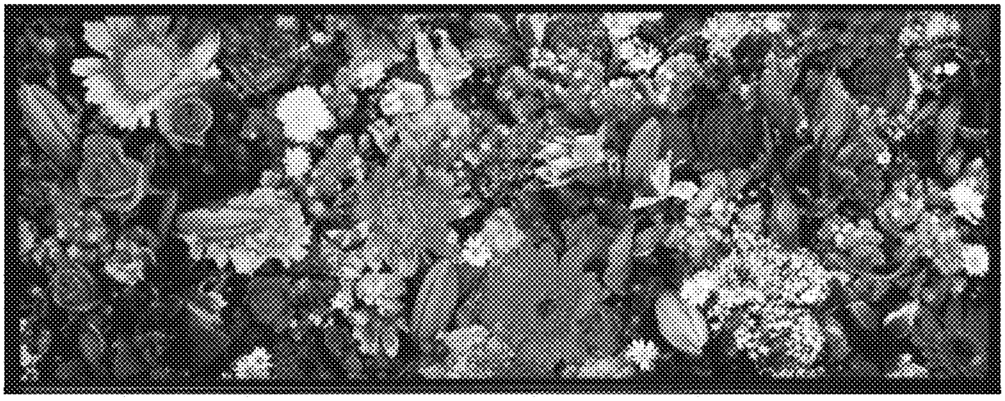
FIG. 32B is a display image photograph of a liquid crystal display panel.

FIG. 31B shows the comparison results of the relation between a voltage applied to the liquid crystal device and the luminance of the panel between a conventional pixel circuit X and a pixel circuit Y of one embodiment of the present invention. It is shown that a voltage higher than or equal to the output voltage of the source driver was able to be applied to the liquid crystal device owing to the function of boosting a voltage of the pixel circuit Y of one embodiment of the present invention. FIG. 32B is a display result of the fabricated liquid crystal display panel. Even with the source driver having a low output, a sufficient voltage was able to be applied to the liquid crystal device, which enabled display with high luminance.

The organic EL display panel and the liquid crystal display panel in each of which the memory circuit was included in the pixel were fabricated using the extremely low off-state leakage characteristics of the OS transistor. It is found that when weight is retained in the memory, a voltage higher than or equal to the output voltage of the source driver can be generated in the pixel, enabling a reduction in output voltage of the source driver. Furthermore, it was estimated that owing to the effect, the withstand voltage of the transistor included in the source driver and the power consumption of the source driver can be reduced.

The pixel circuit of one embodiment of the present invention can be formed of only the OS transistors. Furthermore, no special manufacturing step is needed, and the number of masks is not increased. Moreover, the number of masks for the manufacturing process of the OS transistor can be reduced than that for the manufacturing process of the LTPS transistor; thus, the use of the OS transistor for a display panel also has an advantage in the aspect of the manufacturing process.

REFERENCE NUMERALS

10: pixel, 11: pixel array, 20: source driver, 21: logic unit, 21_*n*: circuit, 21_1: circuit, 22: amplifier unit, 22_*m*: circuit, 22_1: circuit, 25: power supply circuit, 25*a*: power supply circuit, 25*b*: power supply circuit, 30: gate driver, 40: circuit, 101: transistor, 102: transistor, 103: transistor, 104: transistor, 105: transistor, 106: capacitor, 107: capacitor, 108: light-emitting device, 109: transistor, 110: liquid crystal device, 111: pixel electrode, 121: wiring, 122: wiring, 123: wiring, 124: wiring, 125: wiring, 126: wiring, 127: wiring, 129: wiring, 130: wiring, 131: wiring, 151: transistor, 152: transistor, 215: display portion, 221*a*: scan line driver circuit, 231*a*: signal line driver circuit, 232*a*: signal line driver circuit, 241*a*: common line driver circuit, 723: electrode, 726: insulating layer, 728: insulating layer, 729: insulating layer, 741: insulating layer, 742: semiconductor layer, 744*a*: electrode, 744*b*: electrode, 746: electrode, 771: substrate, 772: insulating layer, 810: transistor, 811: transistor, 820: transistor, 821: transistor, 825: transistor, 826: transistor, 842: transistor, 843: transistor, 844: transistor, 845: transistor, 846: transistor, 847: transistor, 901: housing, 902: housing, 903: display portion, 904: operation key, 905: lens, 906: connection portion, 907: speaker, 911: housing, 912: display portion, 913: speaker, 914: operation button, 919: camera, 921: pillar, 922: display portion, 951: housing, 952: display portion, 953: operation button, 954: external connection port, 955: speaker, 956: microphone, 957: camera, 961: housing, 962: shutter button, 963: microphone, 965: display portion, 966: operation key, 967: speaker, 968: zoom lever, 969: lens, 971: housing, 973: display portion, 974: operation button, 975: speaker, 976: communication connection terminal, 977: optical sensor, 4001: substrate, 4003: layer, 4004: layer, 4005: sealant, 4006: substrate, 4008: liquid crystal layer, 4009: composite layer, 4010: transistor, 4011: transistor, 4013: liquid crystal device, 4014: wiring, 4015: electrode, 4016: light-scattering liquid crystal device, 4017: electrode, 4018: FPC, 4019: anisotropic conductive layer, 4020: capacitor, 4021: electrode, 4022: transistor, 4023: transistor, 4030: electrode layer, 4031: electrode layer, 4032: insulating layer, 4033: insulating layer, 4035: spacer, 4041: printed circuit board, 4042: integrated circuit, 4102: insulating layer, 4103: insulating layer, 4104: insulating layer, 4110: insulating layer, 4111: insulating layer, 4112: insulating layer, 4131: coloring layer, 4132: light-blocking layer, 4133: insulating layer, 4200: input apparatus, 4210: touch panel, 4227: electrode, 4228: electrode, 4237: wiring, 4238: wiring, 4239: wiring, 4263: substrate, 4272*b*: FPC, 4273*b*: IC, 4340*a*: backlight unit, 4340*b*: backlight unit, 4341: light guide plate, 4342: light-emitting device, 4344: lens, 4345: mirror, 4347: printed circuit board, 4348: reflective layer, 4352: diffusing plate, 4510: partition wall, 4511: light-emitting layer, 4513: light-emitting device, 4514: filler

The invention claimed is:

1. A display apparatus comprising a driver circuit and a pixel circuit, wherein the driver circuit comprises a shift register circuit and an amplifier circuit, wherein the pixel circuit is configured to generate third data by adding first data and second data that are output from the amplifier circuit, wherein the shift register circuit comprises a first transistor, wherein the amplifier circuit comprises a second transistor, wherein the pixel circuit comprises a third transistor, a fourth transistor, a fifth transistor, a sixth transistor, a seventh transistor, a first capacitor, a second capacitor, and a light-emitting device, wherein one of a source and a drain of the third transistor is electrically connected to one electrode of the first capacitor, wherein the other electrode of the first capacitor is electrically connected to one of a source and a drain of the fourth transistor, wherein the one of the source and the drain of the fourth transistor is electrically connected to one of a source and a drain of the fifth transistor, wherein the one electrode of the first capacitor is electrically connected to a gate of the sixth transistor, wherein one of a source and a drain of the sixth transistor is electrically connected to one of a source and a drain of the seventh transistor, wherein the one of the source and the drain of the seventh transistor is electrically connected to one electrode of the light-emitting device, wherein the one electrode of the light-emitting device is electrically connected to one electrode of the second capacitor, and wherein the other electrode of the second capacitor is electrically connected to the gate of the sixth transistor.

2. A display apparatus comprising a driver circuit and a pixel circuit, wherein the driver circuit comprises a shift register circuit and an amplifier circuit, wherein the pixel circuit is configured to generate third data by adding first data and second data that are output from the amplifier circuit, wherein the shift register circuit comprises a first transistor, wherein the amplifier circuit comprises a second transistor, wherein the pixel circuit comprises a third transistor, a fourth transistor, a fifth transistor, a first capacitor, a second capacitor, and a liquid crystal device, wherein one of a source and a drain of the third transistor is electrically connected to one electrode of the first capacitor, wherein the other electrode of the first capacitor is electrically connected to one of a source and a drain of the fourth transistor, wherein the one of the source and the drain of the fourth transistor is electrically connected to one of a source and a drain of the fifth transistor, wherein the one electrode of the first capacitor is electrically connected to one electrode of the second capacitor, and wherein the one electrode of the second capacitor is electrically connected to one electrode of the liquid crystal device.

3. The display apparatus according to claim 1, wherein the other of the source and the drain of the third transistor is electrically connected to the other of the source and the drain of the fourth transistor.

4. The display apparatus according to claim 1, wherein each of the transistors included in the pixel circuit comprises a metal oxide in a channel formation region, and the metal oxide comprises In, Zn, and M, and wherein M is Al, Ti, Ga, Sn, Y, Zr, La, Ce, Nd, or Hf.

5. An electronic device comprising:

the display apparatus according to claim 1; and a camera.

6. The display apparatus according to claim 2, wherein each of the transistors included in the pixel circuit comprises a metal oxide in a channel formation region, and the metal oxide comprises In, Zn, and M, and wherein M is Al, Ti, Ga, Sn, Y, Zr, La, Ce, Nd, or Hf.

7. An electronic device comprising:

the display apparatus according to claim 2; and a camera.

* * * * *